US012574617B2

(12) United States Patent
Park

(10) Patent No.: US 12,574,617 B2
(45) Date of Patent: Mar. 10, 2026

(54) CAMERA DEVICE AND OPTICAL INSTRUMENT

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/294,099

(22) PCT Filed: Jul. 27, 2022

(86) PCT No.: PCT/KR2022/011033
§ 371 (c)(1),
(2) Date: Jan. 31, 2024

(87) PCT Pub. No.: WO2023/013957
PCT Pub. Date: Feb. 9, 2023

(65) Prior Publication Data
US 2024/0340509 A1      Oct. 10, 2024

(30) Foreign Application Priority Data

Aug. 5, 2021    (KR) ........................ 10-2021-0102998

(51) Int. Cl.
*H04N 23/52*        (2023.01)
*H04N 23/55*        (2023.01)
(52) U.S. Cl.
CPC ............. *H04N 23/52* (2023.01); *H04N 23/55* (2023.01)
(58) Field of Classification Search
CPC ........ H04N 23/52; H04N 23/55; H04N 23/00; H04N 23/54; H04N 23/57; H04N 23/60; H04N 23/687
See application file for complete search history.

(56) References Cited

U.S. PATENT DOCUMENTS

2006/0278810 A1* 12/2006 Kobayashi ............. H04N 23/54
250/208.1
2008/0055420 A1* 3/2008 Orihashi .............. H04N 23/687
348/208.4
(Continued)

FOREIGN PATENT DOCUMENTS

EP          3719611 A1    10/2020
KR      10-0950386 B1     3/2010
(Continued)

OTHER PUBLICATIONS

International Search Report dated Nov. 23, 2022 in International Application No. PCT/KR2022/011033.
(Continued)

*Primary Examiner* — Abdelaaziz Tissire
(74) *Attorney, Agent, or Firm* — Saliwanchik, Lloyd & Eisenschenk

(57)              ABSTRACT

A camera device of the disclosure includes a moving unit, including a first heat dissipation member, a first board disposed on the first heat dissipation member and including a hole to expose a portion of the first heat dissipation member, and an image sensor disposed in the hole, a fixed unit, including a second board disposed so as to be spaced apart from the first heat dissipation member and a second heat dissipation member disposed on the second board, and a support member, configured to support the moving unit to move relative to the fixed unit in a direction perpendicular to an optical-axis direction. The image sensor is coupled to the first heat dissipation member, and the second heat dissipation member is disposed so as to be spaced apart from the first heat dissipation member and to overlap the first heat dissipation member in the optical-axis direction.

20 Claims, 43 Drawing Sheets

(56) References Cited

U.S. PATENT DOCUMENTS

| | | | | |
|---|---|---|---|---|
| 2009/0153684 A1* | 6/2009 | Yoshida | ................ | H04N 23/51 |
| | | | | 348/208.99 |
| 2017/0104019 A1* | 4/2017 | Jung | .................... | H10F 39/805 |
| 2019/0285782 A1* | 9/2019 | Hsu | ........................ | H04N 23/55 |
| 2019/0349507 A1* | 11/2019 | Lee | ........................ | H04N 23/54 |
| 2021/0183723 A1* | 6/2021 | Chan | .................. | H01L 21/4882 |
| 2024/0340509 A1 | 10/2024 | Park | | |

FOREIGN PATENT DOCUMENTS

| | | | | | |
|---|---|---|---|---|---|
| KR | 20100102827 A | * | 9/2010 | .......... | H10F 39/806 |
| KR | 10-1018253 B1 | | 3/2011 | | |
| KR | 10-2012-0115757 A | | 10/2012 | | |
| TW | I668554 B | | 8/2019 | | |

OTHER PUBLICATIONS

Office Action dated Jan. 6, 2026 in Taiwanese Application No. 111128653.

* cited by examiner (a)

(b)

(c)

(d)

CAMERA DEVICE AND OPTICAL INSTRUMENT

CROSS-REFERENCE TO RELATED APPLICATIONS

This application is the U.S. national stage application of International Patent Application No. PCT/KR2022/011033, Jul. 27, 2022, which claims the benefit under 35 U.S.C. § 119 of Korean Application No. 10-2021-0102998, filed Aug. 5, 2021, the disclosures of each of which are incorporated herein by reference in their entirety.

TECHNICAL FIELD

Embodiments relate to a camera device and an optical instrument including the same.

BACKGROUND ART

Voice coil motor (VCM) technology, which is used in conventional general camera devices, is difficult to apply to a micro-scale camera device, which is intended to exhibit low power consumption, and study related thereto has been actively conducted.

There is increasing demand for, and production of, electronic products such as smart phones and cellular phones equipped with cameras. Cameras for cellular phones have been increasing in resolution and decreasing in size, and accordingly, actuators therefor are also becoming smaller, larger in diameter, and more multifunctional. In order to realize a high-resolution cellular phone camera, improvement in the performance of the cellular phone camera and additional functions, such as auto-focusing, shutter shaking inhibition, and zooming in and out, are required.

DISCLOSURE

Technical Problem

Embodiments provide a camera device exhibiting improved heat dissipation efficiency and having reduced height in an optical-axis direction and an optical instrument including the same.

Technical Solution

A camera device according to an embodiment includes a moving unit, including a first heat dissipation member, a first board disposed on the first heat dissipation member and including a hole to expose a portion of the first heat dissipation member, and an image sensor disposed in the hole, a fixed unit, including a second board disposed so as to be spaced apart from the first heat dissipation member and a second heat dissipation member disposed on the second board, and a support member, configured to support the moving unit to move relative to the fixed unit in a direction perpendicular to an optical-axis direction. The image sensor is coupled to the first heat dissipation member, and the second heat dissipation member is disposed so as to be spaced apart from the first heat dissipation member and to overlap the first heat dissipation member in the optical-axis direction.

A camera device according to another embodiment includes a second board, a second heat dissipation member disposed on the second board, a first heat dissipation member disposed on the second heat dissipation member, a first board disposed on the first heat dissipation member and including a hole, and an image sensor disposed on the first heat dissipation member. The image sensor is coupled to the first heat dissipation member to move in a direction perpendicular to an optical-axis direction, and the second heat dissipation member is disposed so as to be spaced apart from the first heat dissipation member and to overlap the first heat dissipation member in the optical-axis direction.

The second heat dissipation member may be disposed on the upper surface or the lower surface of the second board. The first heat dissipation member may include a protruding portion disposed in the hole in the first board.

The first heat dissipation member and the second heat dissipation member may be spaced apart from each other in the optical-axis direction by a spacing distance of 0.15 mm to 0.3 mm.

The first heat dissipation member and the second heat dissipation member may be spaced apart from each other in the optical-axis direction by a spacing distance of 0.15 mm to 0.5 mm.

The value obtained by dividing the spacing distance between the first heat dissipation member and the second heat dissipation member in the optical-axis direction by the thickness of the first heat dissipation member may be 1.4 to 3.75.

The value obtained by dividing the spacing distance between the first heat dissipation member and the second heat dissipation member in the optical-axis direction by the thickness of the first board may be 0.8 to 2.

The value obtained by dividing the spacing distance between the first heat dissipation member and the second heat dissipation member in the optical-axis direction by the thickness of the second board may be $\frac{2}{3}$ to 2.

The value obtained by dividing the spacing distance between the first heat dissipation member and the second heat dissipation member in the optical-axis direction by the thickness of the second heat dissipation member may be 1.4 to 3.75.

The first heat dissipation member and the second heat dissipation member may have the same thickness.

The second heat dissipation member may overlap the first heat dissipation member in an area that is 80% to 100% of the area of the first heat dissipation member.

The first heat dissipation member may have an area that is 55% to 80% of the area of the second heat dissipation member.

Each of the first heat dissipation member and the second heat dissipation member may be a metal plate.

At least one of the first heat dissipation member or the second heat dissipation member may include a groove in order to increase a heat dissipation area.

The second heat dissipation member may be disposed on a first surface of the second board, which faces the first heat dissipation member, and the second board may include a first conductive layer, which is exposed to the first surface of the second board and is in contact with the second heat dissipation member.

The second board may include a second conductive layer connected to the first conductive layer and exposed from a second surface of the second board, which is formed opposite the first surface.

The second conductive layer may be conductively connected to a ground of the second board.

The groove may be formed in a predetermined pattern, and the predetermined pattern may be a stripe-shaped pattern, a net-shaped pattern, a mesh-shaped pattern, or a multiple dot-shaped pattern.

Advantageous Effects

The embodiments may improve heat dissipation effect through heat dissipation by the first and second heat dissipation members, and may inhibit an increase in the temperature of the camera device due to an increase in the amount of heat that is generated.

In addition, since an increase in temperature is inhibited, the embodiments may inhibit an increase in noise of the image sensor and deterioration in the resolution of the image sensor, and may inhibit deterioration in the reliability of auto-focusing due to expansion of the lens.

In addition, since a bore is formed in the second board unit, the embodiments may dispose the first board unit close to the second heat dissipation member, and thus may reduce the length (or the height) of the camera device in the optical-axis direction.

BEST MODE

Figure 1:
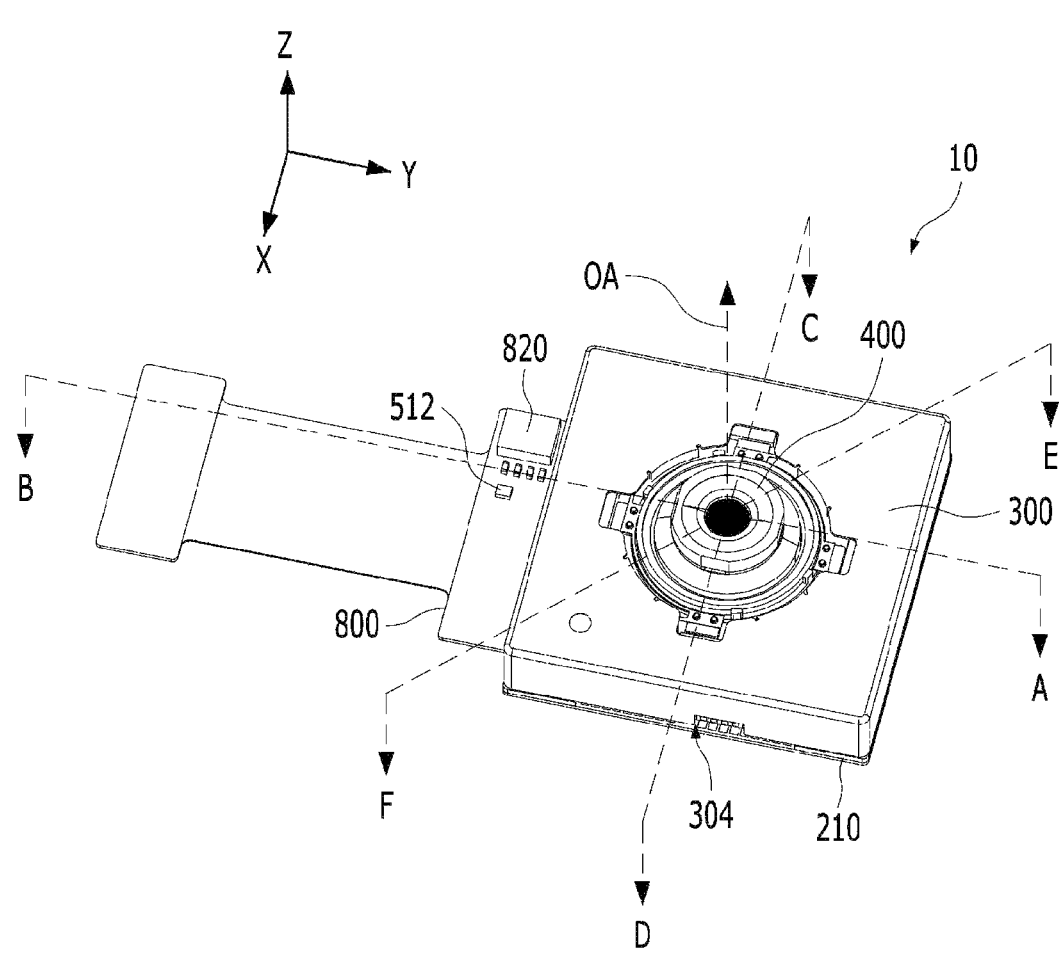
FIG. 1 is a perspective view of a camera device according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, an AF moving unit may alternatively be referred to as a "lens moving apparatus", a "lens moving unit", a "voice coil motor (VCM)", an "actuator", or a "lens moving device". Hereinafter, a coil may alternatively be referred to as a "coil unit", and an elastic member may alternatively be referred to as an "elastic unit" or a "spring".

In addition, in the following description, a terminal may alternatively be referred to as a "pad", an "electrode", a "conductive layer", or a "bonding unit".

In addition, in the following description, the terms "board unit", "circuit board", and "board" may be used interchangeably with each other.

For convenience of description, a camera device according to an embodiment will be described using the Cartesian coordinate system (x,y,z), but the embodiments are not limited thereto, and may be described using other coordinate systems. In the respective drawings, the x-axis and the y-axis may be directions perpendicular to the z-axis, which is an optical-axis direction, the z-axis direction, which is the direction of the optical axis OA, may be referred to as a "first direction", the x-axis direction may be referred to as a "second direction", and the y-axis direction may be referred to as a "third direction". In addition, for example, the x-axis direction may be referred to as "any one of the first horizontal direction and the second horizontal direction", and the y-axis direction may be referred to as "the other of the first horizontal direction and the second horizontal direction".

In addition, for example, the optical axis may be the optical axis of a lens mounted to a lens barrel. The first direction may be a direction perpendicular to a capture area of an image sensor. In addition, for example, the optical-axis direction may be a direction parallel to the optical axis.

The camera device according to the embodiment may perform an "auto-focusing function". Here, the auto-focusing function is a function of automatically focusing an image of a subject on the surface of an image sensor.

Hereinafter, the camera device may alternatively be referred to as a "camera module", a "camera", a "photographing device", or a "lens moving device".

In addition, the camera device according to the embodiment may perform a "hand-tremor compensation function". Here, the hand-tremor compensation function is a function of inhibiting the contour of a captured still image from being blurred due to vibration caused by shaking of a hand of a user when capturing the still image.

Figure 2:
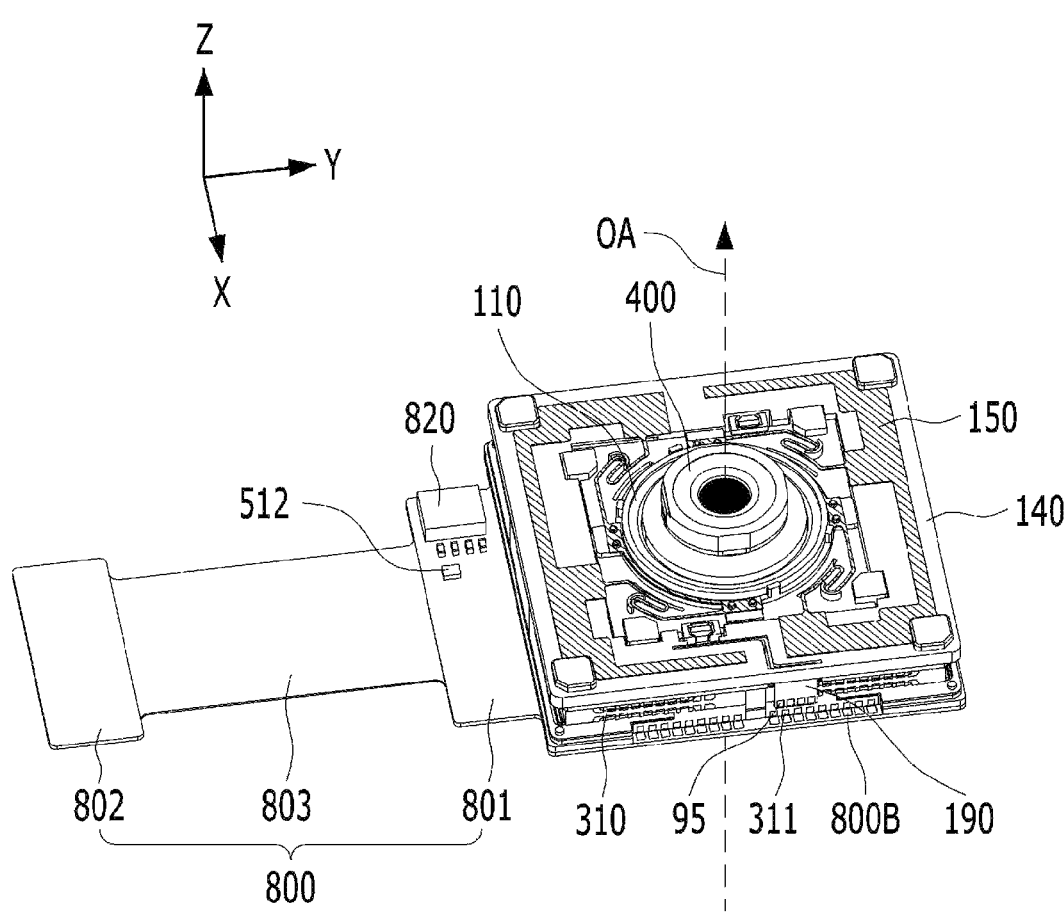
FIG. 2 is a perspective view of the camera device, with a cover member removed therefrom.
Figure 3:
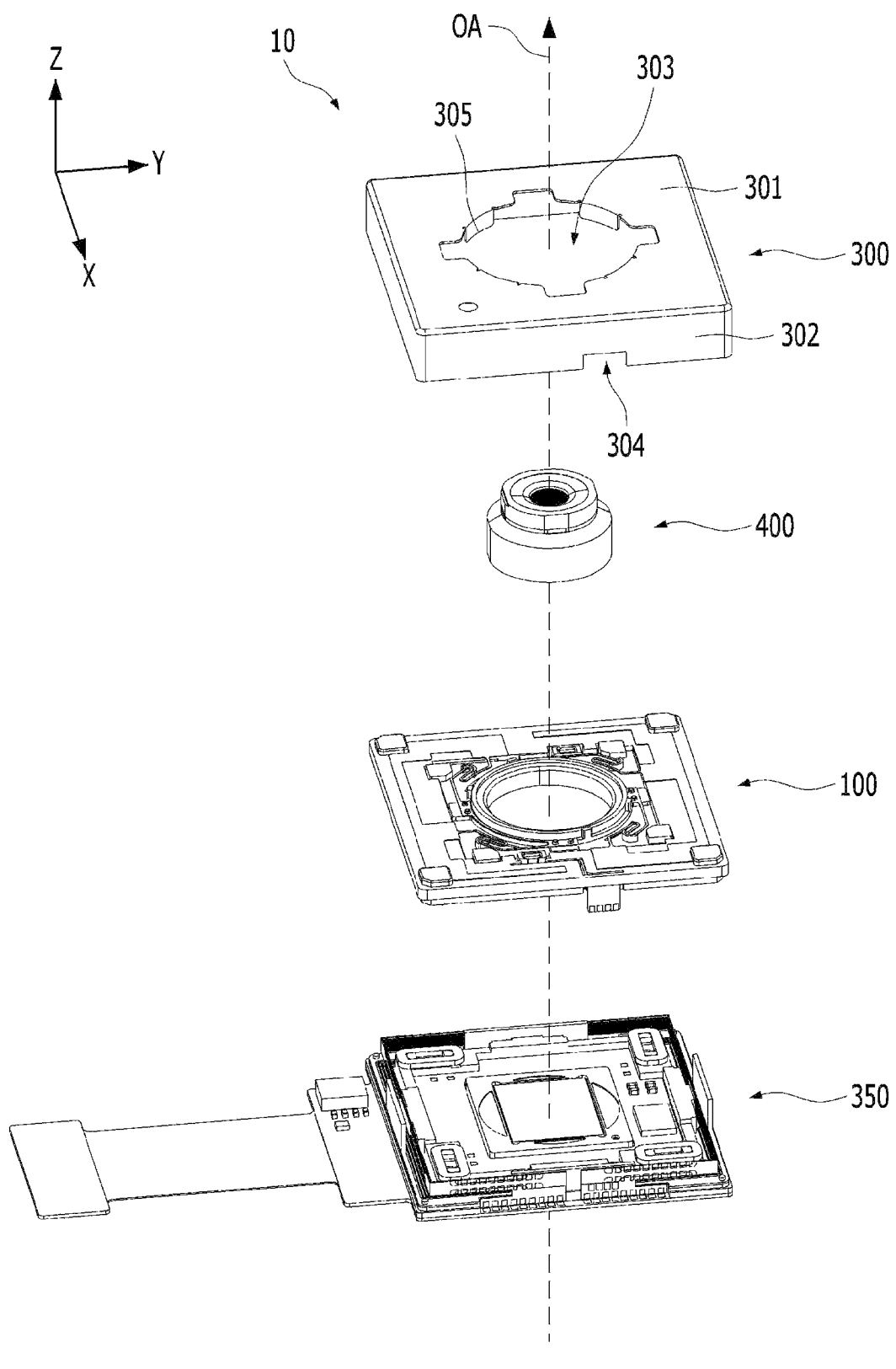
FIG. 3 is an exploded perspective view of the camera device in FIG. 1.
Figure 4A:
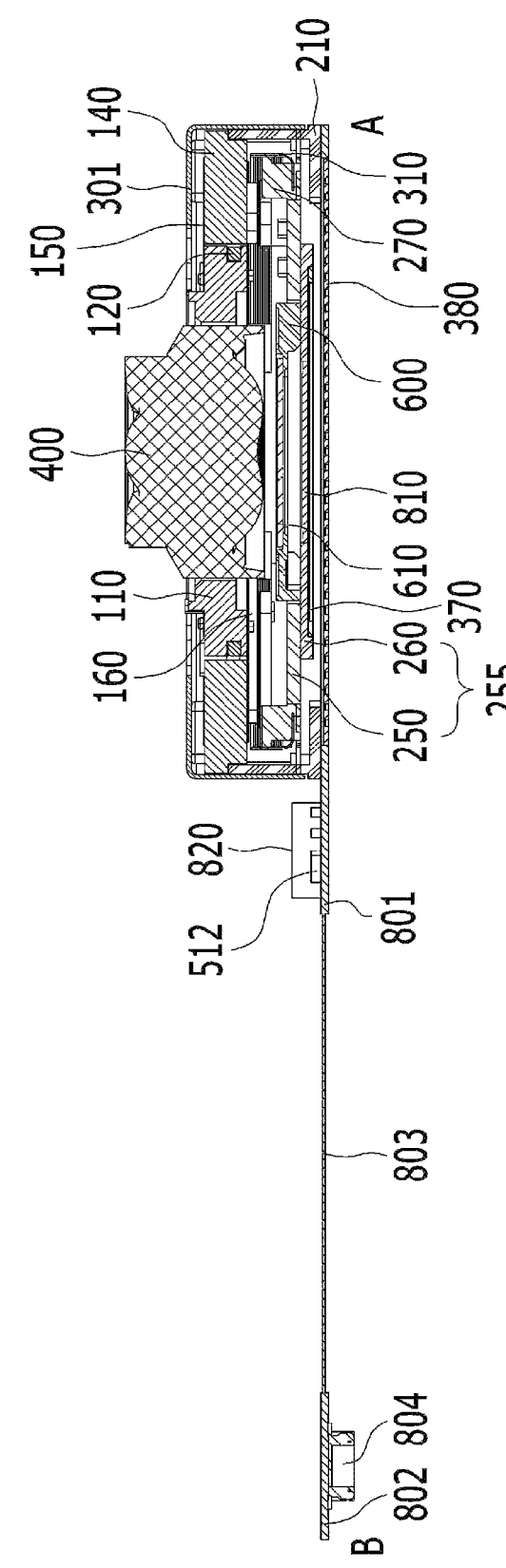
FIG. 4A is a cross-sectional view taken along line AB in the camera device in FIG. 1.
Figure 4B:
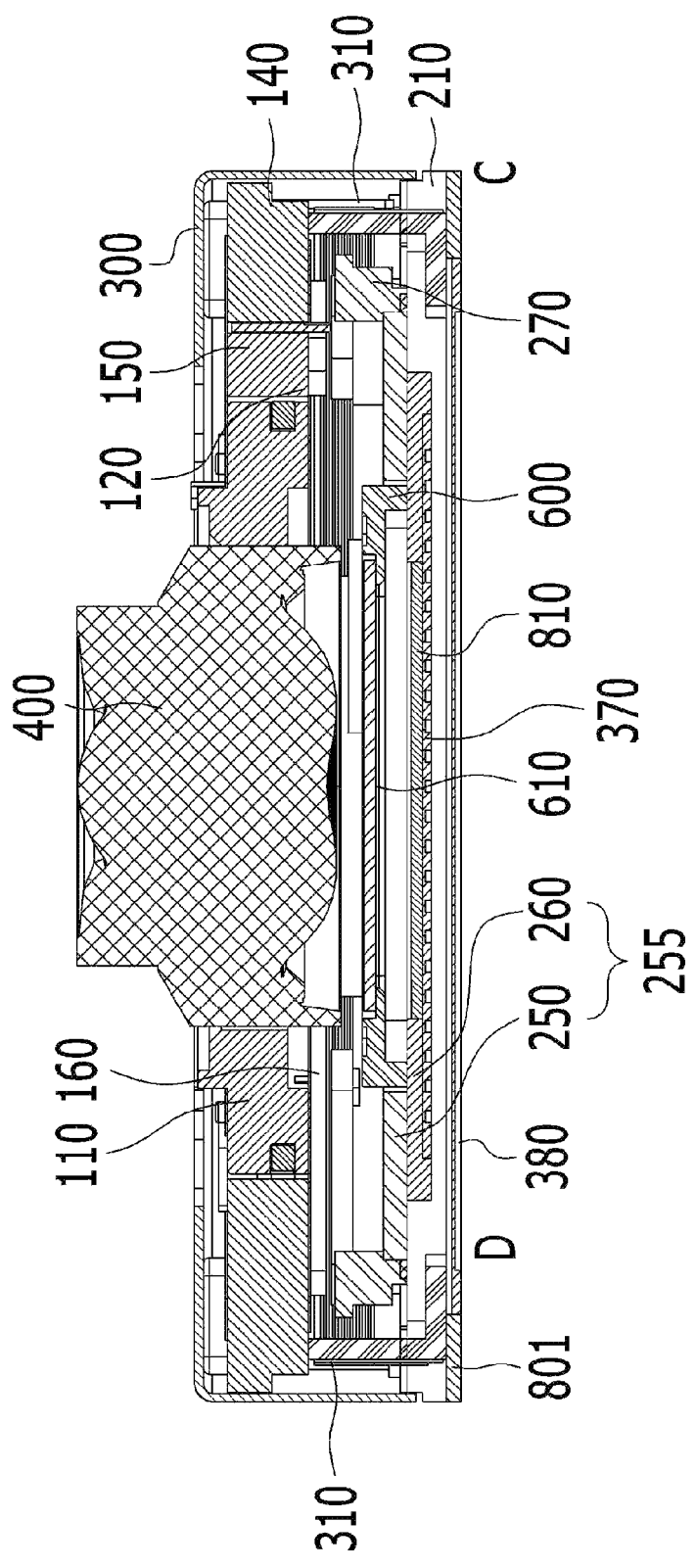
FIG. 4B is a cross-sectional view taken along line CD in the camera device in FIG. 1.
Figure 4C:
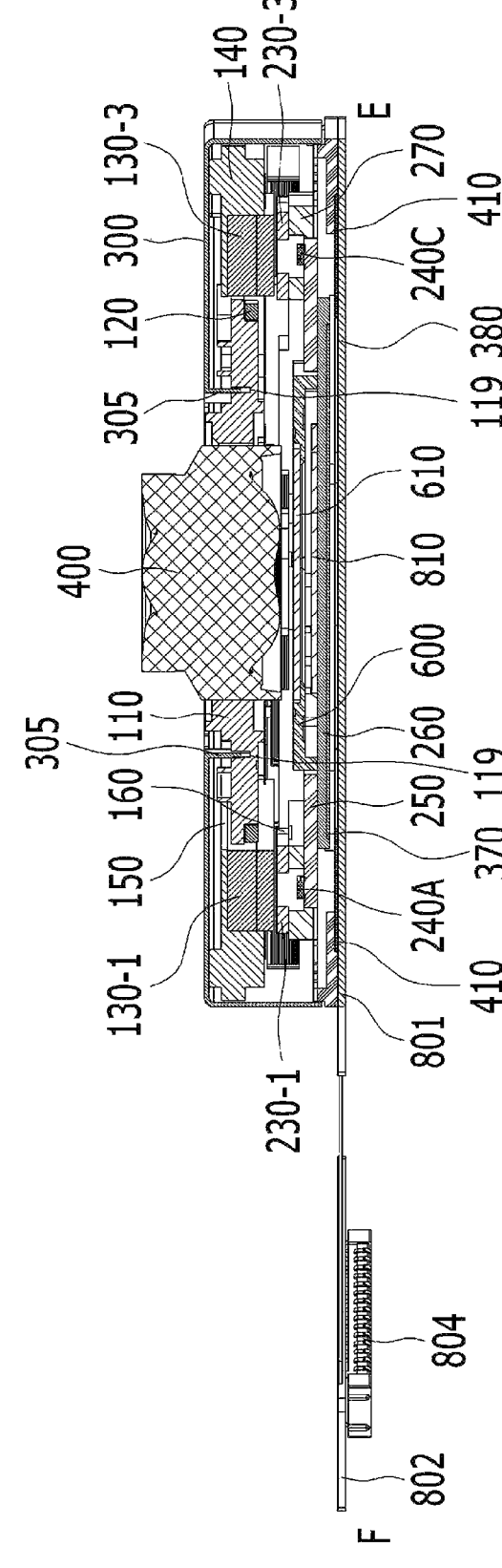
FIG. 4C is a cross-sectional view taken along line EF in the camera device in FIG. 1.
Figure 5:
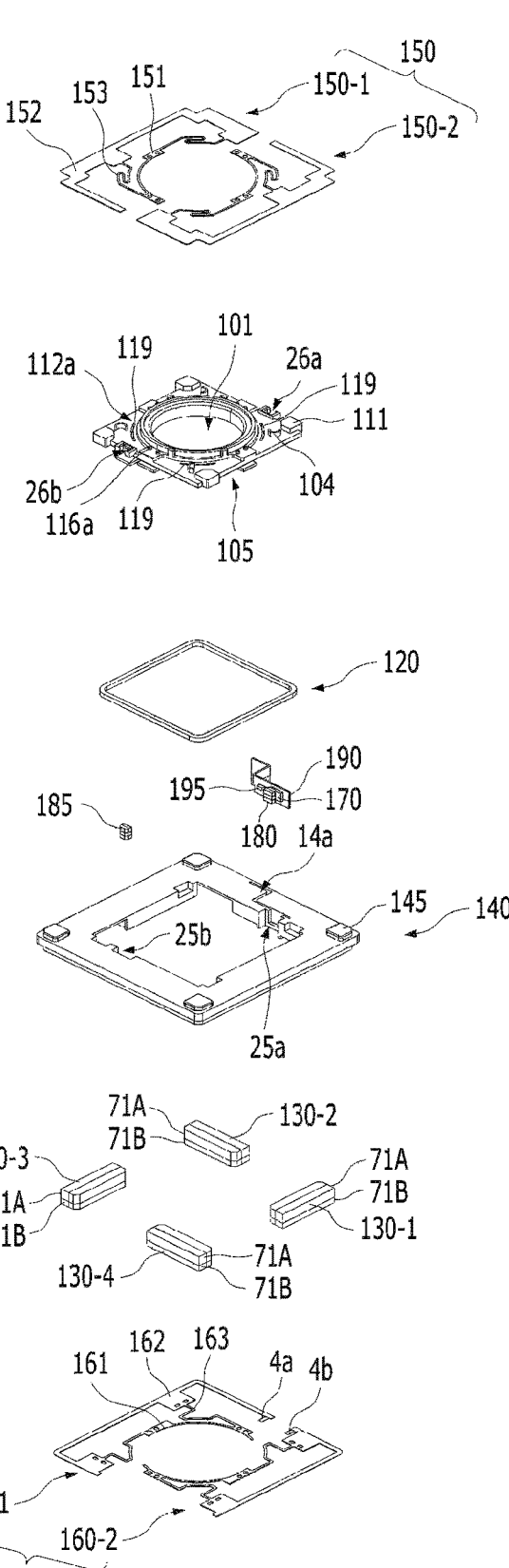
FIG. 5 is an exploded perspective view of the AF moving unit in FIG. 3.
Figure 6:
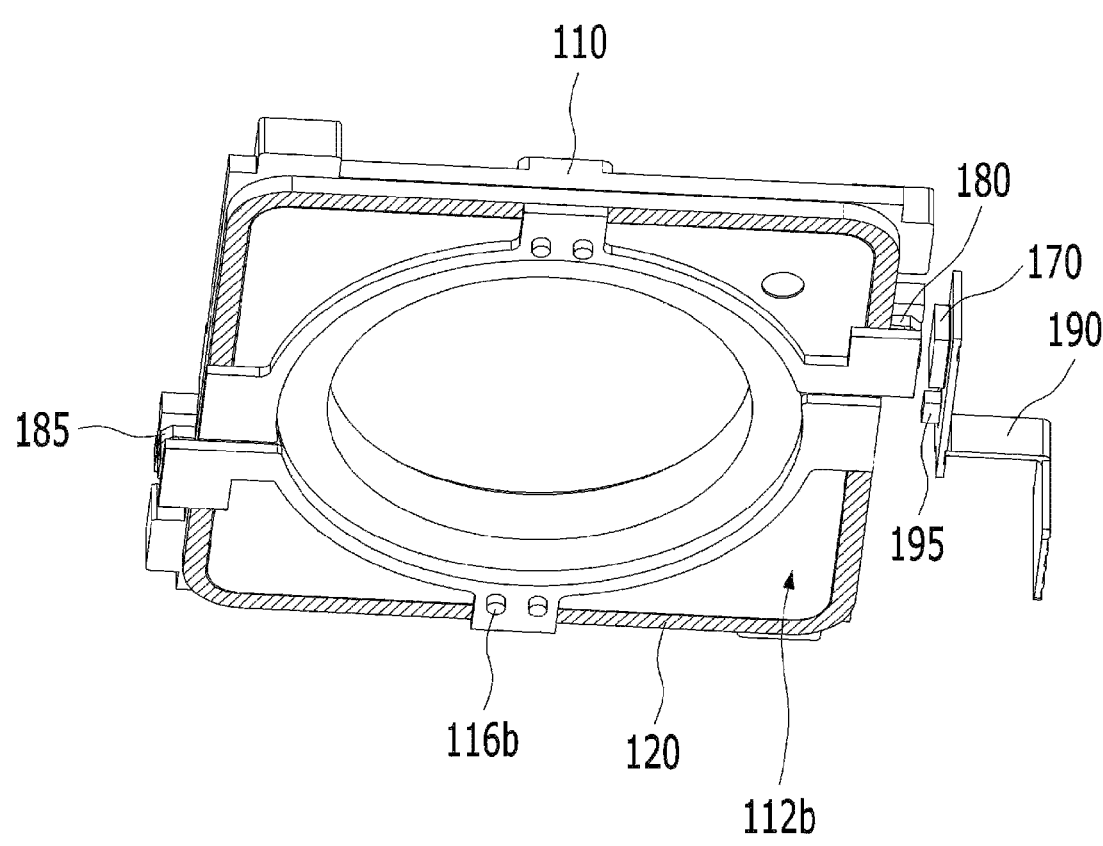
FIG. 6 is a perspective view of a bobbin, a sensing magnet, a balancing magnet, a first coil, a circuit board, a first position sensor, and a capacitor.
Figure 7:
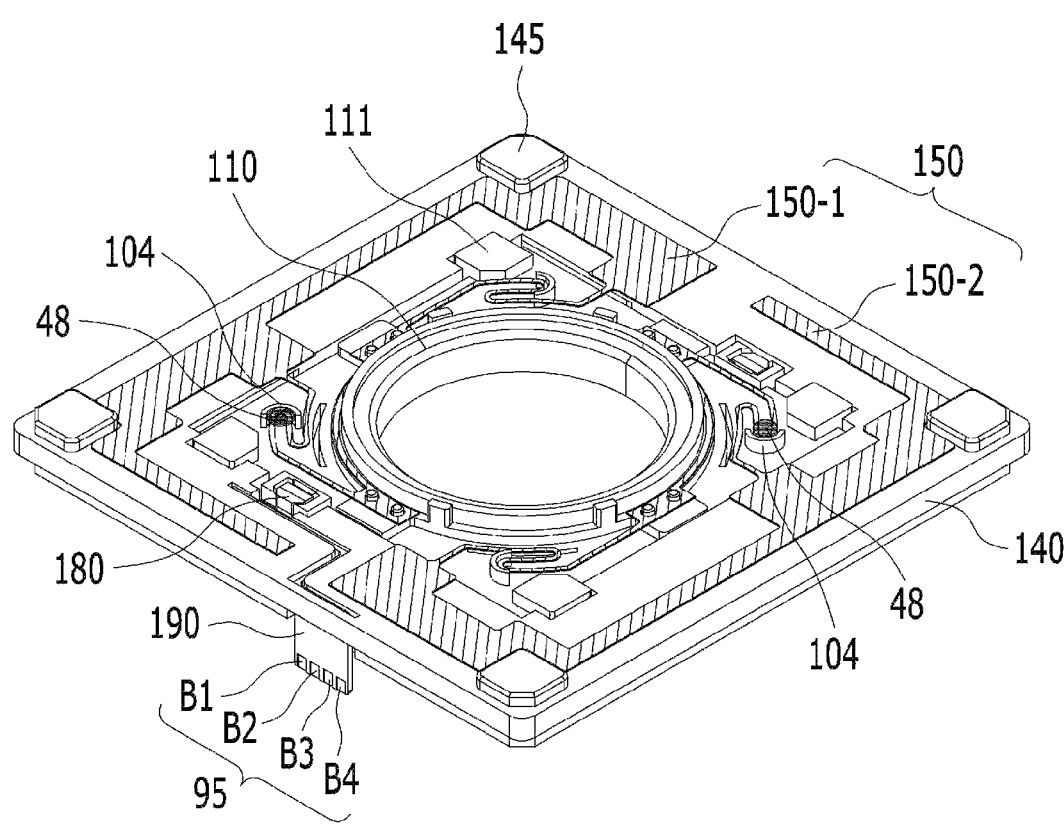
FIG. 7 is a perspective view of the bobbin, a housing, a circuit board, an upper elastic member, the sensing magnet, and the balancing magnet.
Figure 8:
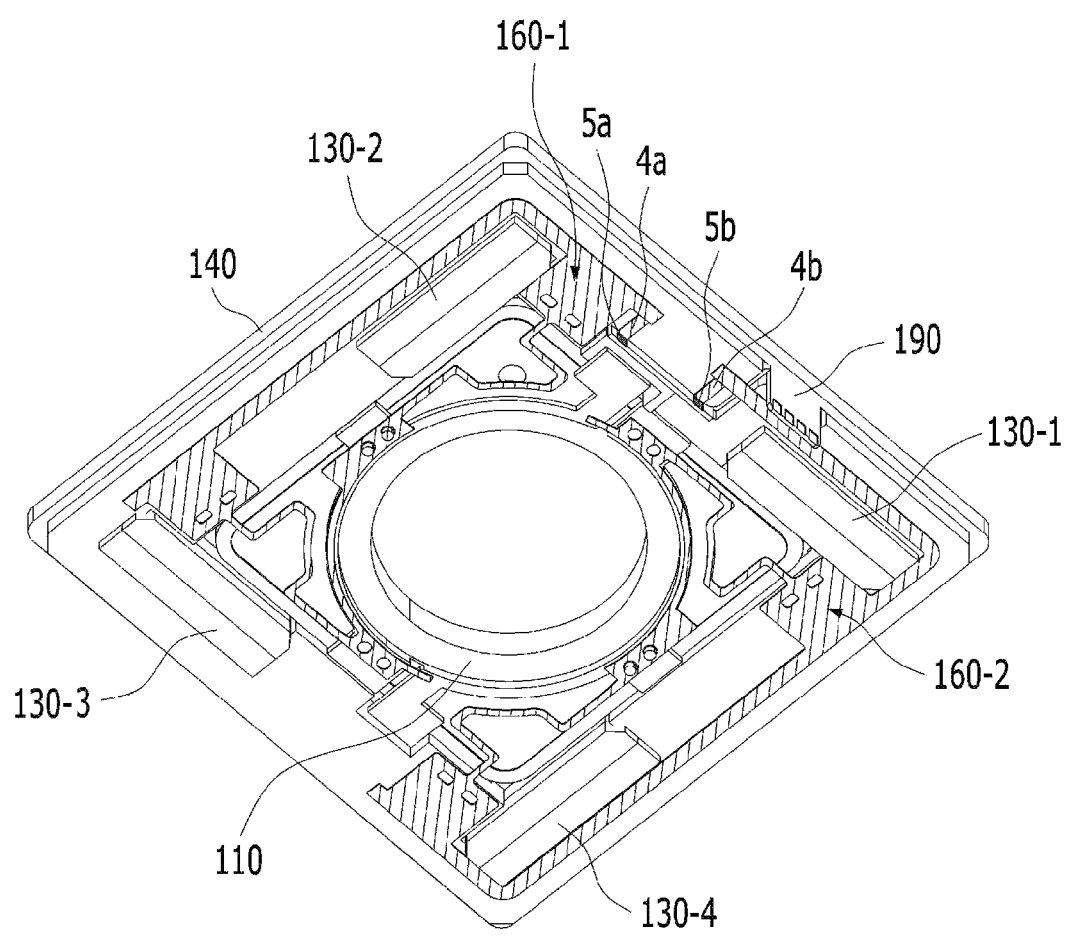
FIG. 8 is a bottom perspective view of the housing, the bobbin, a lower elastic member, a magnet, and the circuit board.

FIG. 1 is a perspective view of a camera device 10 according to an embodiment, FIG. 2 is a perspective view of the camera device 10, with a cover member 300 removed therefrom, FIG. 3 is an exploded perspective view of the camera device 10 in FIG. 1, FIG. 4A is a cross-sectional view taken along line AB in the camera device 10 in FIG. 1, FIG. 4B is a cross-sectional view taken along line CD in the camera device 10 in FIG. 1, FIG. 4C is a cross-sectional view taken along line EF in the camera device 10 in FIG. 1, FIG. 5 is an exploded perspective view of an AF moving unit 100 in FIG. 3, FIG. 6 is a perspective view of a bobbin 110, a sensing magnet 180, a balancing magnet 185, a first coil 120, a circuit board 190, a first position sensor 170, and a capacitor 195, FIG. 7 is a perspective view of the bobbin 110, a housing 140, the circuit board 190, an upper elastic member 150, the sensing magnet 180, and the balancing magnet 185, and FIG. 8 is a bottom perspective view of the housing 140, the bobbin 110, a lower elastic member 160, a magnet 130, and the circuit board 190.

Referring to FIGS. 1 to 8, the camera device 10 may include an AF moving unit 100 and an image sensor unit 350.

The camera device 10 may further include at least one of a cover member 300 or a lens module 400. The cover member 300 and a base 210 to be described later may constitute a case.

The AF moving unit 100 may be coupled to a lens module 400, and may move the lens module in the direction of the optical axis OA or a direction parallel to the optical axis, thereby performing the auto-focusing function of the camera device 10.

The image sensor unit 350 may include an image sensor 810. The image sensor unit 350 may move the image sensor 810 in a direction perpendicular to the optical axis. In addition, the image sensor unit 350 may tilt the image sensor 810 relative to the optical axis, or may rotate (or roll) the image sensor 810 about the optical axis. The hand-tremor compensation function of the camera device 10 may be performed by the image sensor unit 350.

In an example, the image sensor 810 may include a capture area for sensing the light that has passed through the lens module 400. Here, the capture area may alternatively be referred to as an "effective area", a "light-receiving area", an "active area", or a "pixel area". For example, the capture area of the image sensor 810 may be a portion into which the light that has passed through a filter 610 is introduced so as to form an image contained in the light, and may include at least one unit pixel. For example, the capture area may include a plurality of unit pixels.

The AF moving unit 100 may alternatively be referred to as a "lens moving unit" or a "lens moving apparatus". Alternatively, the AF moving unit 100 may alternatively be referred to as a "first moving unit (or second moving unit)", a "first actuator (or second actuator)", or an "AF driving unit".

In addition, the image sensor unit 350 may alternatively be referred to as an "image sensor moving unit", an "image sensor shift unit", a "sensor moving unit", or a "sensor shift unit". Alternatively, the image sensor unit 350 may be referred to as a "second moving unit (or first moving unit)" or a "second actuator (or first actuator)".

Referring to FIGS. 5 and 6, the AF moving unit 100 may move the lens module in the optical-axis direction. In an example, the AF moving unit 100 moves a bobbin 110 in the optical-axis direction. In an example, the AF moving unit 100 may include the bobbin 110, a first coil 120, a magnet 130, and a housing 140. The AF moving unit 100 may further include an upper elastic member 150 and a lower elastic member 160.

In addition, the AF moving unit 100 may further include a first position sensor 170, a circuit board 190, and a sensing magnet 180 in order to implement AF feedback. In addition, the AF moving unit 100 may further include at least one of a balancing magnet 185 or a capacitor 195.

The bobbin 110 may be disposed in the housing 140, and may be moved in the direction of the optical axis OA or the first direction (e.g. the z-axis direction) by the electromagnetic interaction between the first coil 120 and the magnet 130.

The bobbin 110 may have a bore formed therein in order to be coupled to the lens module 400 or to mount the lens module 400 therein. In an example, the bore in the bobbin 110 may be a through-hole formed through the bobbin 110 in the optical-axis direction, and may have a circular shape, an elliptical shape, or a polygonal shape, without being limited thereto.

The lens module 400 may include at least one lens and/or a lens barrel.

For example, the lens module 400 may include one or more lenses and a lens barrel accommodating the one or more lenses. However, the disclosure is not limited thereto. Any of various holding structures may be used in place of the lens barrel, so long as the same is capable of supporting one or more lenses.

In an example, the lens module 400 may be screwed to the bobbin 110. Alternatively, in another example, the lens module 400 may be coupled to the bobbin 110 by means of an adhesive (not shown). The light that has passed through the lens module 400 may pass through the filter 610, and may be introduced into the image sensor 810.

The bobbin 110 may be provided on the outer surface thereof with a protruding portion 111. In an example, the protruding portion 111 may protrude in a direction parallel to a line perpendicular to the optical axis OA. However, the disclosure is not limited thereto.

The protruding portion 111 of the bobbin 110 may correspond to a recess portion 25a in the housing 140, and may be inserted into or disposed in the recess portion 25a in the housing 140. The protruding portion 111 may suppress or inhibit the bobbin 110 from rotating beyond a predetermined range about the optical axis. In addition, the protruding portion 111 may serve as a stopper for inhibiting the bobbin 110 from moving beyond a predetermined range in the optical-axis direction (e.g. the direction from the upper elastic member 150 toward the lower elastic member 160) due to external impacts or the like.

The bobbin 110 may have a first escape recess 112a formed in the upper surface thereof to avoid spatial interference with a first frame connection portion 153 of the upper elastic member 150. In addition, the bobbin 110 may have a second escape recess 112b formed in the lower surface thereof to avoid spatial interference with a second frame connection portion 163 of the lower elastic member 160.

The bobbin 110 may include a first coupling portion 116a in order to be coupled or secured to the upper elastic member 150. In an example, the first coupling portion 116a of the bobbin 110 may take the form of a protrusion, but the disclosure is not limited thereto. In another embodiment, the first coupling portion 116a of the bobbin 110 may take the form of a flat surface or a recess.

In addition, the bobbin 110 may include a second coupling portion 116b in order to be coupled or secured to the lower elastic member 160. In an example, the second coupling portion 116b of the bobbin 110 may take the form of a protrusion, but the disclosure is not limited thereto. In another embodiment, the second coupling portion 116b of the bobbin 110 may take the form of a flat surface or a recess.

Referring to FIG. 5, the bobbin 110 may have a recess 105 formed in the outer surface thereof to allow the first coil 120 to be seated, inserted, or disposed thereinto. The recess 105 in the bobbin 110 may have a closed curve shape (e.g. a ring shape), which coincides with the shape of the first coil 120.

In addition, the bobbin 110 may have a first seating recess 26a formed in the outer surface thereof to allow the sensing magnet 180 to be seated, inserted, secured, or disposed therein. In addition, the bobbin 110 may have a second seating recess 26b formed in the outer surface thereof to allow the balancing magnet 185 to be seated, inserted, secured, or disposed therein. In an example, the first and second seating recesses 26a and 26b in the bobbin 110 may be formed in the outer surfaces of the bobbin 110 that face each other.

Referring to FIGS. 5 and 7, a damper 48 may be disposed between the bobbin 110 and the upper elastic member 150. In an example, the damper 48 may be disposed between the bobbin 110 and the first frame connection portion 153 of the upper elastic member 150, and may be in contact with, coupled to, or attached to the bobbin 110 and the first frame connection portion 153.

In an example, the bobbin 110 may be provided with a protrusion 104 protruding from the upper surface thereof so as to correspond to the first frame connection portion 153 of the upper elastic member 150. In an example, the protrusion 104 may protrude from the bottom surface of the first escape recess in the bobbin 110.

The damper 48 may be disposed between the protrusion 104 of the bobbin 110 and the first frame connection portion 153 of the upper elastic member 150. The damper 48 may be in contact with and attached to the protrusion 104 of the bobbin 110 and the first frame connection portion 153, and may serve to alleviate or absorb vibration of the bobbin 110. For example, the damper 48 may be embodied as a damping member (e.g. silicon). The protrusion 104 may serve to guide the damper 48.

The bobbin 110 may have a groove 119 or a groove portion formed in the upper surface thereof at a position corresponding to, facing, or overlapping the protruding portion 305 of the cover member 300 in the first direction (or the optical-axis direction). In an example, the groove 119 may be formed so as to be depressed into the bottom surface of the first escape recess 112a. In another embodiment, the groove 119 may be formed so as to be depressed into the upper surface of the bobbin 110.

The first coil 120 may be disposed on or coupled to the bobbin 110. In an example, the first coil 120 may be disposed on the outer surface of the bobbin 110. In an example, the first coil 120 may surround the outer surface of the bobbin 110 in the direction of rotation about the optical axis OA, but the disclosure is not limited thereto.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a drive signal may be supplied to the first coil 120. The power or the drive signal supplied to the first coil 120 may be a DC signal, an AC signal, or a signal containing both DC and AC components, and may be of a voltage type or a current type.

When a drive signal (e.g. drive current) is supplied to the first coil 120, electromagnetic force may be generated by electromagnetic interaction with the magnet 130, and the bobbin 110 may be moved in the direction of the optical axis OA by the generated electromagnetic force.

At the initial position of an AF operation unit, the bobbin 110 may be movable upwards or downwards, which is referred to as bidirectional driving of the AF operation unit. Alternatively, at the initial position of the AF operation unit, the bobbin 110 may be movable upwards, which is referred to as unidirectional driving of the AF operation unit.

For example, the maximum stroke of the bobbin 110 in the upward direction from the initial position thereof may be 400 micrometers to 500 micrometers, and the maximum stroke of the bobbin 110 in the downward direction from the initial position thereof may be 100 micrometers to 200 micrometers.

At the initial position of the AF operation unit, the first coil 120 may be disposed so as to correspond to or overlap the magnet 130, which is disposed in the housing 140, in a direction parallel to a line that is perpendicular to the optical axis OA and extends through the optical axis.

In an example, the AF operation unit may include the bobbin 110 and components coupled to the bobbin 110 (e.g. the first coil 120, the sensing magnet 180, and the balancing magnet 185). In addition, the AF operation unit may further include the lens module 400.

The initial position of the AF operation unit may be the original position of the AF operation unit in the state in which no electric power is supplied to the first coil 120 or the position at which the AF operation unit is located as the result of the upper and lower elastic members 150 and 160 being elastically deformed due only to the weight of the AF operation unit. In addition, the initial position of the bobbin 110 may be the position at which the AF operation unit is located when gravity acts in the direction from the bobbin 110 toward the base 210 or when gravity acts in the direction from the base 210 toward the bobbin 110.

The sensing magnet 180 may provide a magnetic field, which is detected by the first position sensor 170, and the balancing magnet 185 may cancel out the influence of the magnetic field of the sensing magnet 180 and may establish weight equilibrium with the sensing magnet 180.

The sensing magnet 180 may alternatively be referred to as a "sensor magnet" or a "second magnet". The sensing magnet 180 may be disposed on the bobbin 110, or may be coupled to the bobbin 110. The sensing magnet 180 may be disposed so as to face the first position sensor 170. The balancing magnet 185 may be disposed on the bobbin 110, or may be coupled to the bobbin 110. In an example, the balancing magnet 185 may be disposed opposite the sensing magnet 180.

In an example, each of the sensing magnet 180 and the balancing magnet 185 may be a unipolar magnet, which has one N pole and one S pole, but the disclosure is not limited thereto. In another embodiment, each of the sensing magnet 180 and the balancing magnet 185 may be a bipolar magnet or a 4-pole magnet, which includes two N poles and two S poles.

The sensing magnet 180 may be moved together with the bobbin 110 in the optical-axis direction, and the first position sensor 170 may detect the intensity of the magnetic field or the magnetic force of the sensing magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

The housing 140 may be disposed in the cover member 300. In an example, the housing 140 may be disposed on the image sensor unit 350.

The housing 140 may accommodate therein the bobbin 110, and may support the magnet 130, the first position sensor 170, and the circuit board 190.

Referring to FIGS. 5, 7, and 8, the housing 140 may be formed so as to take the overall shape of a hollow column. In an example, the housing 140 may have a polygonal (e.g. quadrangular or octagonal) or circular bore formed therein, and the bore in the housing 140 may take the form of a through-hole formed through the housing 140 in the optical-axis direction.

The housing 140 may include side portions, which correspond to or face side plates 302 of the cover member 300, and corners, which correspond to or face the corners of the cover member 300.

The housing 300 may be provided on the upper portion, the upper surface, or the upper end thereof with a stopper 145 in order to be inhibited from directly colliding with the inner surface of the upper plate 301 of the cover member 300.

Referring to FIG. 5, the housing 140 may have a mounting groove (or a seating groove) 14a formed therein to accommodate the circuit board 190. The mounting groove 14a may have a shape coinciding with the shape of the circuit board 190.

Referring to FIG. 7, the housing 140 may have an opening formed therein to expose terminals B1 to B4 of a terminal unit 95 of the circuit board 190 therethrough. The opening may be formed in the side portion of the housing 140.

The housing 140 may be provided on the upper portion, the upper end, or the upper surface thereof with at least one first coupling portion for coupling to a first outer frame 152 of the upper elastic member 150. The housing 140 may be provided on the lower portion, the lower end, or the lower surface thereof with a second coupling portion for coupling and securing to a second outer frame 162 of the lower elastic member 160. For example, each of the first and second coupling portions of the housing 140 may be formed in the shape of a flat surface, a protrusion, or a recess.

The magnet 130 may be disposed on the housing 140, which is a fixed part. In an example, the magnet 130 may be disposed on the side portion of the housing 140. The magnet 130 may be a driving magnet for implementing AF operation. In another embodiment, the magnet 130 may be disposed on the corner portion of the housing.

For example, the magnet 130 may include a plurality of magnet units. In an example, the magnet 130 may include first to fourth magnet units 130-1 to 130-4 disposed on the housing 140. In another embodiment, the magnet 130 may include two or more magnet units.

The magnet 130 may be disposed on at least one of the side portion or the corner of the housing 140. In an example, at least a portion of the magnet 130 may be disposed on the side portion or the corner of the housing 140. Alternatively, in another example, at least a portion of the magnet 130 may be disposed on the corner of the housing 140, and the remaining portion of the magnet 130 may be disposed on the side portion of the housing 140.

For example, each of the magnet units 130-1 to 130-4 may include a first portion disposed on a corresponding corner, among the four corners of the housing 130. In addition, each of the magnet units 130-1 to 130-4 may include a second portion disposed on the side portion of the housing 140 that is adjacent to the corresponding corner of the housing 140.

In an example, the first magnet unit 130-1 and the second magnet unit 130-2 may correspond to or face each other in the first horizontal direction (e.g. the y-axis direction). The second magnet unit 130-2 and the third magnet unit 130-3 may correspond to or face each other in the second horizontal direction (e.g. the x-axis direction). The third magnet unit 130-3 and the fourth magnet unit 130-4 may correspond to or face each other in the first horizontal direction (e.g. the y-axis direction). The fourth magnet unit 130-4 and the first magnet unit 130-1 may correspond to or face each other in the second horizontal direction (e.g. the x-axis direction).

At the initial position of the AF operation unit, the magnet 130 may be disposed on the housing 140 such that at least a portion thereof overlaps the first coil 120 in a direction parallel to a line that is perpendicular to the optical axis OA and extends through the optical axis OA.

The magnet 130 may be a unipolar magnet, which has one N pole and one S pole. In another embodiment, the magnet 130 may be a bipolar magnet or a 4-pole magnet, which includes two N poles and two S poles.

In an example, the magnet 130 may be a common magnet for implementing AF operation and OIS operation.

The circuit board 190 may be disposed in the housing 140. The first position sensor 170 may be disposed or mounted on the circuit board 190, and may be conductively connected to the circuit board 190. In an example, the circuit board 190 may be disposed in the mounting groove 14a in the housing 140, and the terminals 95 of the circuit board 190 may be exposed outside the housing 140.

The circuit board 190 may be provided with a terminal unit 95 including a plurality of terminals B1 to B4 for conductive connection to an external terminal or an external device. The plurality of terminals B1 to B4 of the circuit board 190 may be conductively connected to the first position sensor 170.

The first position sensor 170 may be disposed on a first surface of the circuit board 190, and the plurality of terminals B1 to B4 may be disposed on a second surface of the circuit board 190. Here, the second surface of the circuit board 190 may be a surface opposite the first surface of the circuit board 190. For example, the first surface of the circuit board 190 may be the surface of the circuit board 190 that faces the bobbin 110 or the sensing magnet 180.

For example, the circuit board 190 may be a printed circuit board or a flexible printed circuit board (FPCB).

The circuit board 190 may include a circuit pattern or wiring (not shown) for conductively connecting the first to fourth terminals B1 to B4 to the first position sensor 170.

In an example, at the initial position of the AF operation unit, at least a portion of the first position sensor 170 may face or overlap the sensing magnet 180 in a direction parallel to a line that is perpendicular to the optical axis OA and extends through the optical axis OA. In another embodiment, at the initial position of the AF operation unit, the first position sensor may not face or overlap the sensing magnet.

The first position sensor 170 serves to detect the movement, displacement, or position of the bobbin 110 in the optical-axis direction. That is, when the bobbin 110 is moved, the first position sensor 170 may detect the magnetic field or the intensity of the magnetic field of the sensing magnet 180 mounted to the bobbin 110, and may output an output signal corresponding to the result of the detection. The movement, displacement, or position of the bobbin 110 in the optical-axis direction may be detected using the output from the first position sensor 170.

The first position sensor 170 may be a driver IC including a Hall sensor and a driver. The first position sensor 170 may include first to fourth terminals for transmitting and receiving data to and from the outside through data communication using a protocol, such as I2C communication, and fifth and sixth terminals for directly supplying a drive signal to the first coil 120.

The first position sensor 170 may be conductively connected to the first to fourth terminals B1 to B4 of the circuit board 190. In an example, each of the first to fourth terminals of the first position sensor 170 may be conductively connected to a corresponding one of the first to fourth terminals B1 to B4 of the circuit board 190.

The fifth and sixth terminals of the first position sensor 170 may be conductively connected to the first coil 120. In an example, the first position sensor 170 may be conductively connected to the first coil 120 via at least one of the upper elastic member 150 or the lower elastic member 160, and may supply a drive signal to the first coil 120.

In an example, a portion of the first lower elastic member 160-1 may be connected to one end of the first coil 120, and another portion of the first lower elastic member 160-1 may be conductively connected to the circuit board 190. A portion of the second lower elastic member 160-2 may be connected to the other end of the first coil 120, and another portion of the second lower elastic member 160-2 may be conductively connected to the circuit board 190. The fifth and sixth terminals of the first position sensor 170 may be conductively connected to the first and second lower elastic members 160-1 and 160-2 and the first coil 120 via the circuit board 190.

In another embodiment, the first coil may be conductively connected to the circuit board 190 and the fifth and sixth terminals of the first position sensor 170 via the two upper elastic members.

For example, in an embodiment in which the first position sensor 170 is a driver IC, the first and second terminals B1 and B2 of the circuit board 190 may be a power terminal for supplying power, the third terminal may be a terminal for transmitting and receiving a clock signal, and the fourth terminal may be a terminal for transmitting and receiving a data signal.

In another embodiment, the first position sensor 170 may be a Hall sensor. In this case, the first position sensor 170 may include two input terminals for receiving a drive signal or power supplied thereto and two output terminals for outputting a sensing voltage (or output voltage). In an example, a drive signal may be supplied to the first position sensor 170 through the first and second terminals B1 and B2 of the circuit board 190, and the output from the first position sensor 170 may be output to the outside through the third and fourth terminals B3 and B4. In addition, the first coil 120 may be conductively connected to the circuit board 190. The circuit board 190 may further include two separate terminals in addition to the first to fourth terminals B1 to B4, and a drive signal may be supplied to the first coil 120 from outside through the two separate terminals.

In an example, among the power terminals of the first position sensor 170, a ground terminal may be conductively connected to the cover member 300.

The capacitor 195 may be disposed or mounted on the first surface of the circuit board 190. The capacitor 195 may be of a chip type. In this case, the chip may include a first terminal, which corresponds to one end of the capacitor 195, and a second terminal, which corresponds to the other end of the capacitor 195. The capacitor 195 may alternatively be referred to as a "capacitive element" or a "condenser".

The capacitor 195 may be conductively connected in parallel to the first and second terminals B1 and B2 of the circuit board 190, through which power (or a drive signal) is supplied to the first position sensor 170 from the outside. Alternatively, the capacitor 195 may be conductively connected in parallel to the terminals of the first position sensor 170, which are conductively connected to the first and second terminals B1 and B2 of the circuit board 190.

Since the capacitor 195 is conductively connected in parallel to the first and second terminals B1 and B2 of the circuit board 190, the capacitor 195 may serve as a smoothing circuit for removing ripple components included in power signals GND and VDD, which are supplied to the first position sensor 170 from the outside, and thus may supply stable and consistent power signals to the first position sensor 170.

The upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The upper elastic member 150 may include a plurality of upper elastic units 150-1 and 150-2, which are conductively separated or isolated from each other, and the lower elastic member 160 may include a plurality of lower elastic units 160-1 and 160-2, which are conductively separated or isolated from each other.

Although each of the upper elastic member and the lower elastic member is described as including two elastic units, the disclosure is not limited thereto. In another embodiment, at least one of the upper elastic member or the lower elastic member may be embodied as a single unit or a single construction.

The upper elastic member 150 may further include a first inner frame 151 coupled or secured to the upper portion, the upper surface, or the upper end of the bobbin 110, a second inner frame 152 coupled or secured to the upper portion, the upper surface, or the upper end of the housing 140, and a first frame connection portion 153 interconnecting the first inner frame 151 and the first outer frame 152.

The lower elastic member 160 may further include a second inner frame 161 coupled or secured to the lower portion, the lower surface, or the lower end of the bobbin 110, a second outer frame 162 coupled or secured to the lower portion, the lower surface, or the lower end of the housing 140, and a second frame connection portion 163 interconnecting the second inner frame 161 and the second outer frame 162. The inner frame may alternatively be referred to as an "inner portion", the outer frame may alternatively be referred to as an "outer portion", and the frame connection portion may alternatively be referred to as a "connection portion".

Each of the first and second frame connection portions 153 and 163 may be formed so as to be bent or curved at least once to form a predetermined pattern.

Each of the upper elastic member 150 and the lower elastic member 160 may be formed of a conductive material, such as a metal material. In addition, each of the upper elastic member 150 and the lower elastic member 160 may be embodied as an elastic member, such as a leaf spring.

Referring to FIG. 8, the circuit board 190 may be provided with two pads 5a and 5b. The two pads 5a and 5b may be conductively connected to the first position sensor 170. In an example, the two pads 5a and 5b may be conductively connected to the fifth and sixth terminals of the first position sensor 170.

In addition, the first pad 5a of the circuit board 190 may be conductively connected to the first lower elastic unit 160-1, and the second pad 5b of the circuit board 190 may be conductively connected to the second lower elastic unit 160-2.

In an example, the second outer frame 162 of the first lower elastic unit 160-1 may include a first bonding portion 4a, which is coupled or conductively connected to the first pad 5a of the circuit board 190, and the second outer frame 162 of the second lower elastic unit 160-2 may include a second bonding unit 4b, which is conductively connected to the second pad 5b of the circuit board 190.

In another embodiment, at least one of the upper elastic member 150 or the lower elastic member 160 may include two elastic members. In an example, each of the two elastic members of any one of the upper elastic member 150 and the lower elastic member 160 may be coupled or conductively connected to a corresponding one of the first and second pads of the circuit board 190, and the first coil 120 may be conductively connected to the two elastic members.

Figure 9:
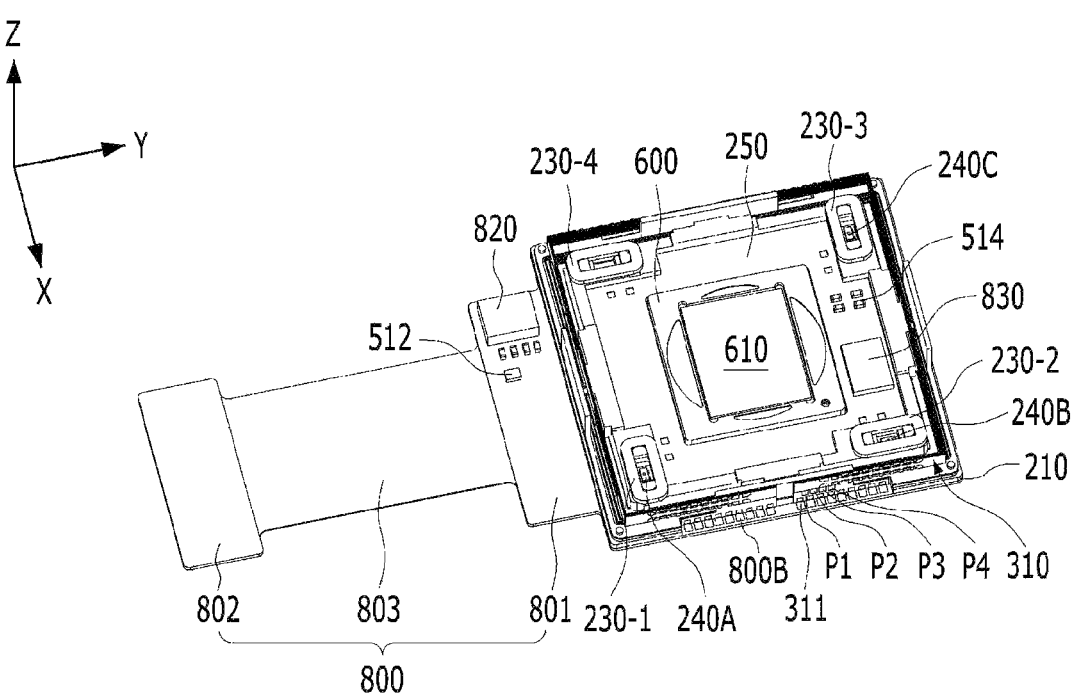
FIG. 9 is a perspective view of the image sensor unit.
Figure 10A:
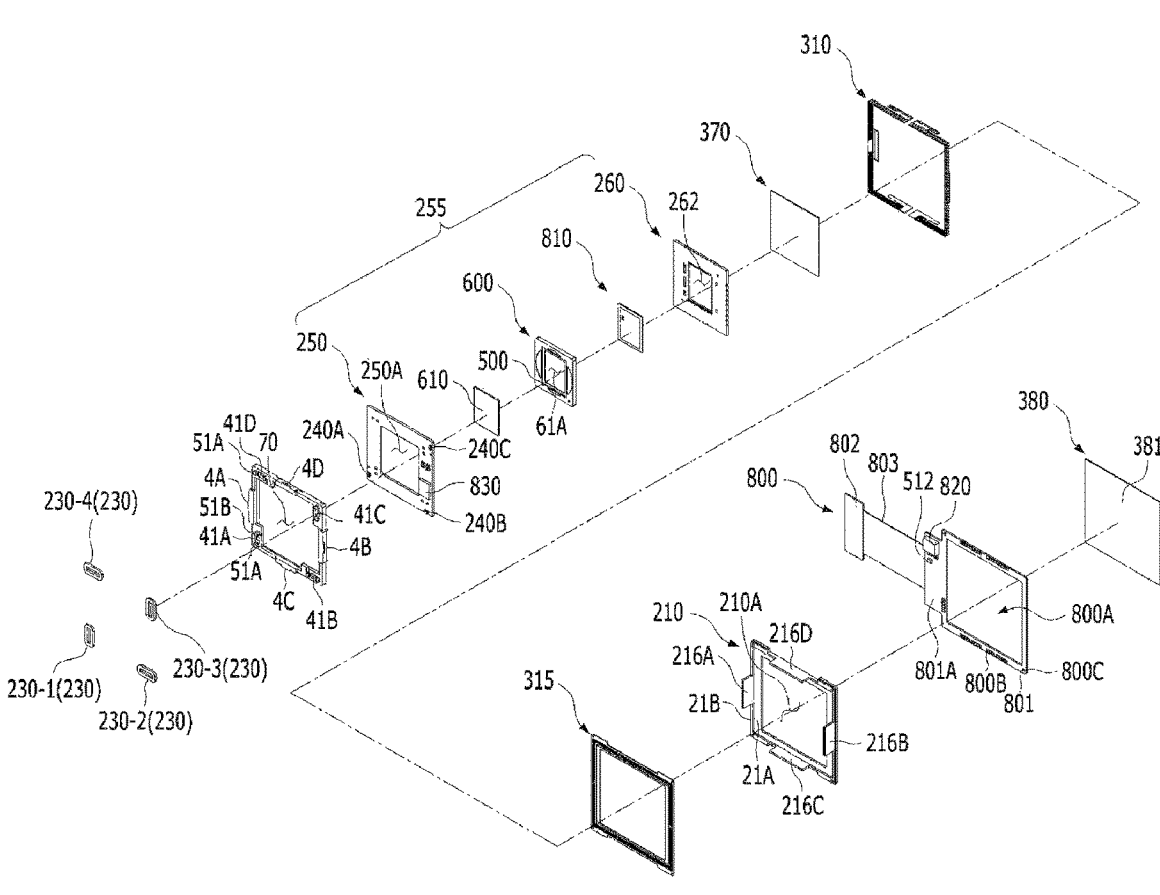
FIG. 10A is a first exploded perspective view of the image sensor unit in FIG. 9.
Figure 10B:
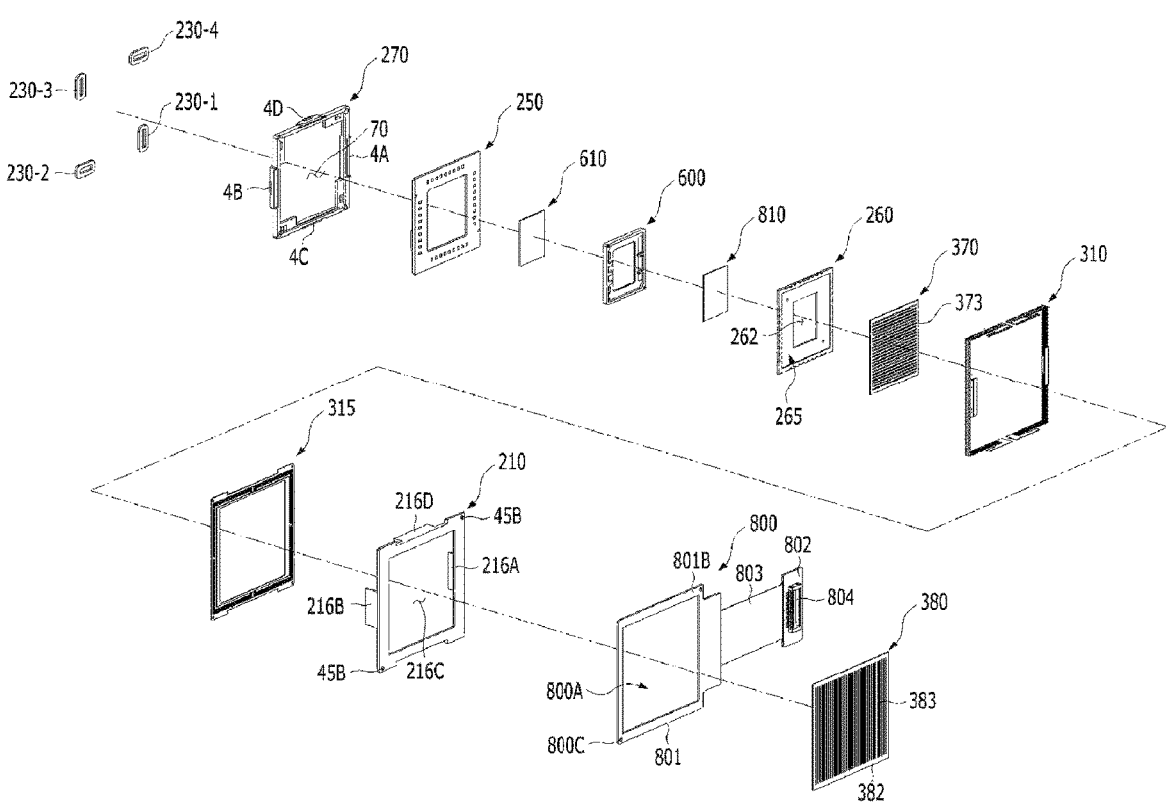
FIG. 10B is a second exploded perspective view of the image sensor unit in FIG. 9.
Figure 11:
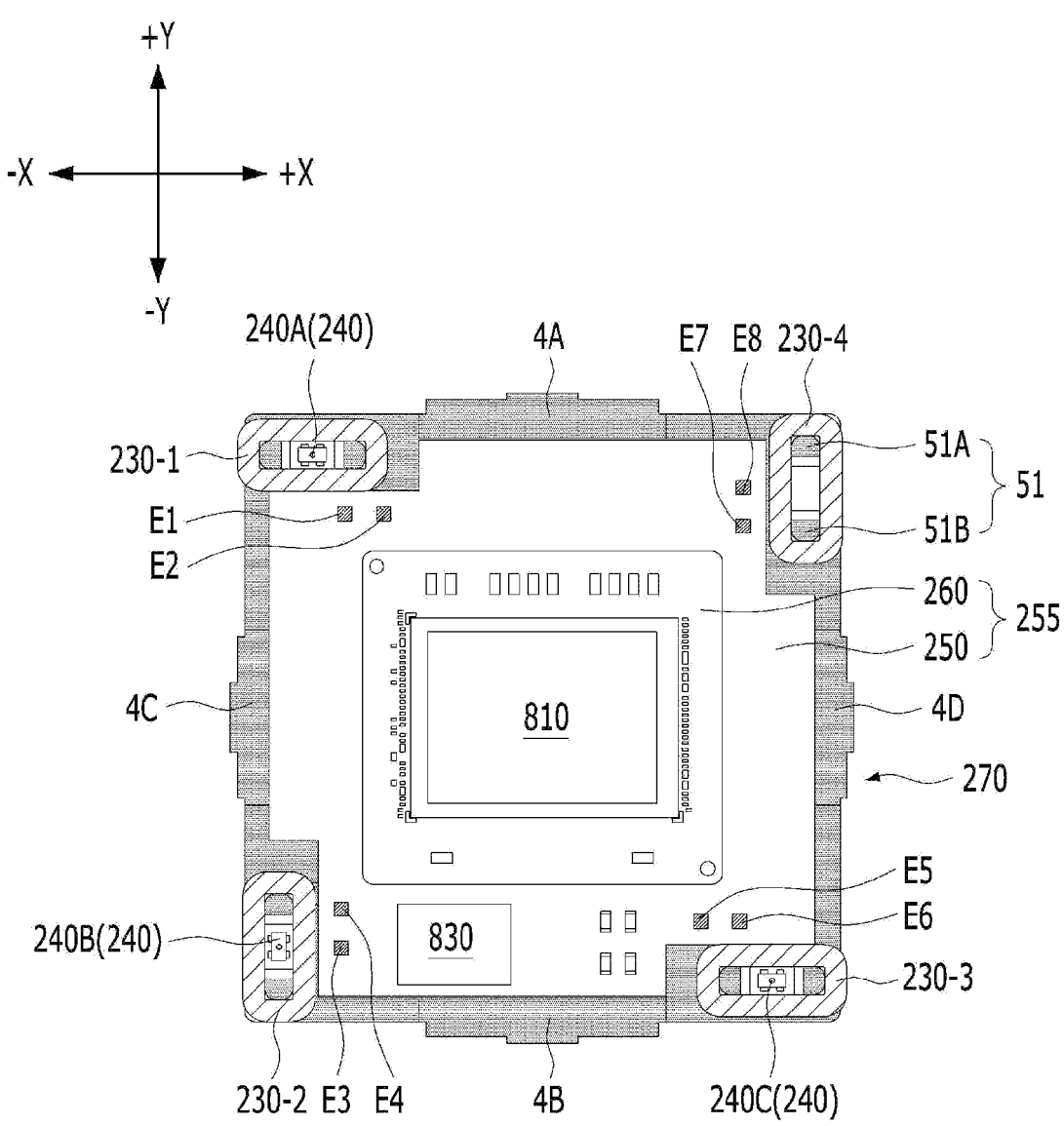
FIG. 11 is a perspective view of the holder, the second coil, the image sensor, the OIS position sensor, and the first board unit in FIG. 10A.
Figure 12A:
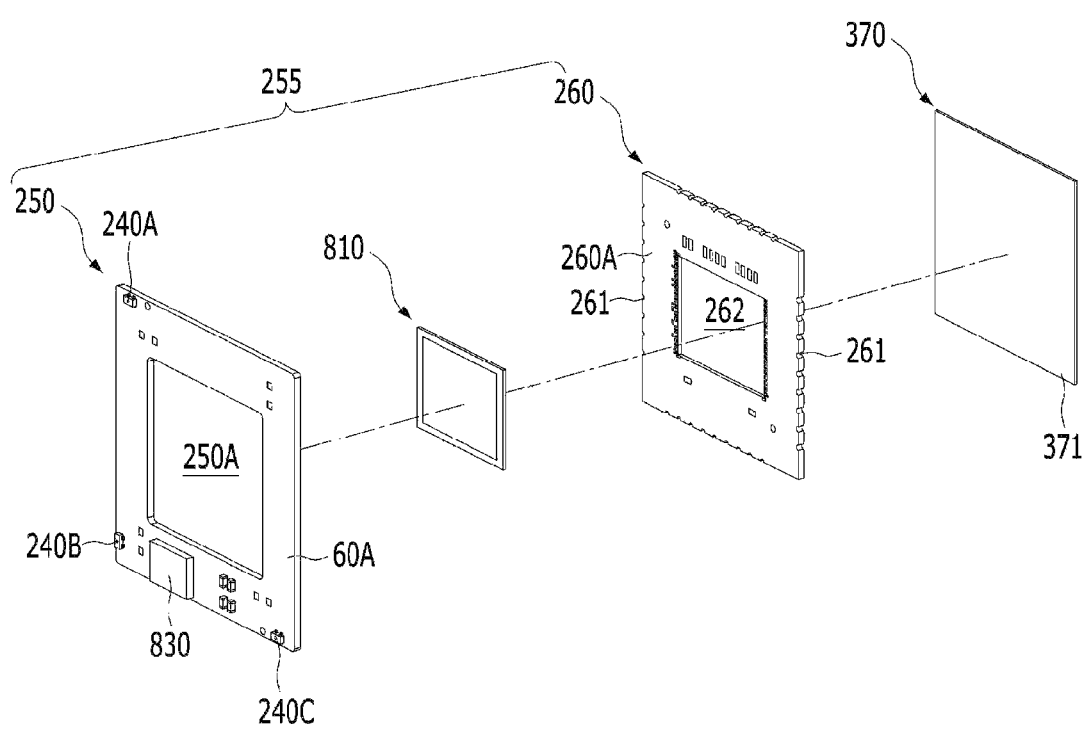
FIG. 12A is a first perspective view of the first board unit, the image sensor, and a first heat dissipation member.
Figure 12B:
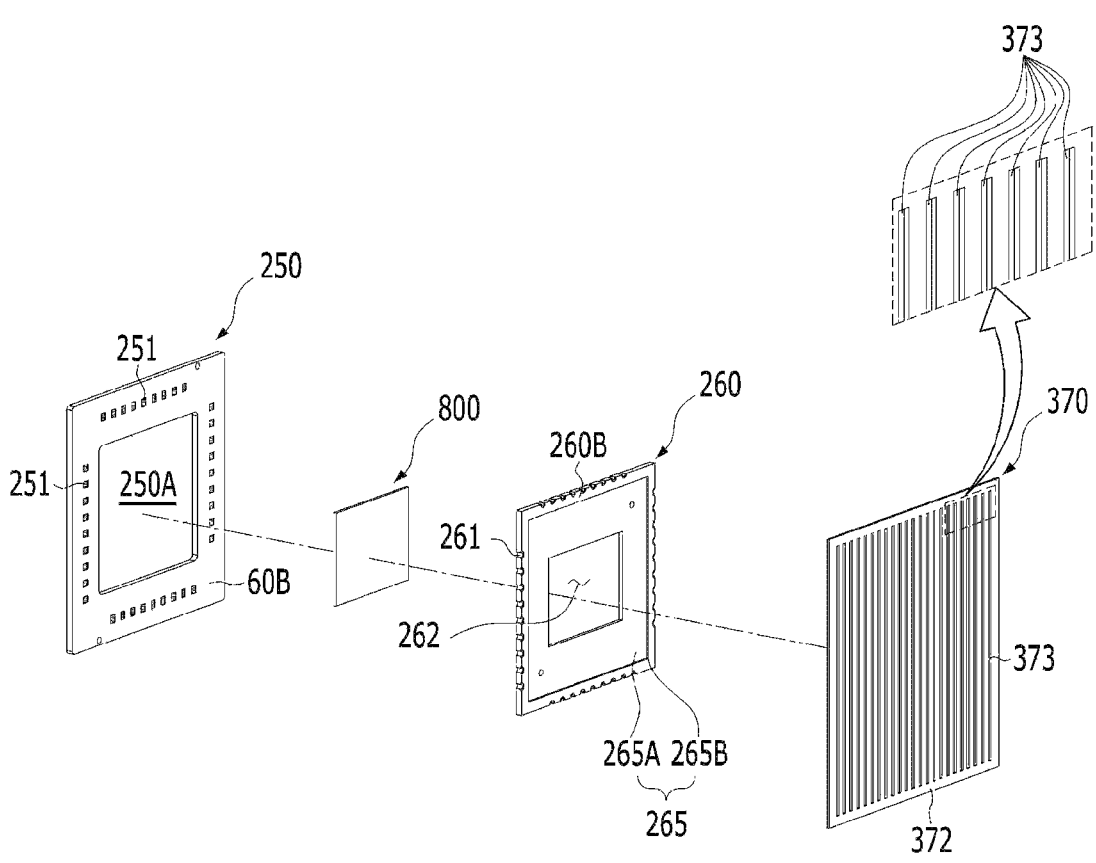
FIG. 12B is a second perspective view of the first board unit, the image sensor, and the first heat dissipation member.
Figure 13A:
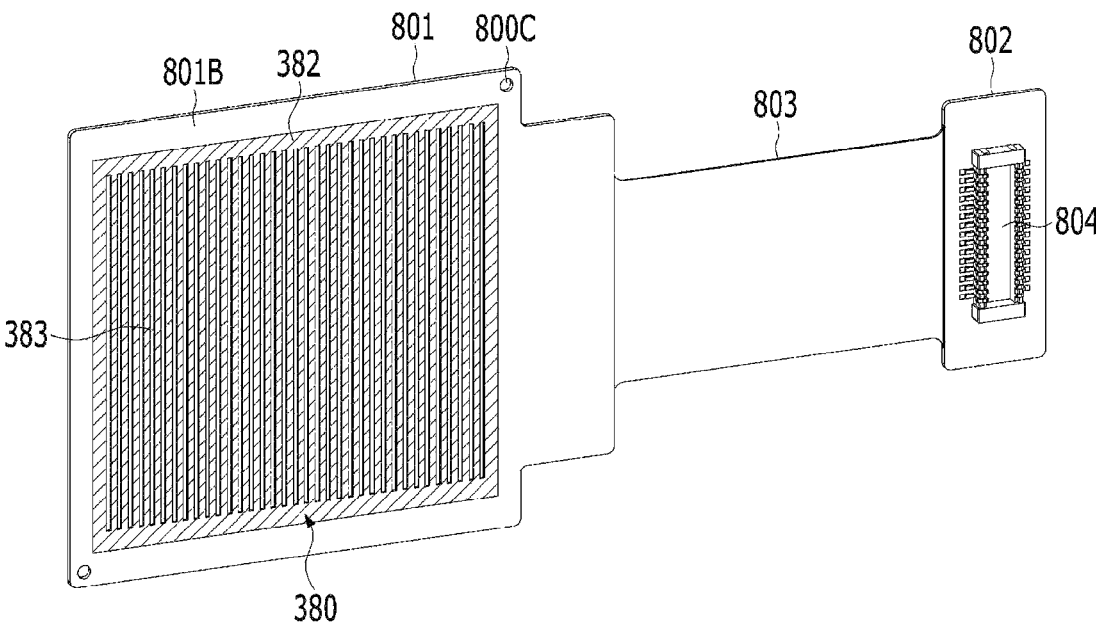
FIG. 13A is a rear perspective view of a second board unit and a second heat dissipation member.
Figure 13B:
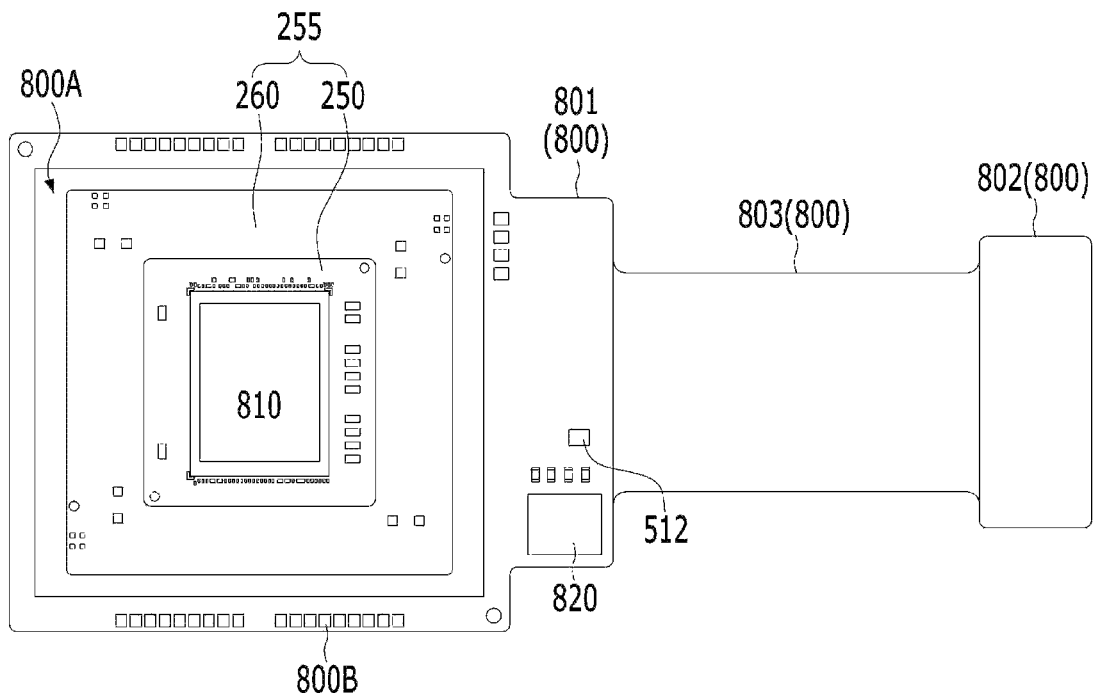
FIG. 13B is a plan view of the first board unit and the second board unit.
Figure 14A:
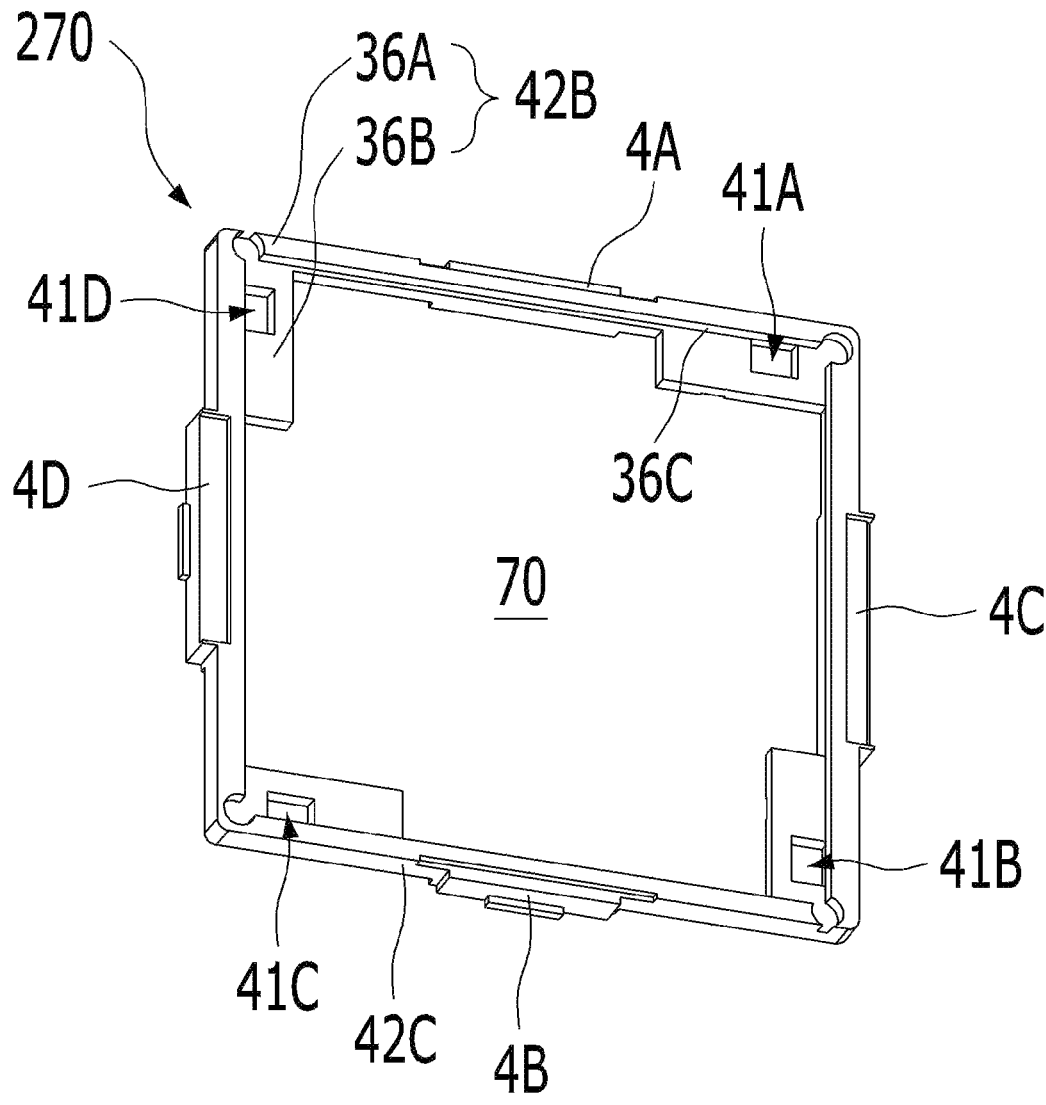
FIG. 14A is a bottom perspective view of the holder.
Figure 14B:
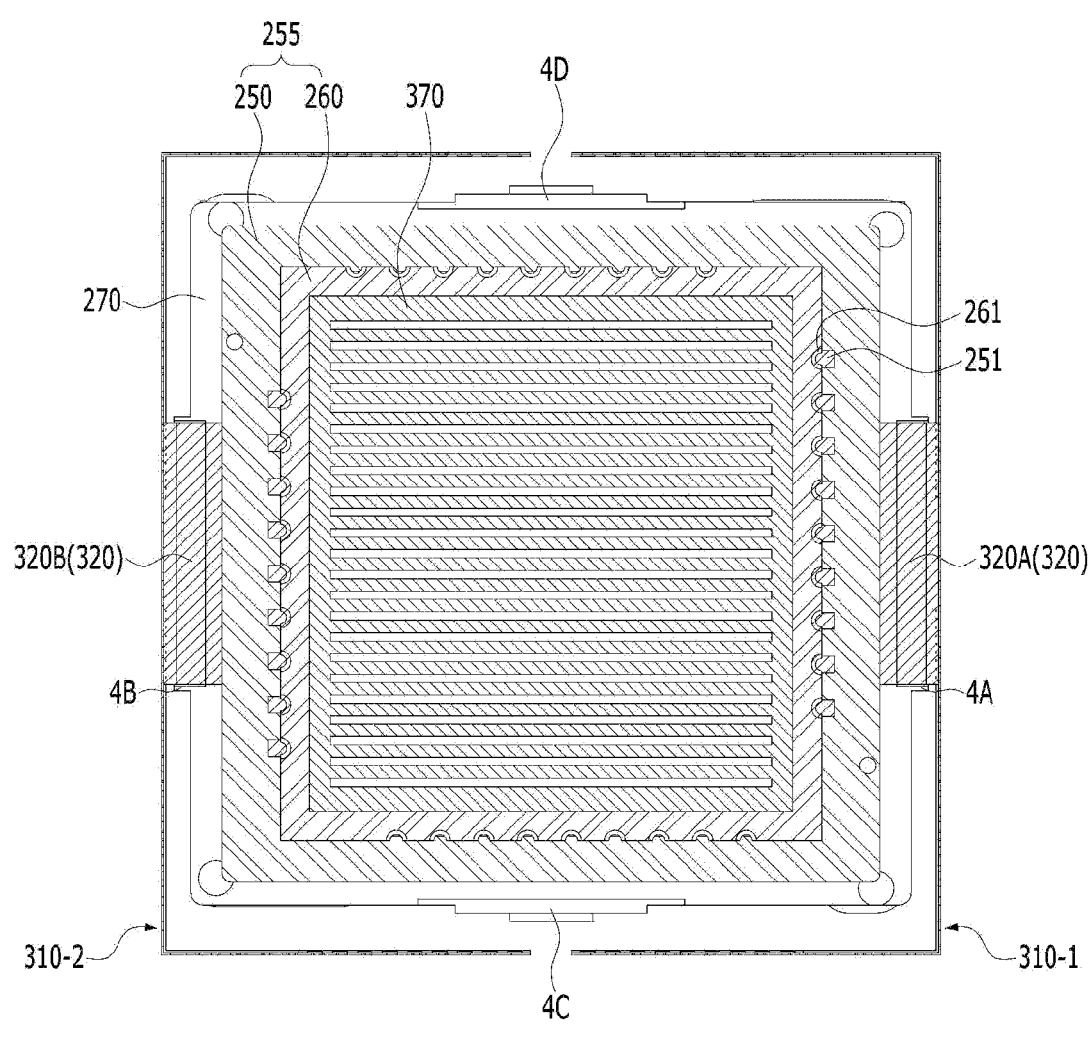
FIG. 14B illustrates the holder, the first board unit, and a support board.
Figure 15:
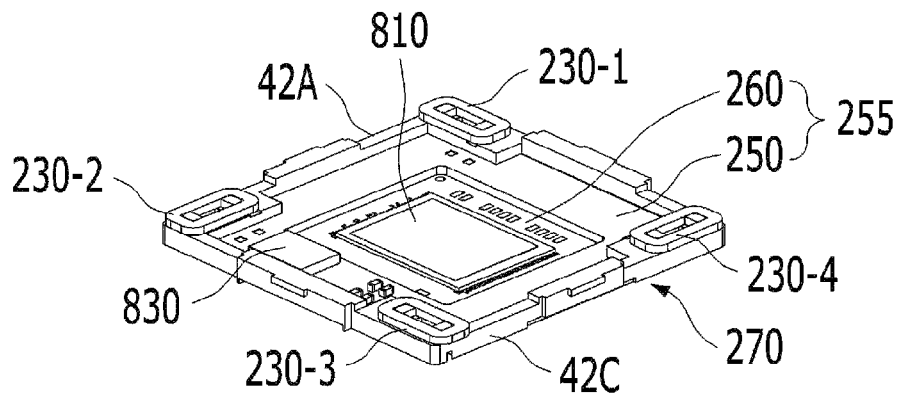
FIG. 15 is a perspective view of the holder, the second coil, the first board unit, the image sensor, and the support board.
Figure 15:
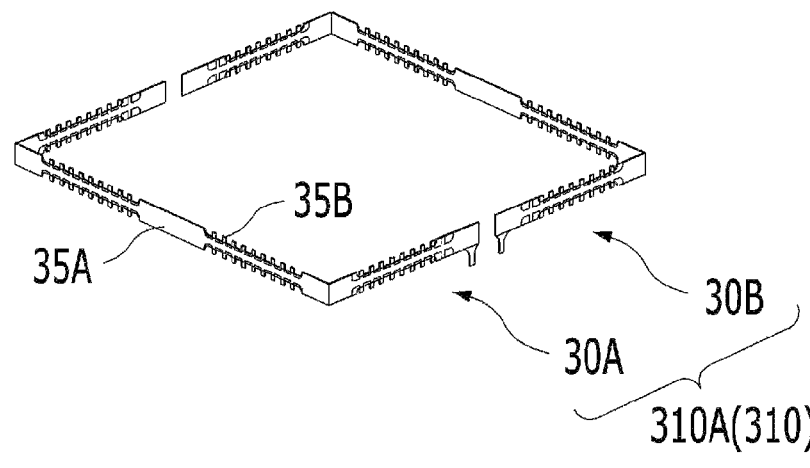
Figure 15:
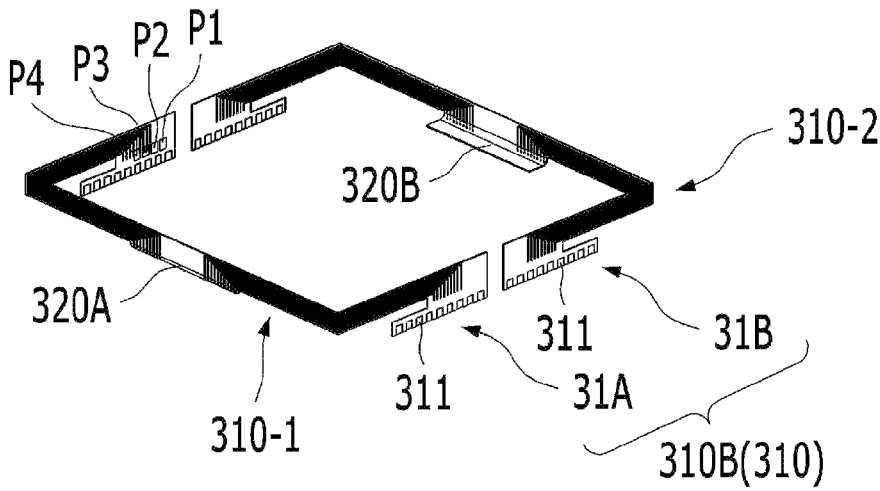
Figure 16:
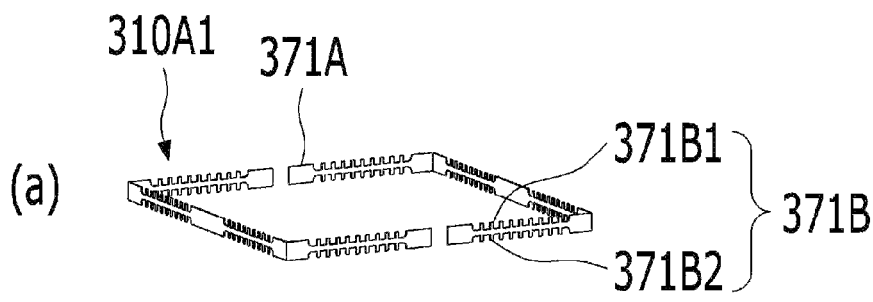
FIG. 16 illustrates embodiments of the support board.
Figure 16:
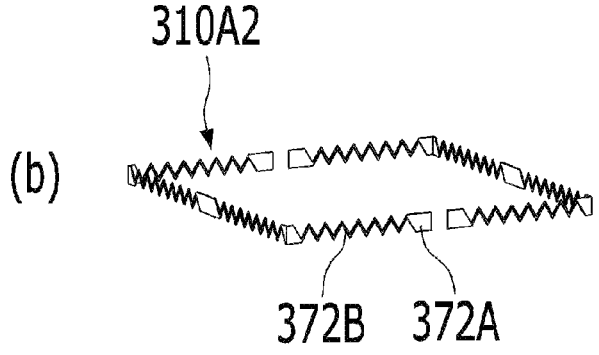
Figure 16:
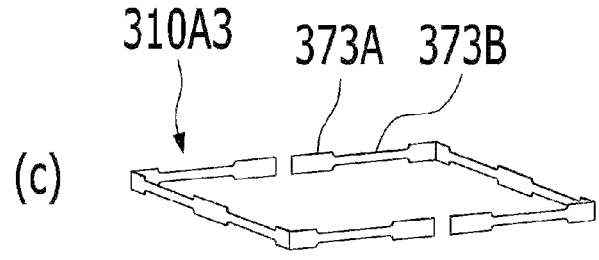
Figure 16:
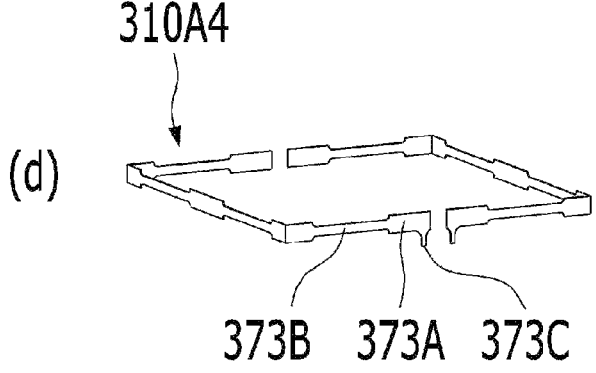
Figure 17:
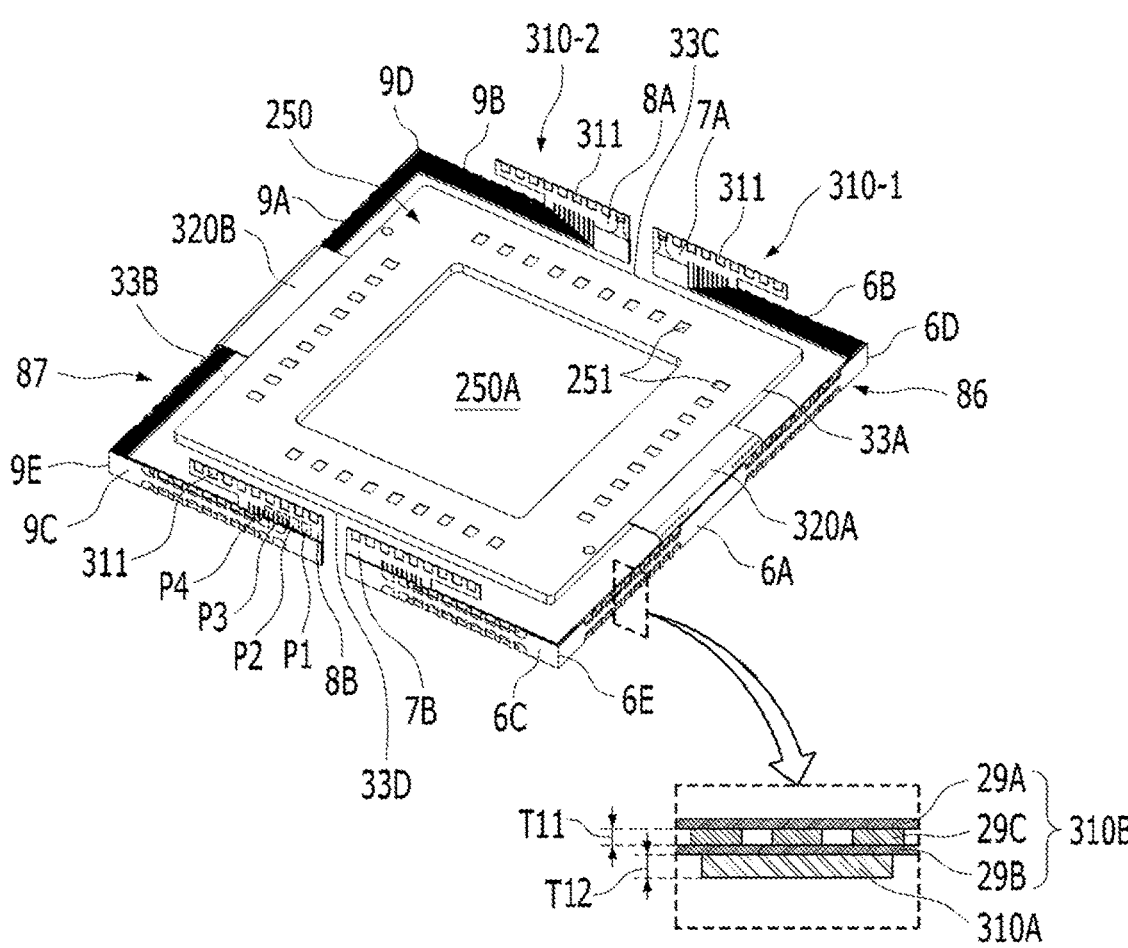
FIG. 17 is a bottom perspective view of a first circuit board and the support board.
Figure 18A:
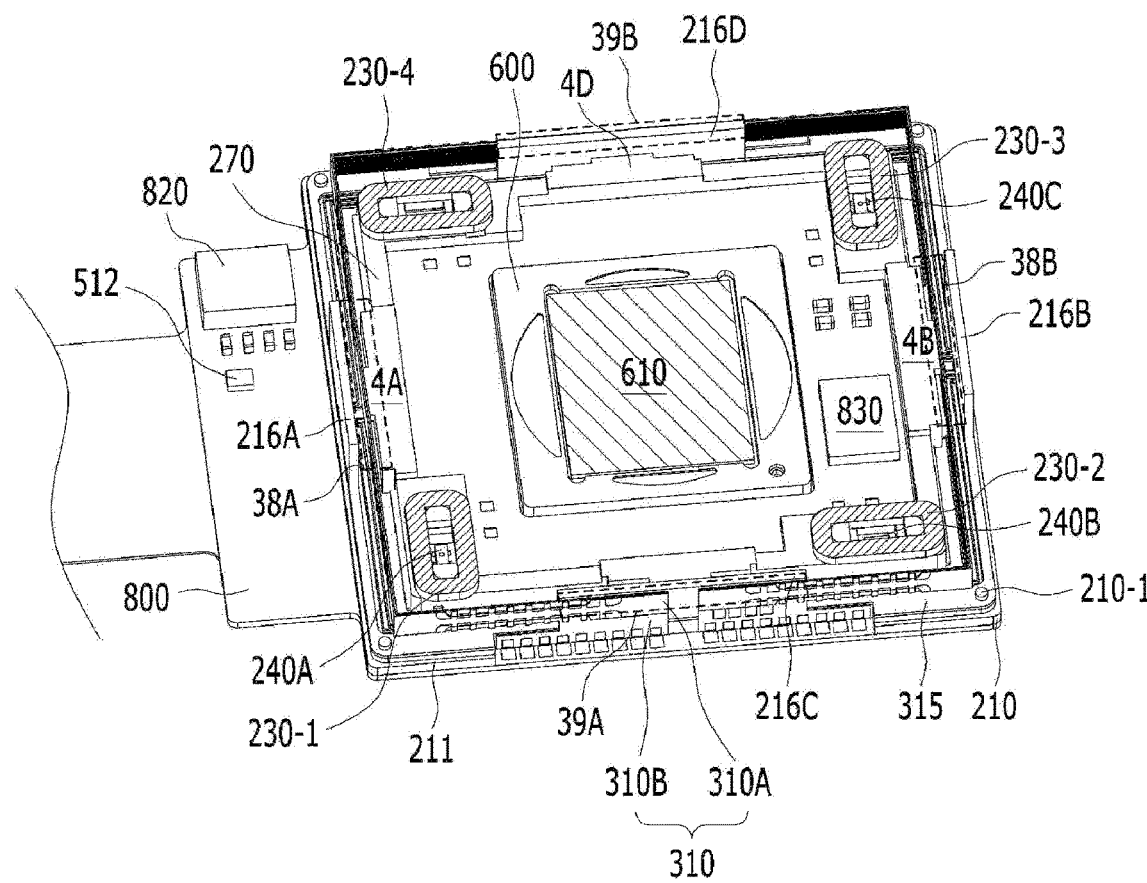
FIG. 18A is a first perspective view of the support board coupled to the holder and to the base.
Figure 18B:
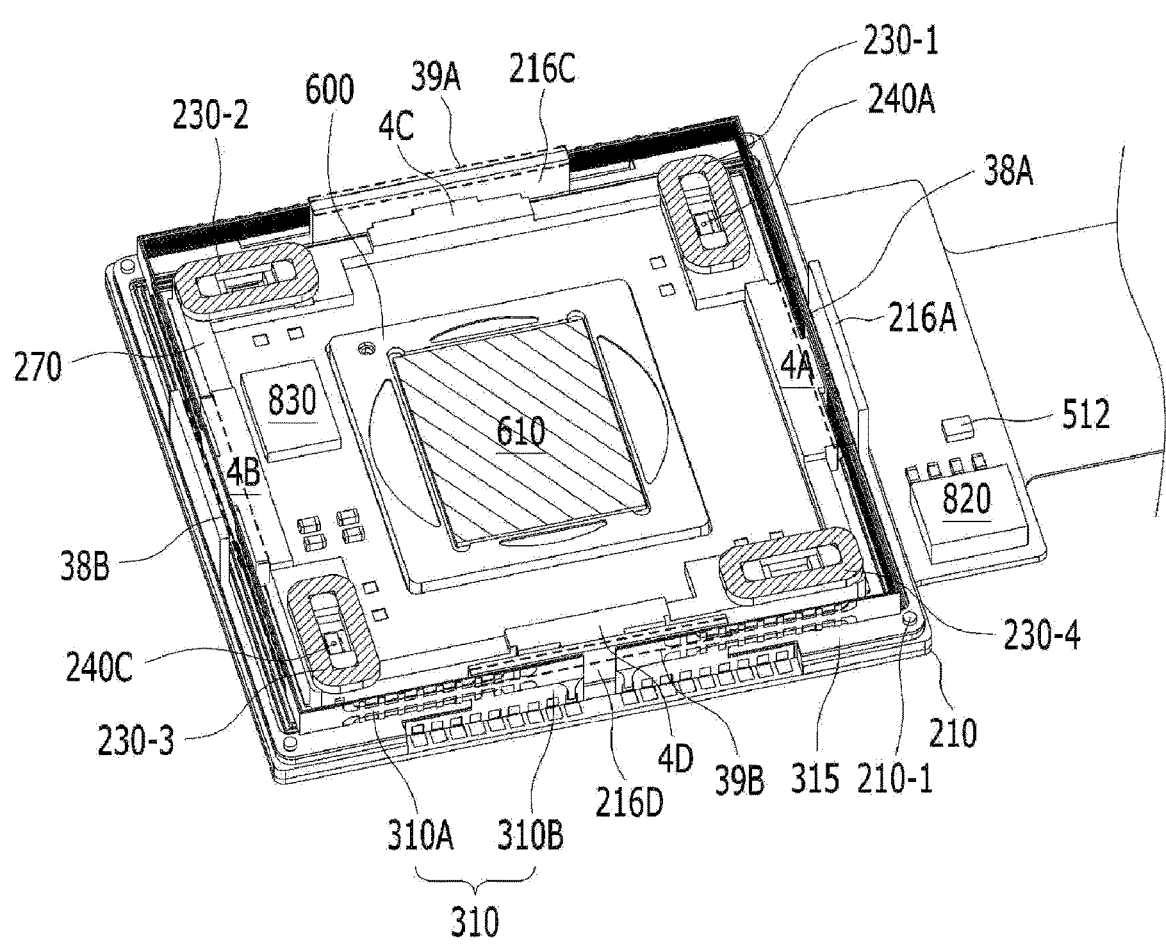
FIG. 18B is a second perspective view of the support board coupled to the holder and to the base.
Figure 19A:
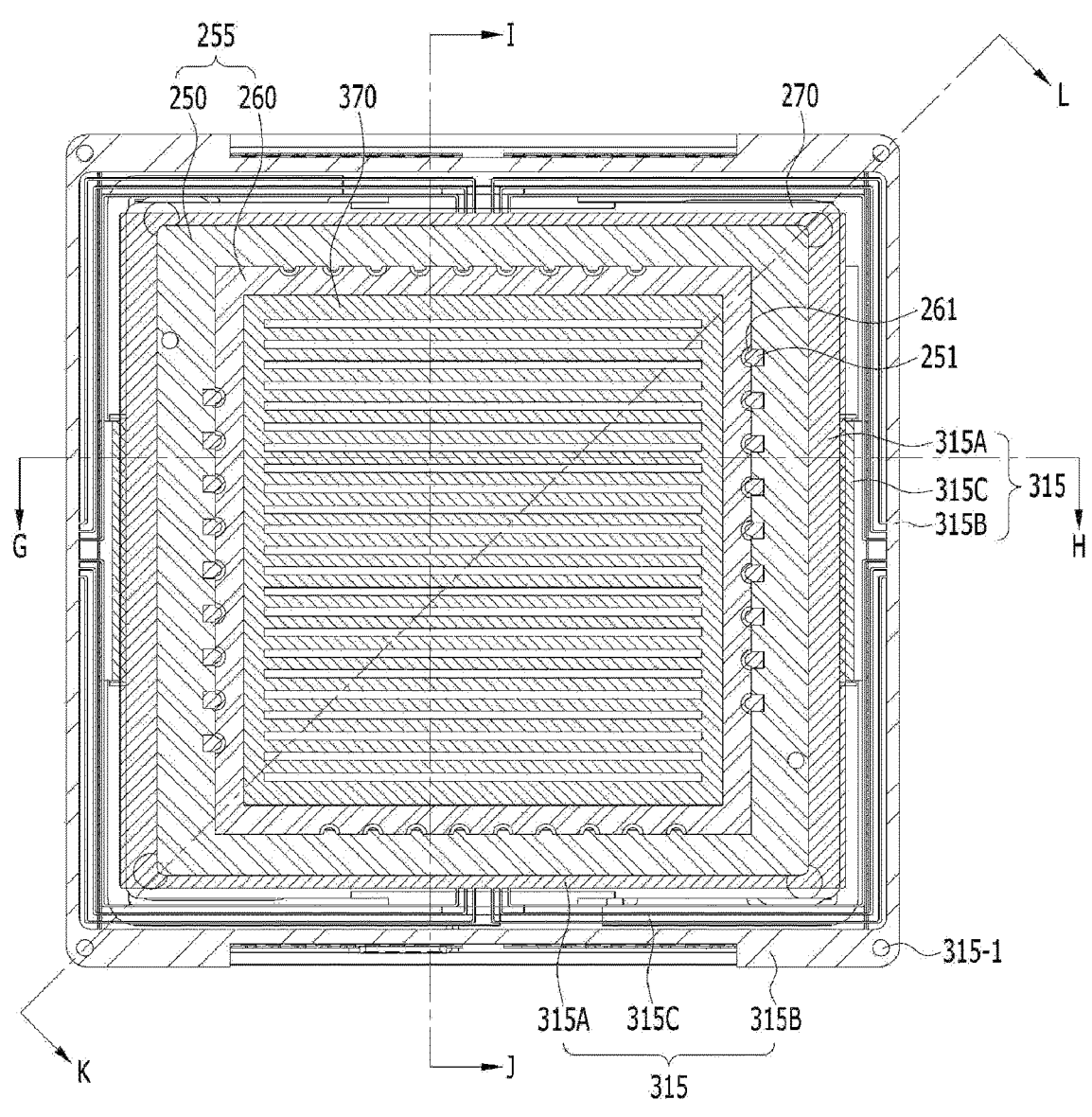
FIG. 19A is a bottom view of the first board unit, the holder, the support board, and an elastic member.
Figure 19B:
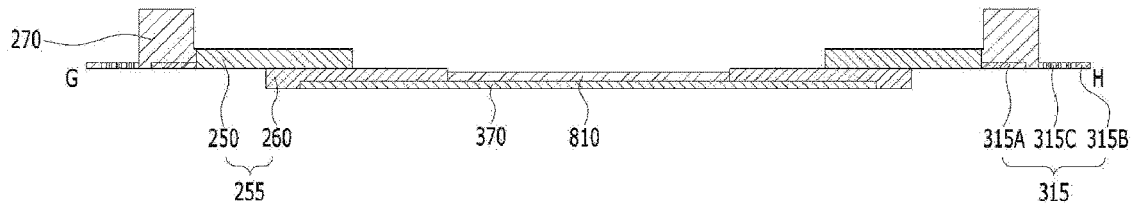
FIG. 19B is a cross-sectional view taken along line GH in FIG. 19A.
Figure 19C:
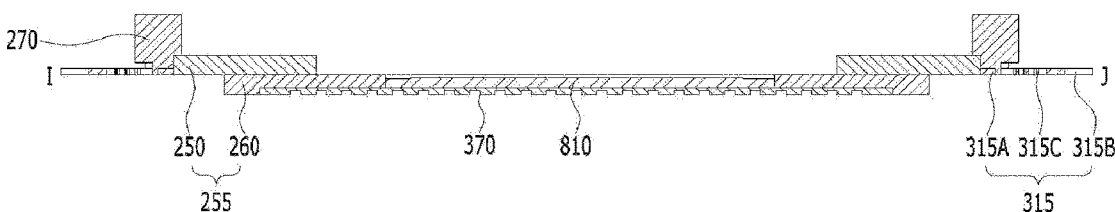
FIG. 19C is a cross-sectional view taken along line IJ in FIG. 19A.
Figure 19D:
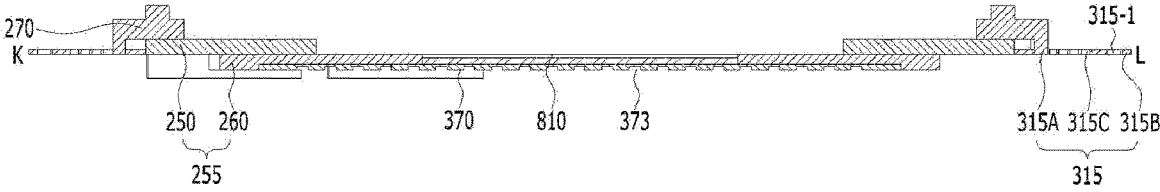
FIG. 19D is a cross-sectional view taken along line KL in FIG. 19A.

FIG. 9 is a perspective view of the image sensor unit 350, FIG. 10A is a first exploded perspective view of the image sensor unit 350 in FIG. 9, FIG. 10B is a second exploded perspective view of the image sensor unit 350 in FIG. 9, FIG. 11 is a perspective view of the holder 270, the second coil 230, the image sensor 810, the OIS position sensor 240, and the first board unit 255 in FIG. 10A, FIG. 12A is a first perspective view of the first board unit 255, the image sensor 810, and a first heat dissipation member 370, FIG. 12B is a second perspective view of the first board unit 255, the image sensor 810, and the first heat dissipation member 370, FIG. 13A is a rear perspective view of a second board unit 800 and a second heat dissipation member 380, FIG. 13B is a plan view of the first board unit 255 and the second board unit 800, FIG. 14A is a bottom perspective view of the holder 270, FIG. 14B illustrates the holder 270, the first board unit 255, and a support board 310, FIG. 15 is a perspective view of the holder 270, the second coil 230, the first board unit 255, the image sensor 810, and the support board 310, FIG. 16 illustrates embodiments of the support board, FIG. 17 is a bottom perspective view of a first circuit board 250 and the support board 310, FIG. 18A is a first perspective view of the support board 310 coupled to the holder 270 and to the base 210, FIG. 18B is a second perspective view of the support board 310 coupled to the holder 270 and to the base 210, FIG. 19A is a bottom view of the first board unit 255, the holder 270, the support board 310, and an elastic member 315, FIG. 19B is a cross-sectional view taken along line GH in FIG. 19A, FIG. 19C is a cross-sectional view taken along line IJ in FIG. 19A, and FIG. 19D is a cross-sectional view taken along line KL in FIG. 19A.

Referring to FIGS. 9 to 19D, the image sensor unit 350 may include a fixed unit and an OIS moving unit spaced apart from the fixed unit. The image sensor unit 350 may include a support board 310 interconnecting the fixed unit and the OIS moving unit. The image sensor unit 350 may further include an elastic member 315 for elastically supporting the OIS moving unit with respect to the fixed unit.

Although not shown in the drawings, in another embodiment, the camera device may further include a wire or a wire spring interconnecting the fixed unit (e.g. the AF moving unit) and the OIS moving unit. In an example, one end of the wire may be coupled to the housing 140 (or the upper elastic member 150), and the other end of the wire may be coupled to the holder 270. In an example, one end of the wire may be coupled to the upper elastic member by means of solder. In an example, the other end of the wire may be coupled to a conductive terminal, which is disposed on the holder 270, by means of solder.

In an example, the wire may be disposed in the optical-axis direction. In an example, the wire may be disposed on the corner of the housing 140 and/or the corner of the holder 270. In an example, the wire may include four wires, and each of the four wires may be disposed on a corresponding one of the four corners of the housing 140 and/or a corresponding one of the four corners of the holder 270. In an example, a terminal may be disposed on each corner of the holder 270 in order to be coupled to a corresponding one of the four wires.

The support board 310 may support the OIS moving unit with respect to the fixed unit such that the OIS moving unit is capable of moving in a direction perpendicular to the optical axis or such that the OIS moving unit is capable of tilting or rotating within a predetermined range about the optical axis.

The OIS moving unit may include an image sensor 810. In an example, the OIS moving unit may include a first board unit 255, an image sensor 810 disposed on the first board unit 255, and a first heat dissipation member 370 disposed on the first board unit 255. In addition, in an example, the OIS moving unit may further include a second coil 230 disposed so as to face the magnet 130 in the optical-axis direction and a second position sensor 240 disposed on the first board unit 255.

The OIS moving unit may further include a holder 270 disposed between the second coil 230 and the first board unit 255 and accommodating the first board unit 255. The holder 270 may alternatively be referred to as a "spacing member". In another embodiment, the holder 270 may be omitted, and the second coil 230 may be disposed on the first board unit 255, for example, the first circuit board 250.

The OIS moving unit may further include a filter 610. The OIS moving unit may further include a filter holder 600 for accommodating the filter 610.

The fixed unit may include a second board unit 800 spaced apart from the first board unit 255 and conductively connected to the first board unit 255. In addition, the fixed unit may include a housing 140 of the AF moving unit and a magnet 130 disposed in the housing 140. The board unit may alternatively be referred to as a "board", a "circuit board", or a "printed circuit board".

The fixed unit may further include a base 210 accommodating the second board unit 800 and coupled to the cover member 300. The base 210 may be coupled to the second board unit 800. In addition, the fixed unit may further include the cover member 300 coupled to the base 210. In addition, in an example, the housing 140 of the AF moving unit may also correspond to the fixed unit.

The holder 270 may be disposed under the AF moving unit. In an example, the holder 270 may be embodied as a non-conductive member. In an example, the holder 270 may be made of an injection-molded material, which can be easily embodied through an injection-molding process. In addition, the holder 27 may be formed of an insulating material. For example, the holder 270 may be formed of a resin or plastic material.

Referring to FIGS. 11, 14A, 14B, and 15, the holder 270 may include an upper surface 42A, a lower surface 42B formed opposite the upper surface 42A, and a side surface 42C interconnecting the upper surface 42A and the lower surface 42B. In an example, the lower surface 42B of the holder 270 may face or be located opposite the second board unit 800.

The holder 270 may support the first board unit 255, and may be coupled to the first board unit 255. In an example, the first board unit 255 may be disposed under the holder 270. In an example, the lower portion, the lower surface, or the lower end of the holder 270 may be coupled to the upper portion, the upper surface, or the upper end of the first board unit 255.

Referring to FIG. 14A, the lower surface 42B of the holder 270 may include a first surface 36A and a second surface 36B. The second surface 36B may have a height difference with respect to the first surface 36A in the optical-axis direction. In an example, the second surface 36B may be located above (or at a higher position than) the first surface 36A. In an example, the second surface 36B may be located closer to the upper surface 42A of the holder 270 than the first surface 36A. In an example, the distance between the upper surface 42A of the holder 270 and the second surface 36B may be shorter than the distance between the upper surface 42A of the holder 270 and the first surface 36A.

The holder 270 may include a third surface 36C interconnecting the first surface 36A and the second surface 36B. In an example, the first surface 36A and the second surface 36B may be parallel to each other, and the third surface 36C may be perpendicular to the first surface 36A and/or the second surface 36B, but the disclosure is not limited thereto. In another embodiment, the included angle between the third surface 36C and the first surface 36A (or the second surface 36B) may be an acute angle or an obtuse angle. In an example, the first surface 36A and the second surface 36B may be located on the edge of the lower surface 42B of the holder 270.

The holder 270 may accommodate or support the second coil 230. The holder 270 may support the second coil 230 such that the second coil 230 is spaced apart from the first board unit 255.

The holder 270 may have a bore 70 formed therein so as to correspond to one region on the first board unit 255. In an example, the bore 70 in the holder 270 may be a through-hole formed through the holder 270 in the optical-axis direction. In an example, the bore 70 in the holder 270 may correspond to, face, or overlap the image sensor 810 in the optical-axis direction.

The shape of the bore 70 in the holder 270 viewed from above may be a polygonal shape, such as a quadrangular shape, a circular shape, or an elliptical shape, but the disclosure is not limited thereto. The bore 70 in the holder 270 may be formed in any of various shapes.

In an example, the bore 70 in the holder 270 may have a shape or a size suitable for exposing the image sensor 810, a portion of the upper surface of the first circuit board 250, a portion of the upper surface of the second circuit board 260, and various elements. In an example, the area of the bore 70 in the holder 270 may be larger than the area of the image sensor 810, and may be smaller than the area of the first surface of the first circuit board 250. In an example, the bore 70 may be formed in the second surface 36B of the lower surface 42B of the holder 270.

The holder 270 may have holes 41A, 41B, and 41C formed therein so as to correspond to the second position sensor 240. In an example, the holder 270 may have holes 41A, 41B, and 41C formed therein at positions corresponding to first to third sensors 240A, 240B, and 240C of the second position sensor 240.

In an example, the holes 41A, 41B, and 41C may be disposed adjacent to the corners of the holder 270. The holder 270 may have a dummy hole 41D formed therein at a position that does not correspond to the second position sensor 240 and is adjacent to the corner of the holder 270 that does not correspond to the second position sensor 240. The dummy hole 41D may be formed in order to enable weight balancing of the OIS moving unit during OIS operation. In another embodiment, the dummy hole 41D may not be formed.

The holes 41A, 41B, and 41C may be through-holes formed through the holder 270 in the optical-axis direction. In an example, the holes 41A, 41B, and 41C may be formed in the second surface 36B of the lower surface 42B of the holder 270, but the disclosure is not limited thereto. In another embodiment, the holes 41A, 41B, and 41C may be formed in the first surface of the lower surface of the holder 270. In still another embodiment, the holes 41A, 41B, and 41C may be omitted from the holder 270.

The holder 270 may be provided on the upper surface 42A thereof with at least one coupling protrusion 51 for coupling to the second coil 230. The coupling protrusion 51 may protrude from the upper surface 42A of the holder 270 toward the AF moving unit. In an example, the coupling protrusion 51 may be formed adjacent to each of the holes 41A to 41D in the holder 270.

In an example, two coupling protrusions 51A and 51B may be disposed or arranged so as to correspond to respective holes 41A, 41B, 41C, and 41D in the holder 270. In an example, each of the holes 41A, 41B, 41C, and 41D in the holder 270 may be located between the two coupling protrusions 51A and 51B.

The first board unit 255 may include a first circuit board 250 and a second circuit board 260, which are conductively connected to each other. The second circuit board 260 may alternatively be referred to as a "sensor board".

The first board unit 255 may be disposed on the lower surface 42B of the holder 270. In an example, the first board unit 255 may be disposed on the second surface 36B of the lower surface 42B of the holder 270. In an example, the first circuit board 250 may be disposed on the second surface 36B of the lower surface 42B of the holder 270. In an example, the first surface 60A (refer to FIG. 12A) of the first circuit board 250 may be coupled or attached to the second surface 36B of the lower surface 42B of the holder 270 by means of an adhesive member.

In this case, the first surface 60A of the first circuit board 250 may be a surface that faces the AF moving unit and on which the second position sensor 240 is disposed. In addition, the second surface 60B of the first circuit board 250 may be a surface formed opposite the first surface 60A of the first circuit board 250.

The first circuit board 250 may alternatively be referred to as a "sensor board", a "main board", a "main circuit board", a "sensor circuit board", or a "moving circuit board". In all of the embodiments, the first circuit board 250 may alternatively be referred to as a "second board" or a "second circuit board", and the second circuit board 260 may alternatively be referred to as a "first board" or a "first circuit board".

The second position sensors 240A, 240B, and 240C may be disposed on the first circuit board 250 in order to detect movement of the OIS moving unit in a direction perpendicular to the optical-axis direction and/or rotation, tilting, or rolling of the OIS moving unit about the optical axis. In addition, a controller 830 and/or a circuit element (e.g. a capacitor) may be disposed on the first circuit board 250. The image sensor 810 may be disposed on the second circuit board 260.

The first circuit board 250 may include first terminals E1 to E8 to be conductively connected to the second coil 230. Here, the first terminals E1 to E8 may alternatively be referred to as "first pads" or "first bonding parts". The first terminals E1 to E8 of the first circuit board 250 may be disposed or arranged on the first surface 60A of the first circuit board 250. For example, the first circuit board 250 may be a printed circuit board or a flexible printed circuit board (FPCB).

The first circuit board 250 may have a bore 250A formed therein so as to correspond to or face the lens module 400 and the bore in the bobbin 110. In an example, the bore 250A in the first circuit board 250 may be a through-hole or a cavity formed through the first circuit board 250 in the optical-axis direction, and may be formed in the center of the first circuit board 250.

When viewed from above, the shape of the first circuit board 250, for example the outer circumferential shape thereof, may be a shape coinciding with or corresponding to the shape of the holder 270, for example, a quadrangular shape. In addition, when viewed from above, the shape of the bore 250A in the first circuit board 250 may be a polygonal shape such as a quadrangular shape, a circular shape, or an elliptical shape. In an example, the bore 250A in the first circuit board 250 may open or expose the image sensor 810 and/or the bore 262 in the second circuit board 260.

In addition, the first circuit board 250 may include at least one second terminal 251 to be conductively connected to the second circuit board 260. Here, the second terminal 251 may alternatively be referred to as a "second pad" or a "second bonding part". The second terminal 251 of the first circuit board 250 may be disposed or arranged on the second surface 60B of the first circuit board 250.

In an example, the at least one second terminal 251 may be provided in a plural number, and the plurality of second terminals 251 may be disposed or arranged in a region between the bore 250A in the first circuit board 250 and any one side of the first circuit board 250 in a direction parallel to the side of the first circuit board 250. In an example, the plurality of second terminals 251 may be arranged around the bore 250A.

The second circuit board 260 may be disposed under the first circuit board 250.

When viewed from above, the shape of the second circuit board 260 may be a polygonal shape (e.g. a quadrangular shape, a square shape, or a rectangular shape), but the disclosure is not limited thereto. In another embodiment, the shape of the second circuit board 260 may be a circular shape or an elliptical shape.

In an example, when the shape of the second circuit board 260 is a quadrangular shape, the area of the front surface of the second circuit board 260 may be larger than the area of the bore 250A in the first circuit board 250. In an example, the lower side of the bore 250A in the first circuit board 250 may be shielded or blocked by the second circuit board 260.

In an example, when viewed from above or below, the outer side surface (or the side) of the second circuit board 260 may be located between the outer side surface (or the side) of the first circuit board 250 and the bore 250A in the first circuit board 250.

In an example, the second circuit board 260 may have a bore 262 formed therein so as to correspond to the bore 250A in the first circuit board 250 and/or the image sensor 810. The bore 262 in the second circuit board 260 may be a hole or a cavity formed through the second circuit board 260 in the optical-axis direction, and may be formed in the center of the second circuit board 260.

In an example, the bore 262 in the second circuit board 260 may open or expose the image sensor 810. In an example, the image sensor 810 may be disposed in the bore 262 in the second circuit board 260.

In another embodiment, the bore 262 may not be formed in the second circuit board 260, and the image sensor 810 may be disposed on a first surface 260A of the second circuit board 260.

Referring to FIGS. 12A and 12B, the second circuit board 260 may include at least one terminal 261 conductively connected to the at least one second terminal 251 of the first circuit board 250. In an example, a plurality of terminals 261 may be provided on the second circuit board 260.

In an example, the at least one terminal 261 of the second circuit board 260 may be formed on the side surface or the outer side surface of the second circuit board 260 that connects the first surface 260A of the second circuit board 260 to a second surface 260B thereof. The first surface 260A may be a surface facing the first circuit board 250, and the second surface 260B may be a surface formed opposite the first surface 260A. In an example, the terminal 261 may take the form of a recess depressed into the side surface of the second circuit board 260. Alternatively, in another example, the terminal 261 may take the form of a semicircular-shaped or a semi-elliptical-shaped via formed in the side surface of the second circuit board 260. In another embodiment, the at least one terminal of the second circuit board 260 that is conductively connected to the second terminal 251 of the first circuit board 250 may be formed on the first surface 260A of the second circuit board 260.

In an example, the terminal 261 of the second circuit board 260 may be coupled to the terminal 251 of the first circuit board 250 by means of solder or a conductive adhesive member.

Each of the first and second circuit boards 250 and 260 may be, for example, a printed circuit board or an FPCB. Further, at least one of the first and second circuit boards 250 and 260 may be an organic substrate or a ceramic substrate.

Referring to FIG. 12B, the second circuit board 260 may have a recess 265 formed in the second surface 260B thereof to receive or dispose the first heat dissipation member 370 therein.

In an example, the recess 265 may include a bottom surface 265A, which has a height difference with respect to the second surface 260B of the second circuit board 260 in the optical-axis direction, and a side surface 265B, which is located between the bottom surface 265A and the second surface 260B.

The recess 265 may have a shape corresponding to or coinciding with the first heat dissipation member 370, for example, a polygonal shape (e.g. a quadrangular shape). In an example, the bore 262 may be formed through the bottom surface 265A of the recess 265, and may open or expose at least a portion of the first heat dissipation member 370.

The image sensor 810 may be disposed on, attached to, or coupled to at least a portion of the first heat dissipation member 370 that is exposed by the bore 262. In an example, the image sensor 810 may be secured, attached, or coupled to the first heat dissipation member 370 by means of an adhesive.

In an example, at least a partial region of a first surface 371 of the first heat dissipation member 370 may be exposed by the bore 262, and the image sensor 810 may be disposed on, attached to, or coupled to at least a partial region of the first surface 371 of the first heat dissipation member 370 that is exposed by the bore 262.

The first heat dissipation member 370 may be disposed on the first board unit 255. In an example, the first heat dissipation member 370 may be disposed on the second circuit board 260. In an example, the first heat dissipation member 370 may be disposed on the second surface 260B of the second circuit board 260.

In an example, the first heat dissipation member 370 may be disposed or seated in the recess 265 in the second circuit board 260. In an example, the first surface 371 of the first heat dissipation member 370 may be attached or coupled to the bottom surface of the recess 265 in the second circuit board 260. The first surface 371 of the first heat dissipation member 370 may be a surface that faces the second surface 260B of the second circuit board 260 or the bottom surface 265B of the recess 265. Since the first heat dissipation member 370 is disposed in the recess 265, the distance from a heat source of the second board unit 255 may be reduced, and accordingly, the heat dissipation effect may be improved.

In an example, the first heat dissipation member 370 may be embodied as a plate-type member having a predetermined thickness and hardness. In addition, the first heat dissipation member 370 may improve the effect of dissipating the heat generated from the heat source of the first board unit 255 to the outside. In this case, the heat source of the first board unit 255 may be an electronic element (or a circuit element) disposed on the first board unit 255, for example, at least one of the image sensor 810, the controller 830, the second position sensor 240, or the capacitor.

In an example, the first heat dissipation member 370 may include a metal material having high thermal conductivity and high heat dissipation efficiency, for example at least one of SUS, aluminum, nickel, phosphorus, bronze, or copper.

For example, the thermal conductivity of the first heat dissipation member 370 may be 200 or more. For example, the thermal conductivity of the first heat dissipation member 370 may be 200 to 1000. Alternatively, for example, the thermal conductivity of the first heat dissipation member 370 may be 10 to 1000.

In addition, the first heat dissipation member 370 may serve as a reinforcement member for stably supporting the image sensor 810 and inhibiting the image sensor from being damaged by external impacts or contact.

In another embodiment, the first heat dissipation member 370 may be formed of a thermally conductive material having high thermal conductivity, for example, thermally conductive epoxy, thermally conductive plastic, or thermally conductive synthetic resin. In the first heat dissipation member 370 and a second heat dissipation member 380 to be described later, the heat dissipation member may alternatively be referred to as a "plate", a "metal plate", a "reinforcement member", or a "stiffener".

The first heat dissipation member 370 may include at least one groove or at least one uneven portion 373 formed in a predetermined pattern in order to improve the heat dissipation effect. In an example, the groove or the uneven portion 373 may be formed in a predetermined pattern in a second surface 372 of the first heat dissipation member 370. The second surface 372 may be a surface formed opposite the first surface 371 of the first heat dissipation member 370.

In an example, a plurality of grooves may be formed in a predetermined pattern such that the grooves are spaced apart from each other by a predetermined interval. In an example, the predetermined pattern may have a stripe shape. In another embodiment, the predetermined pattern may have a net shape or a mesh shape. In still another embodiment, a plurality of dots may be formed in a predetermined pattern such that the dots are spaced apart from each other. The shape of each dot may be, for example, a circular shape, an elliptical shape, or a polygonal shape (e.g. a quadrangular shape).

In another embodiment, a predetermined pattern may be formed in at least one of the first surface 371 or the second surface 372 of the first heat dissipation member 370.

In another embodiment, the first heat dissipation member may include a hole or a through-hole in place of the groove or the uneven portion 373. In another embodiment, the first heat dissipation member may include a plurality of through-holes. The description of the groove or the uneven portion 373 formed in a predetermined pattern may also apply to the through-hole formed in the first heat dissipation member 370 according to the other embodiment.

Because the first heat dissipation member 370 moves together with the OIS moving unit, the first heat dissipation member 370 may be spaced apart from the fixed unit, for example, the second board unit 800.

The second coil 230 may be disposed on the holder 270. The second coil 230 may be disposed on the upper surface 42A of the holder 270. The second coil 230 may be disposed under the magnet 130.

The second coil 230 may be coupled to the holder 270. In an example, the second coil 230 may be coupled or attached to the upper surface 42A of the holder 270. In an example, the second coil 230 may be coupled to the coupling protrusion 51 of the holder 270.

The OIS moving unit may be moved by interaction between the second coil 230 and the magnet 130.

In an example, the second coil 230 may correspond to, face, or overlap the magnet 130 disposed on the fixed unit in the direction of the optical axis OA. In another embodiment, the fixed unit may include a separate OIS-dedicated magnet in addition to the magnet of the AF moving unit, and the second coil may correspond to, face, or overlap the OIS-dedicated magnet. In this case, the number of OIS-dedicated magnets may be the same as the number of coil units included in the second coil 230.

In an example, the second coil 230 may include a plurality of coil units 230-1 to 230-4. In an example, the second coil 230 may include four coil units 230-1 to 230-4 respectively disposed on the four corners of the holder 270.

Each of the coil units 230-1 to 230-4 may take the form of a coil block having a closed curve shape or a ring shape. In an example, each coil unit may have a cavity or a hole formed therein. In an example, each of the coil units may be embodied as a fine pattern (FP) coil, a wound coil, or a coil block.

In another embodiment, the second coil 230 may be disposed on the first circuit board 250, or may be coupled to the first circuit board 250.

The second coil 230 may be conductively connected to the first circuit board 250. In an example, the first coil unit 230-1 may be conductively connected to the two first terminals E1 and E2 of the first circuit board 250, the second coil unit 230-2 may be conductively connected to two other first terminals E3 and E4 of the first circuit board 250, the third coil unit 230-3 may be conductively connected to two other first terminals E5 and E6 of the first circuit board 250, and the fourth coil unit 230-4 may be conductively connected to two other first terminals E7 and E8 of the first circuit board 250.

Power or a drive signal may be supplied to the first to fourth coil units 230-1 to 230-4 through the first circuit board 250. The power or the drive signal supplied to the second coil 230 may be a DC signal, an AC signal, or a signal containing both DC and AC components, and may be of a current type or a voltage type.

The OIS moving unit may be moved in the first horizontal direction or the second horizontal direction, or may be rolled about the optical axis by interaction between the first to fourth magnet units 130-1 to 130-4 and the first to fourth coil units 230-1 to 230-4.

In an example, current may be independently applied to at least three coil units among the four coil units 230-1 to 230-4. In another embodiment, current may be independently applied to at least two coil units among the four coil units 230-1 to 230-4.

The controller 830 or 780 may supply at least one drive signal to at least one of the first to fourth coil units 230-1 to 230-4, and may control the at least one drive signal such that the OIS moving unit is moved in the x-axis direction and/or the y-axis direction or is rotated within a predetermined angular range about the optical axis. The "controller" may be at least one of the controller 830 of the camera module 10 or the controller 780 of an optical instrument 200A.

When the second coil 230 is driven in a three-channel drive mode, three independent drive signals may be supplied to the second coil 230. In an example, among the four coil units, two coil units (e.g. 230-2 and 230-4, or 230-1 and 230-3), which face each other in an oblique direction, may be connected in series to each other. One drive signal may be supplied to the two coil units connected in series to each other, and an independent drive signal may be supplied to each of the remaining two coil units, among the four coil units.

Alternatively, when the second coil 230 is driven in a four-channel drive mode, an independent drive signal may be supplied to each of the four coil units 230-1 to 230-4, which are separated from each other.

Figure 20A:
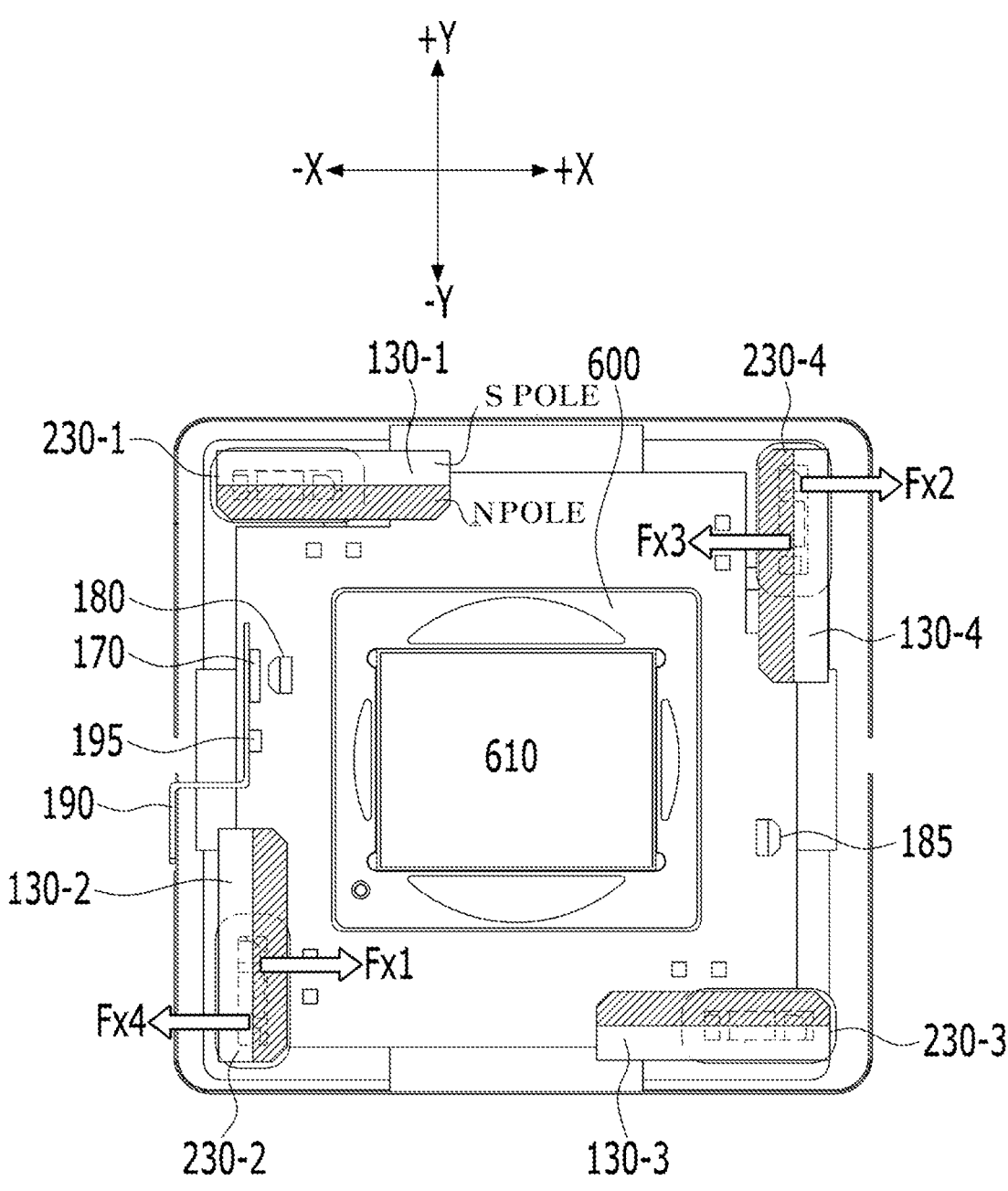
FIG. 20A is a view for explaining movement of the OIS moving unit in the x-axis direction.
Figure 20B:
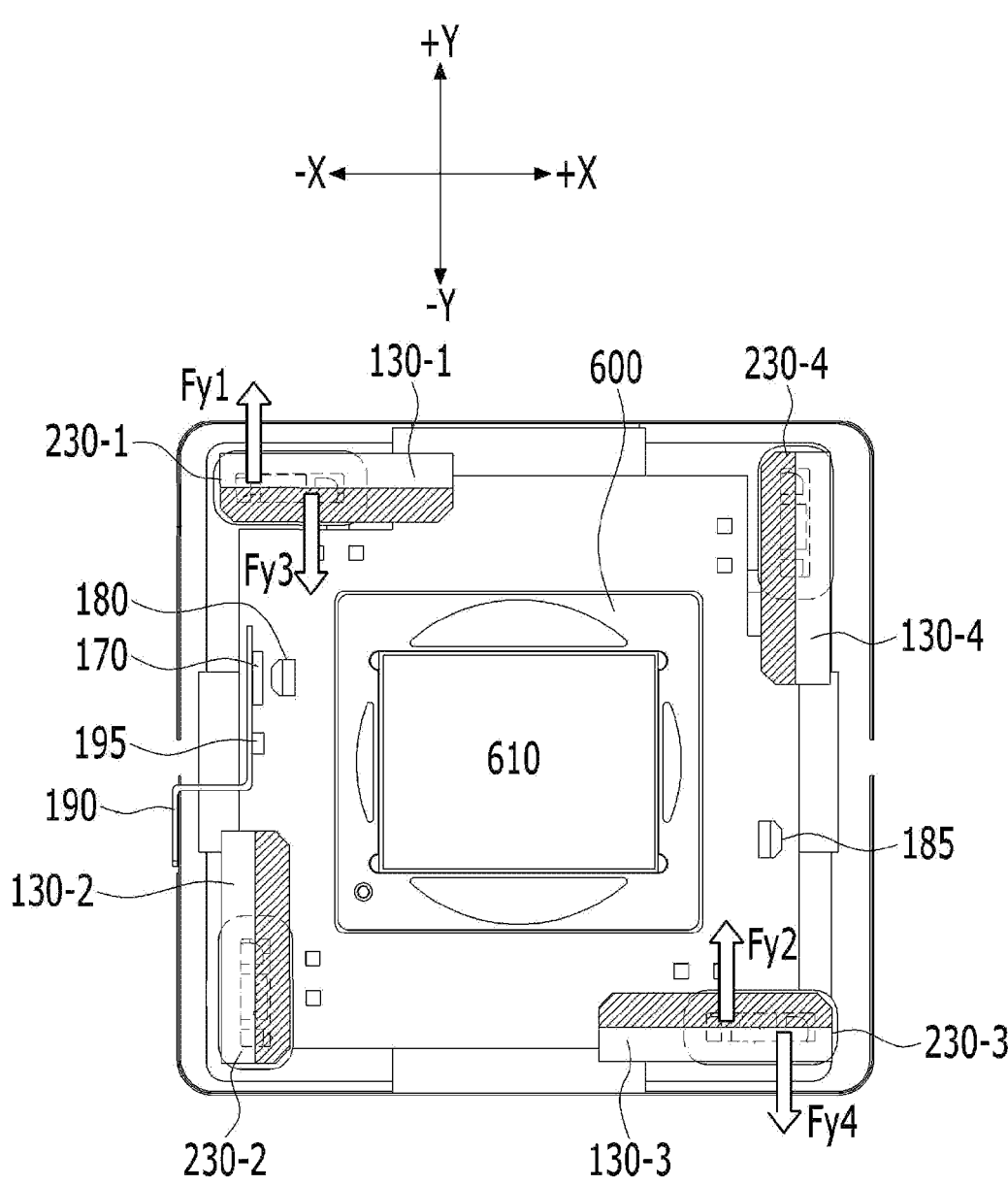
FIG. 20B is a view for explaining movement of the OIS moving unit in the y-axis direction.

FIG. 20A is a view for explaining movement of the OIS moving unit in the x-axis direction, and FIG. 20B is a view for explaining movement of the OIS moving unit in the y-axis direction.

The N pole and the S pole of each of the first and third magnet units 130-1 and 130-3, which face each other in a first oblique direction, may be disposed so as to face each other in the first horizontal direction (e.g. the y-axis direction). In addition, the N pole and the S pole of each of the second and fourth magnet units 130-2 and 130-4, which face each other in a second oblique direction, which is perpendicular to the first oblique direction, may be disposed so as to face each other in the second horizontal direction (e.g. the x-axis direction).

That is, the direction in which the N pole and the S pole of the first magnet unit 130-1 face each other may be the same as or parallel to the direction in which the N pole and the S pole of the third magnet unit 130-3 face each other. In addition, the direction in which the N pole and the S pole of the second magnet unit 130-2 face each other may be the same as or parallel to the direction in which the N pole and the S pole of the fourth magnet unit 130-4 face each other.

Referring to FIG. 20A, based on the boundary line (or the interface) between the N pole and the S pole of each of the first to fourth magnet units 130-1 to 130-4, the N pole may be located at a further inward position, and the S pole may be located at a further outward position. In another embodiment, based on the boundary line between the N pole and the S pole, the S pole may be located at a further inward position, and the N pole may be located at a further outward position. The boundary line (or the interface) may be a portion that separates the N pole and the S pole from each other, and has substantially no magnetism and thus almost no polarity. In the case in which the magnet 130 is a bipolar magnet or a 4-pole magnet, the boundary line may correspond to the partition wall. In this case, the partition wall may be a non-magnetic member, air, or the like, and may be referred to as a "neutral zone" or a "neutral region".

Referring to FIG. 20A, the OIS moving unit may be moved or shifted in the x-axis direction by first electromagnetic force Fx1 or Fx3, which is generated by interaction between the second coil unit 230-2 and the second magnet unit 130-2, and second electromagnetic force Fx2 or Fx4, which is generated by interaction between the fourth coil unit 230-4 and the fourth magnet unit 130-4. In an example, the direction of the first electromagnetic force Fx1 or Fx3 and the direction of the second electromagnetic force Fx2 or Fx4 may be the same as each other.

Referring to FIG. 20B, the OIS moving unit may be moved or shifted in the y-axis direction by third electromagnetic force Fy1 or Fy3, which is generated by interaction between the first coil unit 230-1 and the first magnet unit 130-1, and fourth electromagnetic force Fy2 or Fy4, which is generated by interaction between the third coil unit 230-3 and the third magnet unit 130-3. In an example, the direction of the third electromagnetic force Fy1 or Fy3 and the direction of the fourth electromagnetic force Fy2 or Fy4 may be the same as each other.

Figure 20C:
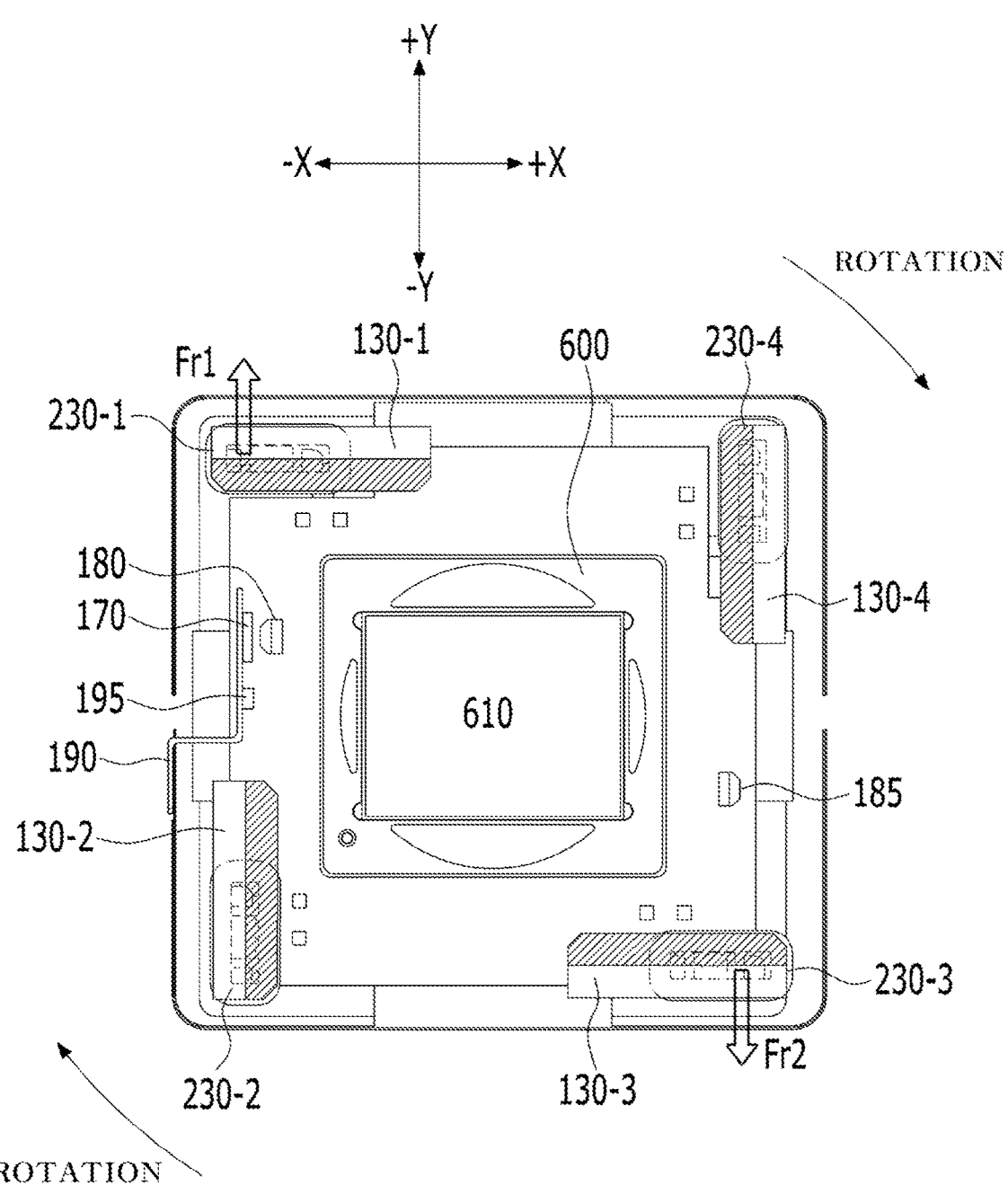
FIG. 20C is a view for explaining rotation of the OIS moving unit in the clockwise direction in a three-channel drive mode.
Figure 20D:
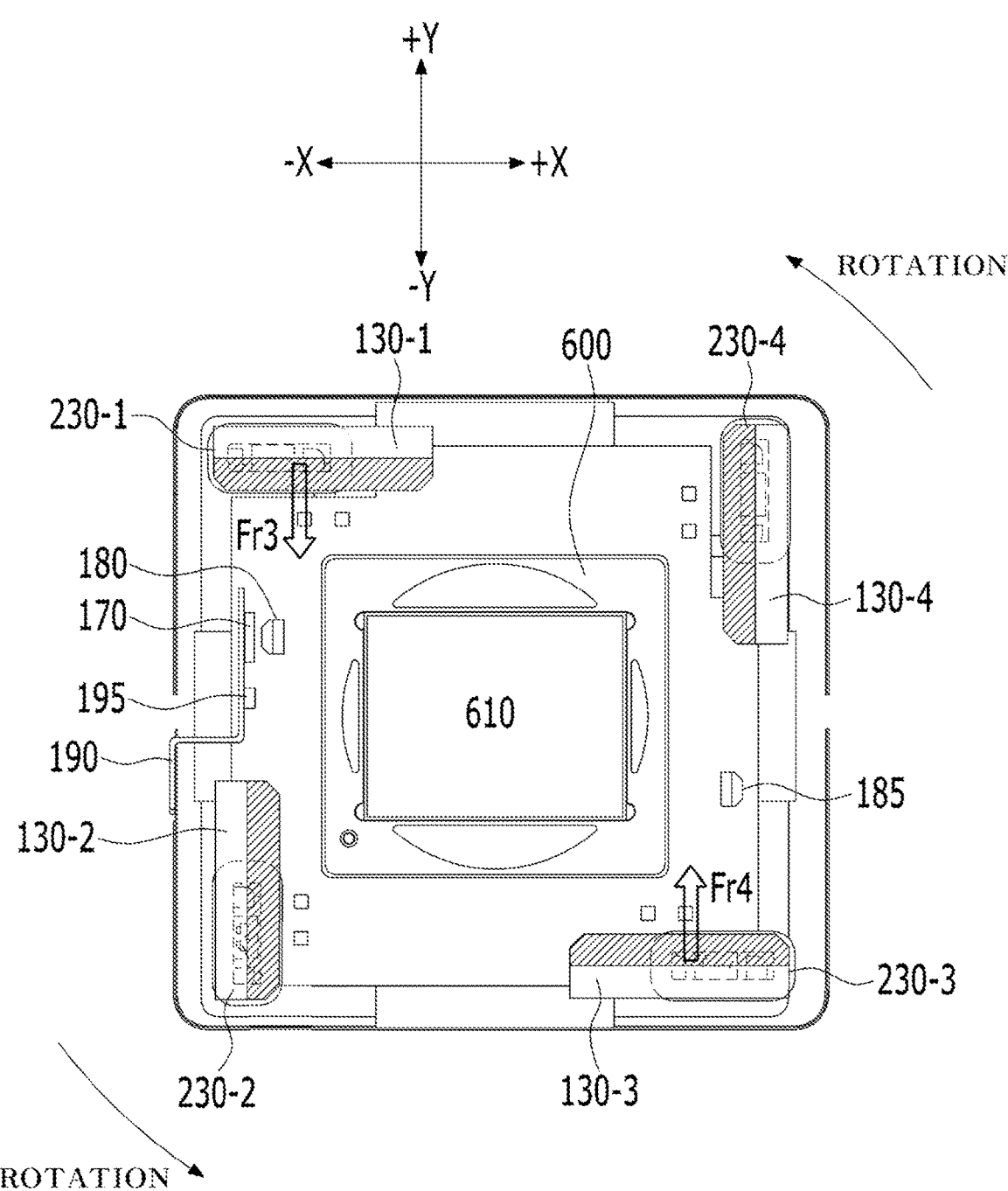
FIG. 20D is a view for explaining rotation of the OIS moving unit in the counterclockwise direction in the three-channel drive mode.

FIG. 20C is a view for explaining rotation of the OIS moving unit in the clockwise direction in the three-channel drive mode, and FIG. 20D is a view for explaining rotation of the OIS moving unit in the counterclockwise direction in the three-channel drive mode. In an example, in the three-channel drive mode, the second coil unit 230-2 and the fourth coil unit 230-4 may be connected in series to each other, a drive signal may be supplied to each of the first and third coil units 230-1 and 230-3, and no drive signal may be supplied to the second or fourth coil unit 230-2 or 230-4.

Referring to FIGS. 20C and 20D, the OIS moving unit may be tilted relative to the optical axis, or may be rotated or rolled about the optical axis by fifth electromagnetic force Fr1 or Fr3, which is generated by interaction between the first coil unit 230-1 and the first magnet unit 130-1, and sixth electromagnetic force Fr2 or Fr4, which is generated by interaction between the third coil unit 230-3 and the third magnet unit 130-3. In an example, the direction of the fifth electromagnetic force Fr1 and the direction of the sixth electromagnetic force Fr2 may be opposite each other.

Figure 20E:
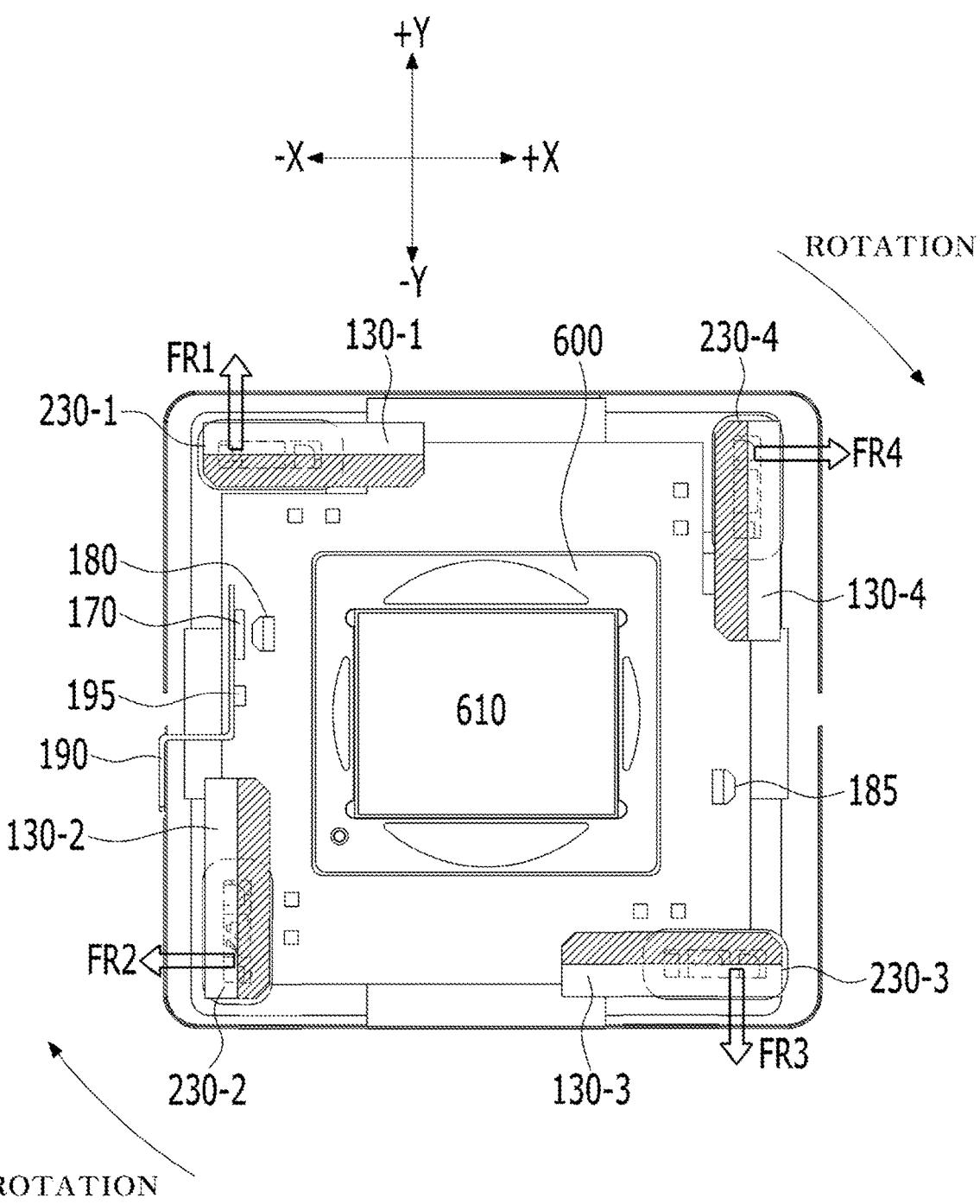
FIG. 20E is a view for explaining rotation of the OIS moving unit in the clockwise direction in a four-channel drive mode.
Figure 20F:
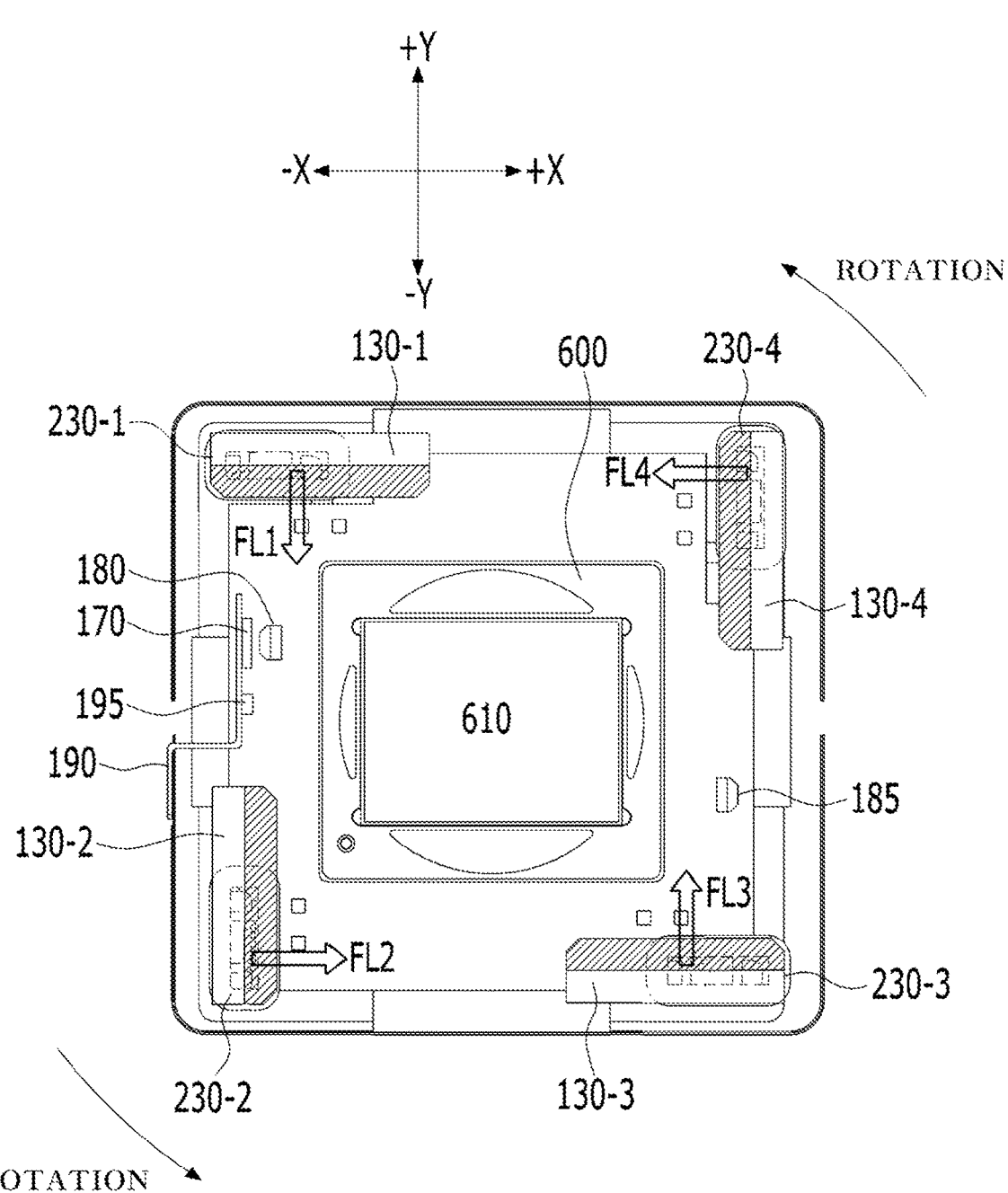
FIG. 20F is a view for explaining rotation of the OIS moving unit in the counterclockwise direction in the four-channel drive mode.

FIG. 20E is a view for explaining rotation of the OIS moving unit in the clockwise direction in the four-channel drive mode, and FIG. 20F is a view for explaining rotation of the OIS moving unit in the counterclockwise direction in the four-channel drive mode.

Referring to FIGS. 20E and 20F, the OIS moving unit may be tilted relative to the optical axis, or may be rotated or rolled about the optical axis by first electromagnetic force FR1 or FL1, which is generated by interaction between the first coil unit 230-1 and the first magnet unit 130-1, second electromagnetic force FR2 or FL2, which is generated by interaction between the second coil unit 230-2 and the second magnet unit 130-2, third electromagnetic force FR3 or FL3, which is generated by interaction between the third coil unit 230-3 and the third magnet unit 130-3, and fourth electromagnetic force FR4 or FL4, which is generated by interaction between the fourth coil unit 230-4 and the fourth magnet unit 130-4. In an example, the direction of the first electromagnetic force FR1 or FL1 and the direction of the third electromagnetic force FR3 or FL3 may be opposite each other. In addition, in an example, the direction of the second electromagnetic force FR2 or FL2 and the direction of the fourth electromagnetic force FR4 or FL4 may be opposite each other. In addition, in an example, the direction of the first electromagnetic force FR1 or FL1 and the direction of the second electromagnetic force FR2 or FL2 may be perpendicular to each other.

Compared to the three-channel drive mode shown in FIGS. 20C and 20D, according to the four-channel drive mode shown in FIGS. 20E and 20F, the electromagnetic force for rotating the OIS moving unit may be increased, and accordingly, the amount of drive current required to drive the first to fourth coil units 230-1 to 230-4 may be reduced. As a result, the amount of power that is consumed may be reduced.

The second position sensor 240 may be disposed on, coupled to, or mounted on the first surface 60A (e.g. the upper surface) of the first circuit board 250. The second position sensor 240 may detect displacement of the OIS moving unit in a direction perpendicular to the optical-axis direction, for example, shift or movement of the OIS moving unit in a direction perpendicular to the optical-axis direction. In addition, the second position sensor 240 may detect tilting of the OIS moving unit relative to the optical axis or rotation or rolling of the OIS moving unit about the optical axis within a predetermined range. The first position sensor 170 may alternatively be referred to as an "AF position sensor", and the second position sensor 240 may alternatively be referred to as an "OIS position sensor". The second position sensor 240 may include three or more sensors corresponding to or overlapping three or more magnet units, among the four magnet units, in the optical-axis direction in order to detect movement of the OIS moving unit.

In an example, the second position sensor 240 may be disposed below the second coil 230.

In an example, the second position sensor 240 may not overlap the second coil 230 in a direction perpendicular to the optical axis. In an example, the sensing element of the second position sensor 240 may not overlap the second coil 230 in a direction perpendicular to the optical axis. The sensing element may be a portion that detects a magnetic field.

In an example, the center of the second position sensor 240 may not overlap the second coil 230 in a direction perpendicular to the optical axis. In an example, the center of the second position sensor 240 may be a spatial center in the x-axis direction and the y-axis direction in an xycoordinate plane perpendicular to the optical axis. Alternatively, the center of the second position sensor 240 may be a spatial center in the x-axis, y-axis, and z-axis directions.

In another embodiment, at least a portion of the second position sensor 240 may overlap the second coil 230 in a direction perpendicular to the optical axis.

In an example, the second position sensor 240 may overlap the holes 41A to 41C in the holder 270 in the optical-axis direction. In addition, in an example, the second position sensor 240 may overlap the cavity in the second coil 230 in the optical-axis direction. In addition, in an example, at least some of the holes 41A to 41C in the holder 270 may overlap the cavity in the second coil 230 in the optical-axis direction.

In an example, at least a portion of the second position sensor 240, for example the center of the second position sensor 240, may not overlap the second coil 230 in the optical-axis direction.

In an example, the second position sensor 240 may include a first sensor 240A, a second sensor 240B, and a third sensor 240C, which are spaced apart from one another.

Each of the first to third sensors 240A, 240B, and 240C may be, for example, a Hall sensor. In another embodiment, each of the first to third sensors 240A, 240B, and 240C may be a driver IC including a Hall sensor and a driver. The description of the first position sensor 170 may also apply to the first to third sensors 240A, 240B, and 240C. Each of the first to third sensors 240A, 240B, and 240C may be, for example, a displacement detection sensor, the output voltage of which varies depending on the positional relationship with a magnet unit corresponding thereto.

Each of the first sensor 240, the second sensor 240B, and the third sensor 240C may be conductively connected to the first circuit board 250.

The second position sensor 240 may be disposed below the cavity in the second coil 230. The second position sensor 240 may not overlap the second coil 230 in a direction perpendicular to the optical-axis direction. In an example, the second position sensor 240 may overlap the holder 270 in a direction perpendicular to the optical-axis direction.

In an example, the first sensor 240A may be disposed below the cavity in the first coil unit 230-1 corresponding thereto. The first sensor 240A may be disposed in a corresponding hole 41A among the holes 41A to 41C in the holder 270. The second sensor 240B may be disposed below the cavity in the second coil unit 230-2. The second sensor 240B may be disposed in a corresponding hole 41B, among the holes 41A to 41C in the holder 270. The third sensor 240C may be disposed below the cavity in the third coil unit 230-3. The third sensor 240C may be disposed in a corresponding hole 41C among the holes 41A to 41C in the holder 270.

In an example, each of the first to third sensors 240A, 240B, and 240C may not overlap a corresponding one of the coil units 230-1 to 230-3 in a direction perpendicular to the optical axis. The first to third sensors 240A, 240B, and 240C may overlap the holder 270 in a direction perpendicular to the optical axis.

Since the first to third sensors 240A, 240B, and 240C are disposed so as not to overlap the OIS coil 230 in a direction perpendicular to the optical axis, the influence of the magnetic field of the OIS coil 230 on the output of the OIS position sensor 240 may be reduced, and accordingly, it is possible to accurately perform OIS feedback operation and to ensure the reliability of OIS operation.

The second position sensor 240 may face, correspond to, or overlap the magnet 130 in the optical-axis direction.

In an example, at the initial position of the OIS moving unit, at least a portion of the first sensor 240A may overlap the first magnet unit 130-1 in the optical-axis direction. The first sensor 240A may output a first output signal (e.g. first output voltage) corresponding to the result of detection of the magnetic field of the first magnet unit 130-1.

In an example, at the initial position of the OIS moving unit, at least a portion of the second sensor 240B may overlap the second magnet unit 130-2 in the optical-axis direction. The second sensor 240B may output a second output signal (e.g. a second output voltage) corresponding to the result of detection of the magnetic field of the second magnet unit 130-2.

In an example, at the initial position of the OIS moving unit, at least a portion of the third sensor 240C may overlap the third magnet unit 130-3 in the optical-axis direction. The third sensor 240C may output a third output signal (e.g. a third output voltage) corresponding to the result of detection of the magnetic field of the third magnet unit 130-3.

The initial position of the OIS moving unit may be the original position of the OIS moving unit in the state in which no power or drive signal is applied to the second coil 230 from the controller 820 or 780 or the position at which the OIS moving unit is located as the result of the support board being elastically deformed due only to the weight of the OIS moving unit. In addition, the initial position of the OIS moving unit may be the position at which the OIS moving unit is located when gravity acts in the direction from the first board unit 255 toward the second board unit 800 or when gravity acts in the opposite direction. In addition, the initial position of the OIS moving unit may be the position at which the OIS moving unit is located without being moved in the state in which no power or drive signal is supplied to the second coil 230 by the controller 820 or 780.

In order to improve the linearity of the relationship between the displacement of the OIS moving unit and the output from the second position sensor 250, each of the sensor units 240A, 240B, and 240C may overlap a corresponding one of the magnet units 130-1, 130-2, and 130-3 within the stroke range of the OIS moving unit in the optical-axis direction.

In an example, rolling of the OIS moving unit may be controlled using at least one of the first output voltage from the first sensor 240A, the second output voltage from the second sensor 240B, or the third output voltage from the third sensor 240C. In an example, the controller 830 or 780 may control rolling of the OIS moving unit using the first output voltage and the third output voltage.

In an example, the controller 830 or 780 may control movement or displacement of the OIS moving unit in the first horizontal direction (e.g. the y-axis direction) or the second horizontal direction (e.g. the x-axis direction) using at least one of the first to third output voltages. In an example, the controller 830 or 780 may control movement or displacement of the OIS moving unit in the first horizontal direction using the first output voltage from the first sensor 240A, and may control movement or displacement of the OIS moving unit in the second horizontal direction using the second output voltage from the second sensor 240B.

Each of the first to third sensors 240A, 240B, and 240C may be a Hall sensor or a driver IC including a Hall sensor. In another embodiment, each of the first and second sensors 240A and 240B may be a Hall sensor, and the third sensor 240C may be a tunnel magnetoresistance (TMR) sensor. In this case, the tunnel magnetoresistance (TMR) sensor may be a TMR magnetic angle sensor.

In still another embodiment, each of the first to third sensors 240A, 240B, and 240C may be a tunnel magnetoresistance (TMR) sensor. In this case, the TMR sensor may be a TMR linear magnetic field sensor having a linear output corresponding to the displacement (or the stroke) of the OIS moving unit.

The base 210 may be disposed under the first board unit 255. The base 210 may have a polygonal shape, for example, a quadrangular shape, which coincides with or corresponds to the shape of the cover member 300 or the first board unit 255.

In an example, the base 210 may include a lower plate 21A and a side plate 21B protruding from the edge of the lower plate 21A. The lower plate 21A may correspond to or face the first region 801 of the second board unit 800, and the side plate 21B may protrude or extend from the lower plate 21A toward the side plates 302 of the cover member 300. In an example, the base 210 may have a bore 210A formed in the lower plate 21A thereof. The bore 210A in the base 210 may be a through-hole formed through the base 210 in the optical-axis direction. In another embodiment, the base may not have a bore.

In an example, the side plate 21B of the base 210 may be coupled to the side plate 302 of the cover member 300. The base 210 may include a stair 211 (refer to FIG. 18A), to which an adhesive is applied in order to be bonded to the side plate 302 of the cover member 300. In this case, the stair 211 may guide the side plate 302 of the cover member 300 to be coupled to the upper side thereof. The stair 211 of the base 210 and the side plate 302 of the cover member 300 may be bonded and fixed to each other by means of an adhesive or the like.

The base 210 may include one or more protruding portions 216A to 216D, which protrude from the lower plate 21A. In an example, the one or more protruding portions 216A to 216D may protrude from the side plate 21B of the base 210.

In an example, the side plate 21B of the base 210 may include four side plates, and each of the protruding portions 216A to 216D may be formed on a respective one of the four side plates. In an example, each of the protruding portions 216A to 216D may be disposed or located on the center of a respective one of the four side plates.

The second board unit 800 may be disposed under the base 210. In an example, the second board unit 800 may be disposed under the lower plate 21A of the base 210. The second board unit 800 may be coupled to the base 210. In an example, the second board unit 800 may be coupled to the lower plate 21A of the base 210. In an example, the second board unit 800 may be coupled to the lower surface of the lower plate 21A of the base 210.

The second board unit 800 may serve to supply a signal from the outside to the image sensor unit 350 or to output a signal from the image sensor unit 350 to the outside.

The second board unit 800 may include a first region (or a first board) 801 corresponding to the AF moving unit 100 or the image sensor 810, a second region (or a second board) 802 disposed on the connector 804, and a third region (or a third board) 803 interconnecting the first region 801 and the second region 802. The connector 804 may be provided with ports in order to be conductively connected to the second region 802 of the second board unit 800 and to be conductively connected to an external device (e.g. the optical instrument 200A). The bore 210A in the base 210 may be closed or blocked by the first region 801 of the second board unit 800.

Each of the first region 801 and the second region 802 of the second board unit 800 may include a rigid substrate, and the third region 803 may include a flexible substrate. In addition, each of the first region 801 and the second region 802 may further include a flexible substrate.

In another embodiment, at least one of the first to third regions 801 to 803 of the second board unit 800 may include at least one of a rigid substrate or a flexible substrate.

The second board unit 800 may be disposed behind the first board unit 255. In an example, the first board unit 255 may be disposed between the AF moving unit 100 and the second board unit 800.

When viewed from above, the first region 801 of the second board unit 800 may have a polygonal shape (e.g. a quadrangular shape, a square shape, or a rectangular shape), but the disclosure is not limited thereto. In another embodiment, the first region 801 of the second board unit 800 may have a circular shape.

The second board unit 800 may include a plurality of terminals 800B corresponding to the terminals 311 of the support board 220.

Referring to FIG. 10A, the plurality of terminals 800B may be formed in the first region 801 of the second board unit 800. In an example, the second board unit 800 may include first terminals, which are disposed or arranged on one side of the first region 801 so as to be spaced apart from each other in the third direction (e.g. the y-axis direction), and second terminals, which are disposed or arranged on the opposite side of the first region 801 so as to be spaced apart from each other in the third direction (e.g. the y-axis direction).

In an example, the plurality of terminals 800B may be formed on a first surface 801A of the second board unit 800 (e.g. the first region 801), which faces the first board unit 255.

The second board unit 800 may have at least one coupling hole 800C formed therein for coupling to a coupling protrusion 45B of the base 210. The coupling hole 800C may be a through-hole formed through the second board unit 800 in the optical-axis direction. In another embodiment, the coupling hole may take the form of a recess.

In an example, the coupling protrusion 45B may protrude from the lower surface of the base 210. In an example, the coupling protrusion 45B of the base 210 may be formed on each of the corners of the lower surface of the base 210, which face each other in an oblique direction. In addition, the coupling hole 800C may be formed in each of the corners of the second board unit 800, which face each other in an oblique direction. In another embodiment, the coupling hole in the second board unit 800 may be disposed adjacent to at least one of the sides or the corners of the first region 801.

The second board unit 800 may have formed therein a bore 800A corresponding to the bore 210A in the base 210. The bore 800A may be a through-hole or a cavity formed through the second board unit 800, for example the first region 801, in the optical-axis direction. In another embodiment, the second board unit may not have the bore 800A. The bore 800A may have a shape corresponding to the shape of the bore 210A in the base 210, for example, a quadrangular shape. The bore 800A may have a size (e.g. a first area) larger than or equal to the size (e.g. a second area) of the bore 210A in the base 210. In another embodiment, the first area may be smaller than the second area.

Referring to FIG. 13B, when viewed from above or in the optical-axis direction, the bore 800A in the second board unit 800 may have a size (e.g. an area) larger than the size (or the area) of the lower surface of the first board unit 255.

In an example, when viewed from above or in the optical-axis direction, the first board unit 255 and the first heat dissipation member 370 may be located in the bore 800A in the second board unit 800.

Referring to FIG. 13, the second heat dissipation member 380 may be disposed on the second board unit 800 (e.g. the first region 801). In an example, the second heat dissipation member 380 may be disposed under or behind the second board unit 800. In an example, the second heat dissipation member 380 may be disposed on a second surface 801B of the second board unit 800.

In an example, the second heat dissipation member 380 may be attached, coupled, or secured to the second surface 801B of the second board unit 800. The second heat dissipation member 380 may close or seal the bore 800A in the second board unit 800. In an example, the edge of the second heat dissipation member 380 may be attached, coupled, or secured to the second surface 801B of the second board unit 800.

In an example, the second heat dissipation member 380 may be embodied as a plate-type member having a predetermined thickness and hardness. In addition, the second heat dissipation member 380 may receive heat from the first board unit 255 to dissipate the heat outside, thereby improving the heat dissipation effect.

In an example, the second heat dissipation member 380 may include a metal material having high thermal conductivity and high heat dissipation efficiency, for example, at least one of SUS, aluminum, nickel, bronze, phosphorus, or copper.

In an example, the first heat dissipation member 370 and the second heat dissipation member 380 may be formed of the same material. In another embodiment, the first heat dissipation member 370 and the second heat dissipation member 380 may be formed of different materials. In an example, the second heat dissipation member 380 may have the same thermal conductivity as the first heat dissipation member 370 or thermal conductivity similar thereto. The description of the material and thermal conductivity of the first and second heat dissipation members 370 and 380 may also apply to first and second heat dissipation members according to other embodiments to be described later.

In addition, the second heat dissipation member 380 may serve as a reinforcement member for stably supporting the second board unit 800 and inhibiting the second board unit 800 from being damaged by external impacts or contact.

In another embodiment, the second heat dissipation member 380 may be formed of a thermally conductive material having high thermal conductivity, for example, thermally conductive epoxy, thermally conductive plastic, or thermally conductive synthetic resin.

The second heat dissipation member 380 may include at least one groove 383 or at least one uneven portion in order to improve the heat dissipation effect. In an example, the groove 383 or the uneven portion may be formed in a predetermined pattern in a second surface 382 of the second heat dissipation member 380. The second surface 382 may be a surface formed opposite a first surface 381 of the second heat dissipation member 380.

In another embodiment, a predetermined pattern of the second heat dissipation member 380 may be formed in at least one of the first surface 381 or the second surface 382 of the second heat dissipation member 380.

In another embodiment, the second heat dissipation member may include a hole or a through-hole in place of the groove 383. In another embodiment, the second heat dissipation member may include a plurality of through-holes.

The description of the predetermined pattern of the first heat dissipation member 370 may also apply to the second heat dissipation member 380.

The bore 800A in the second board unit 800 may open or expose at least a portion of the second heat dissipation member 380. In an example, the bore 800A in the second board unit 800 may open or expose at least a portion of the first surface 381 (refer to FIG. 10A) of the second heat dissipation member 380.

In an example, the first surface 381 of the second heat dissipation member 380 that is exposed by the bore 800A may correspond to, face, or overlap the second surface 372 of the first heat dissipation member 370 in the optical-axis direction. In this case, the second surface 372 of the first heat dissipation member 370 may be spaced apart from the first surface 381 of the second heat dissipation member 380 that is exposed by the bore 800A.

The heat dissipated from the first heat dissipation member 370 may be transferred to the second heat dissipation member 380 through convection or radiation, and the transferred heat may be dissipated outside through the second heat dissipation member 380. Since the first surface 381 of the second heat dissipation member 380 and the second surface 372 of the first heat dissipation member 370 are disposed so as to face each other in the optical-axis direction, heat may be smoothly transferred from the first heat dissipation member 370 to the second heat dissipation member 380.

Referring to FIGS. 10A and 10B, when viewed from above or in the optical-axis direction, the area of the second heat dissipation member 380 may be larger than the area of the first heat dissipation member 370. In an example, the area of the first surface 381 (or the second surface 382) of the second heat dissipation member 380 may be larger than the area of the first surface 371 (or the second surface 372) of the first heat dissipation member 370. Accordingly, heat may be smoothly transferred from the first heat dissipation member 370 to the second heat dissipation member 380, and consequently, the heat dissipation effect may be improved.

The support board 310 may conductively connect the first board unit 255 to the second board unit 800. The support board 310 may alternatively be referred to as a "support member", a "connection board", or a "connection part". Alternatively, the support board 310 may be referred to as an "interposer".

The support board 310 may include a flexible substrate, or may be embodied as a flexible substrate. In an example, the support board 310 may include a flexible printed circuit board (FPCB). At least a portion of the support board 310 may be flexible. The first circuit board 250 and the support board 310 may be connected to each other.

In an example, the support board 310 may include a connection portion 320, which is connected to the first circuit board 250. In an example, the first circuit board 250 and the support board 310 may be integrally formed with each other. In another embodiment, the first circuit board 250 and the support board 310 may be provided separately from each other, rather than being integrated, and may be connected to each other via the connection portion 320. In an example, the first circuit board 250 and the support board 310 may be conductively connected to each other. In another embodiment, the connection portion 320 may be integrally formed with at least one of the support board 310 or the first circuit board 250.

In addition, the support board 310 may be conductively connected to the first circuit board 250. The support board 310 may be conductively connected to the second board unit 800.

The support board 310 may support the OIS moving unit with respect to the fixed unit. In addition, the support board 310 may guide movement of the OIS moving unit. The support board 310 may guide the OIS moving unit to move in a direction perpendicular to the optical-axis direction. The support board 310 may guide the OIS moving unit to rotate about the optical axis. The support board 310 may restrict movement of the OIS moving unit in the optical-axis direction.

A portion of the support board 310 may be connected to the first circuit board 250, which is the OIS moving unit. Another portion of the support board 310 may be coupled to the base 210, which is the fixed unit. In an example, the connection portion 320 of the support board 310 may be coupled to the first circuit board 250. In addition, bodies 86 and 87 of the support board 310 may be coupled to protruding portions 216C and 216D of the base 210, and terminal units 7A, 7B, 8A, and 8B of the support board 310 may be coupled to the second board unit 800.

Referring to FIGS. 15 to 18B, the support board 310 may include an elastic unit 310A and a circuit member 310B.

The elastic unit 310A serves to elastically support the OIS moving unit. The elastic unit 310A may be embodied as an elastic body, for example a spring. The elastic unit 310A may include metal, or may be made of an elastic material.

FIG. 16 illustrates embodiments of the elastic unit 310A.

The elastic unit 310A1 shown in FIG. 16(*a*) may include a planar portion 371A and an uneven portion 371B. The planar portion 371A may be provided in a plural number, and the uneven portion 371B may be formed between two planar portions. In an example, the uneven portion 371B may include at least one of a first bump 371B1 and a second bump 371B2. In an example, the first bump 371B1 and the second bump 371B2 may be formed to be symmetrical with each other in the vertical direction.

The elastic unit 310A2 shown in FIG. 16(*b*) may include a planar portion 372A and an uneven portion 372B. The planar portion 372A may be provided in a plural number, and the uneven portion 372B may be formed between two planar portions 372A. For example, the uneven portion 372B may take the form of a sinusoidal curve, sawteeth, or a zigzag.

The elastic unit 310A3 shown in FIG. 16(*c*) may include a first planar portion 373A and a second planar portion 373B. The length of the first planar portion 373A in the first direction (or the optical-axis direction) may be different from the length of the second planar portion 373B in the first direction (or the optical-axis direction). In an example, the former may be longer than the latter. The first planar portion 373A may be provided in a plural number, and the second planar portion 373B may be provided in a plural number. In an example, the first planar portion 373A and the second planar portion 373B may be formed to be uneven with respect to each other.

The elastic unit 310A4 shown in FIG. 16(*d*) may include a first planar portion 373A, a second planar portion 373B, and a protruding portion (or an extension portion) protruding or extending from the first planar portion 373A.

In another embodiment, only corner portions of each of the elastic units shown in FIGS. 16(*a*) to 16(*d*) may be included.

The elastic unit 310A may include at least one of the elastic units 310A1 to 310A4 shown in FIGS. 16(*a*) to 16(*d*).

The circuit member 310B may be conductively connected to the first circuit board 250 and the second board unit 800. The circuit member 310B may be embodied as a flexible substrate, or may include at least one of a flexible substrate or a rigid substrate. The circuit member 310B may be, for example, an FPCB.

The elastic unit 310A may be coupled to the circuit member 310B, and may serve to increase the strength of the circuit member 310B. Referring to FIGS. 15 and 17, the elastic unit 310A may be disposed outside the circuit member 310B, and the outer side surface of the circuit member 310B may be coupled to the inner side surface of the elastic unit 310A. In another embodiment, the circuit member may be disposed outside the elastic unit.

The support board 310 may be connected to the first board unit 255 (e.g. the first circuit board 250), and may include one or more connection portions 320A and 320B, which are conductively connected to the first board unit 255 (e.g. the first circuit board 250). In addition, the support board 310 may be connected to the second board unit 800, and may include one or more terminal units 7A, 7B, 8A, and 8B, which are conductively connected to the second board unit 800. Each of the terminals 7A, 7B, 8A, and 8B may include a plurality of terminals 311.

Referring to FIGS. 15 and 17, the support board 310 may include a first support board 310-1 and a second support board 310-2, which are spaced apart from each other. The first support board 310-1 and the second support board 310-2 may be formed to be bilaterally symmetrical with each other. In another embodiment, the first support board 310-1 and the second support board 310-2 may be integrated into a single board.

As shown in FIG. 17, the first support board 310-1 and the second support board 310-2 may be disposed on respective sides of the first circuit board 250. In an example, the first support board 310-1 may include a first body 86 and one or more terminal units 7A and 7B extending from the first body 86. Each of the terminal units 7A and 7B of the first support board 310-1 may include a plurality of terminals 311.

The second support board 310-2 may include a second body 87 and one or more terminal units 8A and 8B extending from the second body 87. Each of the terminals units 8A and 8B of the second support board 310-2 may include a plurality of terminals 311.

The first circuit board 250 may include a first side portion 33A and a second side portion 33B, which are located opposite each other, and may further include a third side portion 33C and a fourth side portion 33D, which are located between the first side portion 33A and the second side portion 33B and are located opposite each other.

The first body 86 may include a first portion 6A, which corresponds to or faces the first side portion 33A of the first circuit board 250, a second portion 6B, which corresponds to a portion (or one side) of the third side portion 33C of the first circuit board 250, and a third portion 6C, which corresponds to a portion (or one side) of the fourth side portion 33D of the first circuit board 250. In addition, the first body 86 may include a first bent portion 6D, which interconnects the first portion 6A and the second portion 6B and is bent from one end of the first portion 6A, and a second bent portion 6E, which interconnects the first portion 6A and the third portion 6C and is bent from the other end of the first portion 6A.

The first support board 310-1 may include a first terminal unit 7A, which extends or protrudes from the second portion 6B of the first body 86 toward the second board unit 800, and a second terminal unit 7B, which extends or protrudes from the third portion 6C of the first body 86 toward the second board unit 800. The second terminal unit 7B may be located opposite the first terminal unit 7A.

The first support board 310-1 may include a first connection portion 320A, which interconnects the first portion 6A of the first body 86 and the first side portion 33A of the first circuit board 250. The first connection portion 320A may include a bent portion.

The second body 87 may include a first portion 9A, which corresponds to or faces the second side portion 33B of the first circuit board 250, a second portion 9B, which corresponds to another portion (or opposite side) of the third side portion 33C of the first circuit board 250, and a third portion 9C, which corresponds to another portion (or opposite side) of the fourth side portion 33D of the first circuit board 250. In addition, the second body 87 may include a first bent portion 9D, which interconnects the first portion 9A and the second portion 9B and is bent from one end of the first portion 9A, and a second bent portion 9E, which interconnects the first portion 9A and the third portion 9C and is bent from the other end of the first portion 9A.

The second support board 310-2 may include a third terminal unit 8A, which extends or protrudes from the second portion 9B of the second body 87 toward the second board unit 800, and a fourth terminal unit 8B, which extends or protrudes from the third portion 9C of the second body 87 toward the second board unit 800. The fourth terminal unit 8B may be located opposite the third terminal unit 8A.

The second support board 310-2 may include a second connection portion 320B, which interconnects the first portion 9A of the second body 87 and the second side portion 33B of the first circuit board 250. The second connection portion 320B may include a bent portion.

In addition, the first support board 310-1 may include a first flexible board 31A, which conductively connects the first board unit 255 (e.g. the first circuit board 250) to the second board unit 800, and a first elastic member 30A, which is coupled to the first flexible board 31A.

The second support board 310-2 may include a second flexible board 31B, which conductively connects the first board unit 255 (e.g. the first circuit board 250) to the second board unit 800, and a second elastic member 30B, which is coupled to the second flexible board 31B.

Although the support board 310 is illustrated in FIGS. 18A and 18B as including two support boards 310-1 and 310-2, the disclosure is not limited thereto. In another embodiment, the support board 310 may be configured such that two support boards are integrated into a single board. In still another embodiment, the support board 310 may include three or more support boards.

The terminal unit (e.g. 8B) of the support board 310 may be provided with terminals P1 to P4 in order to be conductively connected to the terminals B1 to B4 of the terminal unit 95 of the circuit board 190 of the AF moving unit 100. The terminals B1 to B4 of the terminal unit 95 of the circuit board 190 and the terminals P1 to P4 of the terminal unit 8B of the support board 310 may be conductively connected to each other by means of solder or a conductive adhesive. That is, the circuit board 190 of the AF moving unit 100 may be conductively connected to the second board unit 800 via the support board 310.

Referring to FIG. 17, the circuit member 310B of the support board 310 may include a first insulating layer 29A, a second insulating layer 29B, and a conductive layer 29C formed between the first insulating layer 29A and the second insulating layer 29B. The conductive layer 29C may be a wiring layer for transmitting an electrical signal. In an example, the second layer 29B may be located outside the first layer 29A.

Each of the first and second insulating layers 29A and 29B may be formed of an insulating material, such as polyimide, and the conductive layer 29C may be formed of a conductive material, such as copper, gold, or aluminum, or may be formed of an alloy including copper, gold, or aluminum.

The elastic unit 310A may be disposed on the second layer 29B. The elastic unit 310A may include at least one of copper, titanium, or nickel, or may be formed of an alloy including at least one of copper, titanium, or nickel in order to serve as a spring. In an example, the elastic unit 310A may be formed of an alloy of copper and titanium or an alloy of copper and nickel.

The elastic unit 310A may be conductively connected to the ground of the first board unit 255 or the ground of the second board unit 800. The elastic unit 310A may be used for impedance matching of transmission lines (or wires) of the board units 255, 310, and 800, and may reduce loss of transmission signals through impedance matching to reduce the influence of noise. In an example, the matching impedance may be 40 ohms to 600 ohms. In another example, the matching impedance may be 50 ohms.

In an example, an EMI member (e.g. a sheet of EMI tape) or a conductive member (e.g. a sheet of conductive tape) may be used for impedance matching.

The support board 310 may include a metal member or a conductive member formed on the outer surface thereof. For example, the metal member may be an EMI member (e.g. a sheet of EMI tape) or a conductive member (e.g. a sheet of conductive tape).

In an example, the EMI member or the conductive member may be disposed on or attached to at least one of the elastic unit 310A or the circuit member 310B.

The support board 310 may further include a protective member or an insulating member for enveloping or covering the elastic unit 310A.

In an example, the thickness T11 of the conductive layer 29C between the first layer 29A and the second layer 29C may be 7 micrometers to 50 micrometers. In another embodiment, the thickness T11 may be 15 micrometers to 30 micrometers.

In addition, in an example, the thickness T12 of the elastic unit 310A may be 20 micrometers to 150 micrometers. In another embodiment, the thickness T12 may be 30 micrometers to 100 micrometers. In an example, the thickness T12 of the elastic unit 310A may be larger than the thickness T11 of the conductive layer 29C. In another embodiment, T12 may be equal to or smaller than T11.

Referring to FIGS. 14B, 15, 17, 18A, and 18B, the holder 270 may include first to fourth side portions corresponding to the first to fourth side portions 33A to 33D of the first circuit board 250.

At least a portion of the support board 310 may be attached or coupled to the holder 270. In an example, at least one of the connection portions 320A and 320B of the support board 310 may be coupled to at least one of the first to fourth side portions of the holder 270 by means of an adhesive. In an example, the first connection portion 320A may be coupled to the first side portion of the holder 270 by means of an adhesive, and the second connection portion 320B may be coupled to the second side portion of the holder 270 by means of an adhesive.

The first to fourth side portions of the holder 270 may be provided with protruding portions 4A to 4D. In an example, the first connection portion 320A and the first protruding portion 4A formed on the first side portion of the holder 270 may form a first coupling region 38A (refer to FIG. 18A), in which the first connection portion 320A and the first protruding portion 4A are coupled to each other. The second connection portion 320A and the second protruding portion 4B formed on the second side portion of the holder 270 may form a second coupling region 38B (refer to FIG. 18A), in which the second connection portion 320A and the second protruding portion 4B are coupled to each other.

In addition, the base 210 may include first to fourth side portions corresponding to the first to fourth side portions 33A to 33D of the first circuit board 250. In an example, the side plate 21B of the base 210 may include the first to fourth side portions of the base 210. The first to fourth side portions of the base 210 may be provided with protruding portions 216A to 216D.

At least a portion of the support board 310 may be coupled to the base 210. In an example, the bodies 86 and 87 of the support board 310 may be coupled to the base 210 by means of an adhesive. In an example, a portion of each of the bodies 86 and 87 of the support board 310, which are connected to the terminal units 7A, 7B, 8A, and 8B, may be coupled to the base 210.

In an example, the first terminal unit 7A and/or the second portion 6B of the first support board 310-1 may be coupled to one region of the third side portion (or the third protruding portion 216C) of the base 210, and the second terminal unit 7B and/or the third portion 6C of the first support board 310-1 may be coupled to one region of the fourth side portion (or the fourth protruding portion 216D) of the base 210.

In an example, the third terminal unit 8A and the second portion 9B of the second support board 310-2 may be coupled to another region of the third side portion (or the third protruding portion 216C) of the base 210, and the fourth terminal unit 8B and the third portion 9C of the second support board 310-2 may be coupled to another region of the fourth side portion (or the fourth protruding portion 216D) of the base 210.

A third coupling region 39A (refer to FIG. 18A) may be formed between the first and third terminal units 7A and 8A of the support board 310 and the third side portion (or the third protruding portion 216C) of the base 210, and a fourth coupling region 39B (refer to FIG. 18A) may be formed between the second and fourth terminal units 7B and 8B of the support board 310 and the fourth side portion (or the fourth protruding portion 216D) of the base 210. The OIS moving unit may be elastically supported with respect to the fixed unit by the support board 310 and the first to fourth coupling regions 38A, 38B, 39A, and 39B. The terminals 311 of the support board 310 may be coupled to the terminals of the second board unit 800 by means of solder or a conductive adhesive, and may be conductively connected thereto.

Referring to FIGS. 18A and 18B, a portion of the support board 310 may be coupled to the outer side surface of the base 210 (or the protruding portions 216A to 216D). In another embodiment, a portion of the support board 310 may be coupled to the inner side surface of the base 210 (or the protruding portions 216A to 216D).

In another embodiment, the support member may be an elastic member including no substrate, for example, a spring, a wire, a shape memory alloy, or a ball member. In an example, in the case in which the support member is a wire, a plurality of wires may be disposed on at least one of the corners or the side portions of the base 210 or the second board unit 800, and may interconnect the first board unit 255

(e.g. the second circuit board 260) and the second board unit 800 (or the base 210). In an example, one end of each of the plurality of wires may be coupled to the first board unit 255 (e.g. the second circuit board 260), and the other end of each of the plurality of wires may be coupled to the second board unit 800 (or the base 210).

The elastic member 315 may elastically support the first board unit 255 with respect to the base 210. In an example, one end of the elastic member 315 may be coupled to the first board unit 255, and the other end of the elastic member 315 may be coupled to the fixed unit, for example, the base 210.

Referring to FIGS. 18A, 18B, and 19, the elastic member 315 may include a first coupling portion 315A, which is coupled to the first circuit board 250 of the first board unit 255, a second coupling portion 315B, which is coupled to the base 210, and a connection portion 315C, which interconnects the first coupling portion 315A and the second coupling portion 315B.

In an example, the first coupling portion 315A may be coupled to at least a portion of the lower surface of the first circuit board 250. Alternatively, the first coupling portion 315A may be coupled to at least a portion of the lower surface of the holder 270. In an example, the first coupling portion 315A may be coupled to at least one of the lower surface of the first circuit board 250 or the lower surface of the holder 270 by means of an adhesive.

In an example, the second coupling portion 315B may be coupled to at least a portion of the upper surface of the base 210. In an example, the base 210 may be provided on the upper surface thereof with at least one protrusion 210-1 (refer to FIG. 18A), and the second coupling portion 315B may have a hole 315-1 formed therein for coupling to the at least one protrusion 210-1 of the base 210. The protrusion 210-1 may be formed on a corner of the upper surface of the base 210, and the hole 315-1 may be formed in a corner of the second coupling portion 315B.

In an example, when viewed in the first direction or from below, each of the first coupling portion 315A and the second coupling portion 315B may have a polygonal shape, such as a quadrangular shape, and may take the form of a closed curve. In an example, when viewed in the first direction or from below, the shape of the first coupling portion 315A may be a quadrangular ring shape.

In an example, when viewed in the first direction or from below, the first coupling portion 315A may be disposed inside the second coupling portion 315B. Each of the first coupling portion 315A and the second coupling portion 315B may take the form of a plate.

The connection portion 315C may include at least one of at least one linear portion or at least one bent portion. In an example, the connection portion 315C may take the form of a wire. In another embodiment, the connection portion 315C may take the form of a plate.

The connection portion 316C may include a plurality of connection portions or connection lines, which are spaced apart from each other. Each of the plurality of connection portions (or connection lines) may include at least one of at least one linear portion or at least one bent portion. For example, the connection portion 316C may extend in a direction perpendicular to the optical axis.

The image sensor unit 350 may include at least one of a motion sensor 820, a controller 830, a memory 512, or a capacitor 514.

The motion sensor 820, the controller 830, and the memory 512 may be disposed on any one of the first board unit 255 and the second board unit 800. The capacitor 514 may be disposed on at least one of the first board unit 255 or the second board unit 800.

In an example, the motion sensor 820 and the memory 512 may be disposed on the second board unit 800 (e.g. the first region 801). In an example, the controller 830 may be disposed or mounted on the first circuit board 250 of the first board unit 255.

In another embodiment, the controller 830 may be disposed on the second board unit 800. Because the heat generated from the image sensor 810 may cause malfunction or errors of the controller 830, it may be preferable for the controller 830 to be located far away from the image sensor 810.

The motion sensor 820 may be conductively connected to the controller 830 via wirings or circuit patterns formed on the first board unit 255 and the second board unit 800. The motion sensor 820 may output rotational angular speed information regarding the movement of the camera device 10. The motion sensor 820 may be embodied as a two-axis or three-axis gyro sensor or an angular speed sensor. In an example, the motion sensor 820 may output information about the movement amount in the x-axis direction, the movement amount in the y-axis direction, and the rotation amount in response to movement of the camera device 10.

In another embodiment, the motion sensor 820 may be omitted from the camera device 10, or may be disposed in another region of the second board unit 800. In the case in which the motion sensor 820 is omitted from the camera device, the camera device 10 may receive position information from a motion sensor provided in the optical instrument 200A in response to movement of the camera device 10.

The memory 512 may store a first data value (or a code value) corresponding to the output from the second position sensor 240 according to displacement (or stroke) of the OIS moving unit in the second direction (e.g. the x-axis direction) in order to implement OIS feedback operation.

In addition, the memory 512 may store a second data value (or a code value) corresponding to the output from the first position sensor 170 according to displacement (or stroke) of the bobbin 110 in the first direction (e.g. the optical-axis direction or the z-axis direction) in order to implement OIS feedback operation.

In an example, each of the first and second data values may be stored in the memory 512 in the form of a look-up table. Alternatively, each of the first and second data values may be stored in the memory 512 in the form of an equation or an algorithm. In addition, the memory 512 may store an equation, an algorithm, or a program for operation of the controller 830. In an example, the memory 512 may be a non-volatile memory, for example, an electrically erasable programmable read-only memory (EEPROM).

The controller 830 may be conductively connected to the first position sensor 170 and the second position sensor 240. The controller 830 may control a drive signal that is supplied to the second coil 230 using the output signals received from the sensors 240A, 240B, and 240C of the second position sensor 240 and the first data value stored in the memory 512, and may perform feedback OIS operation.

In addition, the controller 830 may control a drive signal that is supplied to the first coil 120 using the output signal from the first position sensor 170 and the second data value stored in the memory 512, and may perform feedback auto-focusing operation.

The controller 830 may be embodied as a driver IC, but the disclosure is not limited thereto. In an example, the controller 830 may be conductively connected to the terminals 251 of the first circuit board 250 of the first board unit 255.

The image sensor unit 350 may further include a filter 610. In addition, the image sensor unit 350 may further include a filter holder 600, in which the filter 610 is disposed, seated, or accommodated. The filter holder 600 may alternatively be referred to as a "sensor base".

The filter 610 may serve to block or allow introduction of light within a specific wavelength range, among the light that has passed through the lens barrel 400, into the image sensor 810.

The filter 610 may be, for example, an infrared cut filter. In an example, the filter 610 may be disposed parallel to the xy-plane, which is perpendicular to the optical axis OA. The filter 610 may be disposed below the lens module 400.

The filter holder 600 may be disposed below the AF moving unit 100. In an example, the filter holder 600 may be disposed on the first board unit 255. In an example, the filter holder 600 may be disposed on the first surface 260A of the second circuit board 260 of the first board unit 255.

The filter holder 600 may be coupled to one region of the second circuit board 260 around the image sensor 810 by means of an adhesive, and may be exposed through the bore 250A in the first circuit board 250. In an example, the filter holder 600 may be visible through the bore 250A in the first circuit board 250 of the first board unit 255. In an example, the bore 250A in the first circuit board 250 may expose the filter holder 600 disposed on the second circuit board 260 and the filter 610 disposed on the filter holder 600. In another embodiment, the filter holder may be coupled to the holder 270 or to the AF moving unit 100.

The filter holder 600 may have a bore 61A formed in a portion thereof, to which the filter 610 is mounted or on which the filter 610 is disposed, in order to allow the light passing through the filter 610 to be introduced into the image sensor 810. The bore 61A in the filter holder 600 may be a through-hole formed through the filter holder 600 in the optical-axis direction. In an example, the bore 61A in the filter holder 600 may be formed through the center of the filter holder 600, and may be disposed so as to correspond to or face the image sensor 810.

The filter holder 600 may include a seating portion 500, which is depressed from the upper surface thereof to allow the filter 610 to be seated thereon. The filter 610 may be disposed, seated, or mounted on the seating portion 500. The seating portion 500 may be formed so as to surround the bore 61A. In another embodiment, the seating portion of the filter holder may take the form of a protruding portion protruding from the upper surface of the filter.

The image sensor unit 350 may further include an adhesive disposed between the filter 610 and the seating portion 500, and the filter 610 may be coupled or attached to the filter holder 600 by means of the adhesive.

The cover member 300 may take the form of a box that has an open lower portion and includes an upper plate 301 and side plates 302. The lower portions of the side plates 302 of the cover member 300 may be coupled to the base 210. The shape of the upper plate 301 of the cover member 300 may be a polygonal shape, for example, a quadrangular shape or an octagonal shape. The cover member 300 may have a bore 303 formed in the upper plate 301 thereof to expose the lens of the lens module 400 coupled to the bobbin 110 to external light.

Referring to FIGS. 1 and 3, any one of the side plates 302 of the cover member 300 may have a recess portion 304 formed therein to expose the terminal 95 of the circuit board 190 and the terminal 800B of the second board unit corresponding thereto.

The cover member 300 may include a protruding portion 305 extending from the upper plate 301 toward the groove 119 in the bobbin 110. The protruding portion 305 may alternatively be referred to as an "extension portion". In an example, the cover member 300 may include at least one protruding portion 305 extending from one region adjacent to the bore 303 formed in the upper plate 301 toward the upper surface of the bobbin 110. The protruding portion 305 may be integrally formed with the upper plate 301 and the side plates 302, and may be made of the same material as the upper plate 301 and the side plates 302.

In an example, the cover member 300 may include four protruding portions corresponding to the four corners of the upper plate 301. In another embodiment, the number of protruding portions 305 may be one or two or more.

In an example, the protruding portion 305 may take the form of a polygonal-shaped plate, for example, a quadrangular-shaped plate. In an example, at least part of the protruding portion 305 may include a curved portion.

At least part of the protruding portion 305 of the cover member 300 may be disposed in or inserted into the groove 119 in the bobbin 110. In an example, one end or a distal end of the protruding portion 305 may be disposed in the groove 119 in the bobbin 110. In an example, at the initial position of the bobbin 110, the protruding portion 305 and the bottom surface of the groove 119 in the bobbin 110 may be spaced apart from each other.

When the bobbin 110 is moved in the optical-axis direction during AF operation, the protruding portion 305 of the cover member 300 may come into contact with the bottom surface of the groove 119 in the bobbin 110. Accordingly, the protruding portion 305 may serve as a stopper restricting movement of the bobbin 110 in the upward direction within a predetermined range. In addition, since at least part of the protruding portion 305 is disposed in the groove 119 in the bobbin 110, the protruding portion 305 may suppress or inhibit the bobbin 110 from rotating beyond a predetermined range about the optical axis due to an impact.

In an example, the cover member 300 may be formed of a metal material. For example, the cover member 300A may be formed of steel use stainless (SUS) (e.g. a SUS-4-based material). In addition, the cover member 300A may be formed of a steel plate cold commercial (SPC). For example, the cover member 300A may be formed of a SUS material containing an iron (Fe) component in an amount of 50 percent (%) or more. In addition, in an example, an oxidation-resistant metal, for example nickel, may be plated on the surface of the cover member 300A in order to inhibit oxidation. In addition, in another embodiment, the cover member 300A may be formed of a magnetic material or a magnetic metal material.

In still another embodiment, the cover member 300 may be formed of an injection-molded material, for example, plastic or a resin material. In addition, the cover member 300 may be made of an insulating material or a material capable of blocking electromagnetic waves.

The cover member 300 and the base 210 may accommodate the AF moving unit 100 and the image sensor unit 350, may protect the AF moving unit 100 and the image sensor unit 350 from external impacts, and may inhibit introduction of external foreign substances thereinto.

The OIS moving unit is movable relative to the fixed unit in a direction perpendicular to the optical axis OA. The OIS moving unit is spaced apart from the fixed unit by a predetermined distance. That is, the OIS moving unit may be suspended (flown) from the fixed unit by the support board 310. The OIS moving unit may be moved relative to the fixed unit by the first electromagnetic force generated by the magnet 130 and the second coil 230 and the second electromagnetic force generated by the second magnet 24 and the second coil 230.

In an example, at the initial position of the OIS moving unit, the outer surface of the holder 270 may be spaced apart from the inner surface of the base 210 by a predetermined distance. In addition, in an example, at the initial position of the OIS moving unit, the lower surfaces of the holder 270 and the first board unit 255 may be spaced apart from the base 210 by a predetermined distance.

In an example, the first to fourth coil units 230-1 to 230-4 of the second coil 230 may controlled by four channels. In this case, the four coil units 230-1 to 230-4 may be controlled in the state of being conductively separated from each other. In an example, any one of a forward direction current and a reverse direction current may be selectively applied to each of the coil units 230-1 to 230-4. In this case, four pairs of lead wires, i.e. a total of eight lead wires, may be led out from the second coil 230.

In another embodiment, the first to fourth coil units 230-1 to 230-4 of the second coil 230 may be controlled by three channels in order to implement OIS operation. In an example, the first to third coil units 230-1 to 230-3 may be conductively separated from each other, and the fourth coil unit 230-4 may be conductively connected in series to any one of the first to third coil units. In this case, three pairs of lead wires, i.e. a total of six lead wires, may be led out from the second coil 230.

In an example, the second coil unit 230-2 and the fourth coil unit 230-4 may be connected in series to each other. The magnetization direction of the second magnet unit 130-2, which corresponds to or faces the second coil unit 230-2, and the magnetization direction of the fourth magnet unit 120-4, which corresponds to or faces the fourth coil unit 230-4, may be the same as each other. In an example, the magnetization direction of the first magnet unit 130-1 and the magnetization direction of the third magnet unit 130-3 may be the same as each other. In addition, in an example, the magnetization direction of the second magnet unit 130-2 may be different from the magnetization direction of the first magnet unit 130-1. In an example, the magnetization direction of the second magnet unit 130-2 may be perpendicular to the magnetization direction of the first magnet unit 130-1.

The controller 830 may supply at least one drive signal to at least one of the first to fourth coil units 230-1 to 230-4, and may control the at least one drive signal to move the OIS moving unit in the x-axis direction and/or the y-axis direction or rotate the OIS moving unit within a predetermined angular range about the optical axis.

Figure 21:
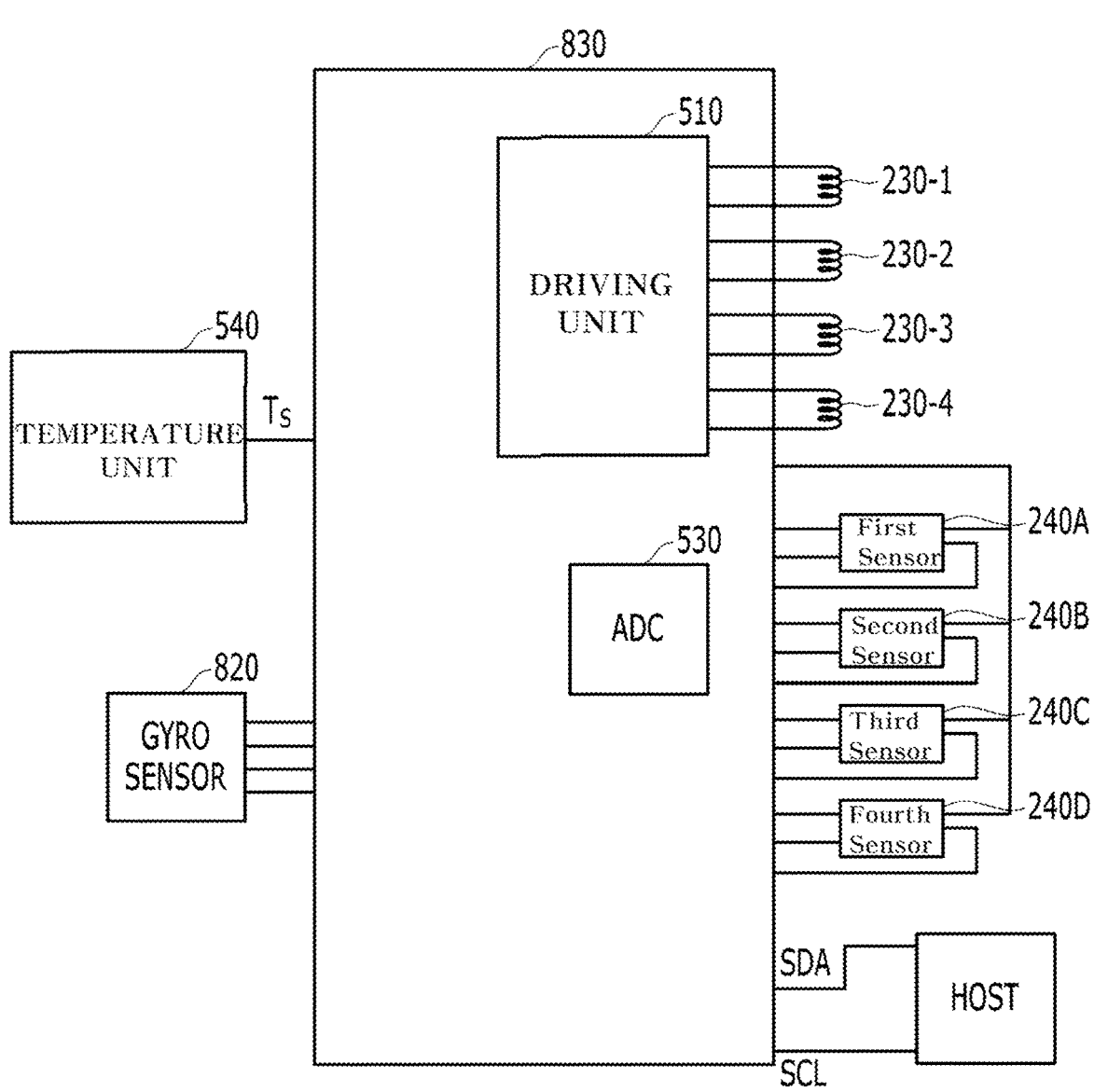
FIG. 21 is a block diagram of a controller and first to third sensors.

FIG. 21 is a block diagram of the controller 830 and the first to third sensors 240A, 240B, and 240C. The controller 830 may perform communication of transmitting and receiving data to and from a host using a clock signal SCL and a data signal SDA, for example, I2C communication. In an example, the host may be the controller 780 of the optical instrument 200A.

The controller 830 may be conductively connected to the second coil 230. The controller 830 may include a driving unit 510 for supplying a drive signal required to drive the first to fourth coil units 230-1 to 230-4. In an example, the driving unit 510 may include an H bridge circuit or an H bridge driver capable of changing the polarity of the drive signal. In this case, the drive signal may be a PWM signal in order to reduce consumption of current, and the drive frequency of the PWM signal may be 20 KHz or more, which is outside of the audible frequency band. In another embodiment, the drive signal may be a DC signal.

Each of the first to third sensors 240A to 240C may include two input terminals and two output terminals. The controller 830 may supply power or a drive signal to two input terminals of each of the first to third sensors 240A to 240C. In an example, any one of the two input terminals (a (+) input terminal and a (−) input terminal) of each of the first to third sensors 240A to 240C (e.g. a ground terminal or the (−) input terminal) may be commonly connected.

In an example, the controller 830 may receive a first output voltage from the first sensor 240A, a second output voltage from the second sensor 240B, and a third output voltage from the third sensor 240C, and may control movement (or displacement) of the OIS moving unit in the x-axis direction or the y-axis direction using the received first to third output voltages.

In addition, the controller 830 may control rotation, tilting, and rolling of the OIS moving unit about the optical axis using the received first to third output voltages.

In addition, the controller 830 may include an analog-to-digital converter 530, which receives output voltage from the two output terminals of each of the first to third sensors 240A to 240C and outputs a data value, a digital value, or a code value corresponding to the result of the analog-to-digital conversion of the received output voltage.

The controller 830 may control movement (or displacement) of the OIS moving unit in the x-axis direction or the y-axis direction and rotation, tilting, or rolling of the OIS moving unit about the optical axis using the data values output from the analog-to-digital converter 530.

A temperature sensor 540 may measure the ambient temperature (e.g. the temperature of each of the first to third sensors 240A, 240B, and 240C), and may output a temperature detection signal Ts corresponding to the result of the measurement. In an example, the temperature sensor 540 may be a thermistor.

The resistance value of a resistor included in the temperature sensor 540 may vary depending on changes in the ambient temperature, and accordingly, the value of the temperature detection signal Ts may vary depending on changes in the ambient temperature. An Equation or a look-up table relating to the relationship between the ambient temperature and the temperature detection signal Ts may be stored in the memory or the controller 830 or 780 through calibration.

Because the output values from the first to third sensors 240A, 240B, and 240C are also affected by temperature, it is necessary to compensate for the output values from the first to third sensors 240A, 240B, and 240C according to the ambient temperature in order to accurately and reliably implement OIS feedback operation.

To this end, in an example, the controller 830 or 780 may compensate for the output value (or the data value corresponding to output) from each of the first to third sensors 240A, 240B, and 240C using the ambient temperature measured by the temperature sensor 540 and a temperature compensation algorithm or compensation equation. The temperature compensation algorithm or compensation equation may be stored in the controller 830 or 780 or the memory.

The camera device may further include a fourth sensor 240D, which corresponds to or faces the fourth magnet unit 130-4 in the optical-axis direction. The fourth sensor 240D may be disposed on the first board unit 255 (e.g. the first circuit board 250). In an example, the fourth sensor 240D may be disposed adjacent to any one corner of the first circuit board 250, on which the first to third sensors are not disposed. In an example, the fourth sensor 240D may be located so as to face the second sensor 240B in an oblique direction. In an example, the output voltage from the fourth sensor 240D may be used to detect movement of the OIS moving unit in the x-axis direction or the y-axis direction. In another embodiment, the fourth sensor 240D may correspond to the first position sensor 170 of the AF moving unit 100.

As the function and the performance of an optical instrument, e.g. a camera device mounted in a cellular phone, are improved, the size of a lens, the size of an image sensor, and the number of pixels are increased. Accordingly, the amount of current that is consumed to move the lens and the image sensor is increased, and the amount of heat that is generated from the camera device is increased due to the increase in the amount of current that is consumed. In general, a heat source of a camera device may be at least one of an image sensor, a driver IC (e.g. a position sensor or a controller), an AF driving coil, or an OIS driving coil.

Due to the increase in the size of the image sensor, the increase in the amount of current that is consumed, and the increase in the communication speed of the driver IC, the amount of heat that is generated from the image sensor, the drive coil, and the driver IC may be increased, and accordingly, the temperature of the camera device may rise. The increase in the amount of heat that is generated may increase noise of the image sensor, and consequently may deteriorate the resolution of the image sensor. In addition, the increase in the amount of heat that is generated may cause expansion of the lens, and accordingly, the effective focal length (EFL) of the lens may vary, leading to deterioration in the reliability of auto-focusing.

Figure 22:
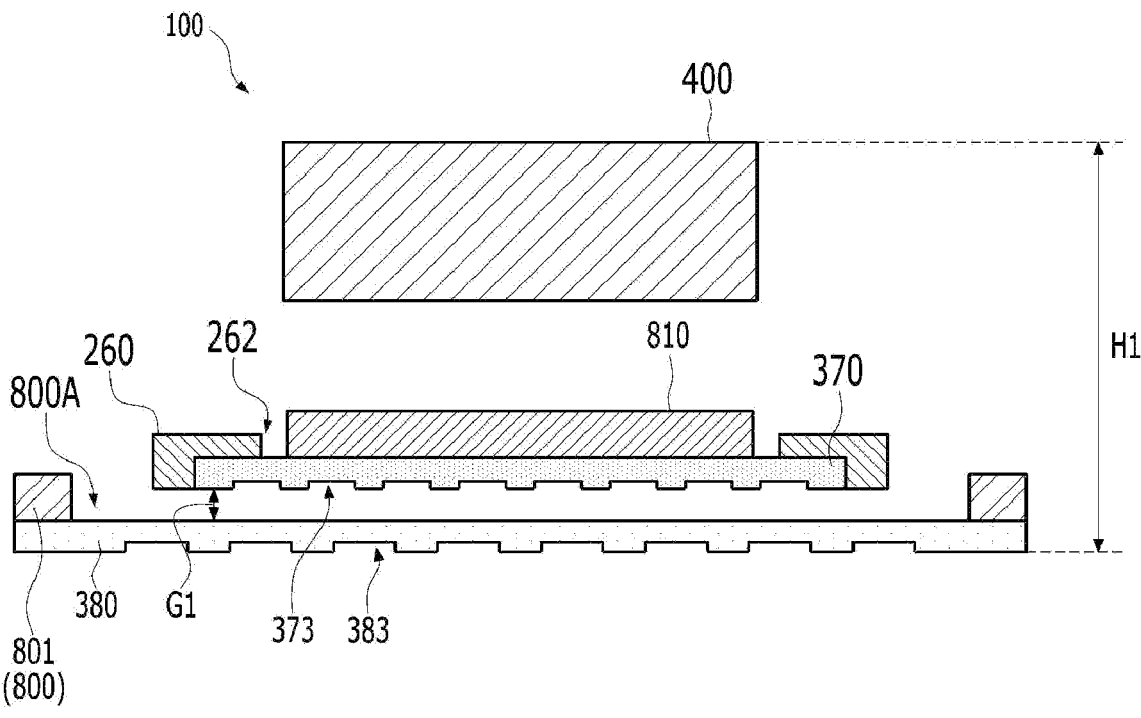
FIG. 22 is a schematic conceptual view of the lens module, the second circuit board, the image sensor, the first heat dissipation member, the second board unit, and the second heat dissipation member shown in FIG. 4B.

FIG. 22 is a schematic conceptual view of the lens module 400, the second circuit board 260, the image sensor 810, the first heat dissipation member 370, the second board unit 800, and the second heat dissipation member 380 shown in FIG. 4B.

Referring to FIG. 22, the first heat dissipation member 370, which is formed of a thermally conductive material having high thermal conductivity, is disposed on the second circuit board 260 of the first board unit 255, and the image sensor 810 is directly disposed on, coupled to, mounted on, or attached to the first surface 371 of the first heat dissipation member 370 that is exposed through the bore 262 in the second circuit board 260.

The thermal conductivity of the first heat dissipation member 370 may be higher than the thermal conductivity of the first board unit 255, for example, the second circuit board 260. The heat generated from the image sensor 810 may be effectively dissipated through the first heat dissipation member 370, and thus the heat dissipation efficiency may be improved. Since the heat generated from the image sensor 810 is quickly dissipated outside through the first heat dissipation member 370, it is possible to inhibit the temperature of the image sensor 810 from rising high. Accordingly, the embodiment may inhibit noise of the image sensor from being increased due to the increase in the amount of heat that is generated, and may inhibit deterioration in the resolution of the image sensor.

In addition, since the second heat dissipation member 380 having high thermal conductivity is disposed on, coupled to, or attached to the second board unit 800, the embodiment may enable the heat transferred from the first heat dissipation member 370 to be smoothly dissipated and escape outside.

Since each of the first heat dissipation member 370 and the second heat dissipation member 380 include a groove, a hole, or an uneven portion 373 or 383 formed in a predetermined pattern, it is possible to increase the heat dissipation area, thus further improving the heat dissipation effect.

When viewed in a direction perpendicular to the optical axis, at least a portion of the first board unit 255 (and/or the first heat dissipation member 370) may be disposed in the bore 800A in the second board unit 800. Accordingly, the gap G1 between the first heat dissipation member 370 and the second heat dissipation member 380 may be reduced, and the heat dissipation effect may be improved. In another embodiment, when viewed in a direction perpendicular to the optical axis, the first board unit 255 (and/or the first heat dissipation member 370) may be located outside the bore 800A in the second board unit 800, or may be located above the bore 800A in the second board unit 800.

In an example, at least a portion (e.g. the lower portion or the lower end) of the first board unit 255 (and/or the first heat dissipation member 370) may overlap the inner circumferential surface of the second board unit 800 in a direction perpendicular to the optical axis. In this case, the inner circumferential surface of the second board unit 800 may be a surface formed by the bore 800A.

Alternatively, in an example, the distance G1 between the second heat dissipation member 380 and the first heat dissipation member 370 in the optical-axis direction may be shorter than the distance between the second heat dissipation member 380 and the first surface 801A of the second board unit 800. In another embodiment, the distance G1 may be equal to or longer than the distance between the second heat dissipation member 380 and the first surface 801A of the second board unit 800.

The spacing distance (or the gap) G1 between the first board unit 255 and the second board unit 800 in the optical-axis direction may be 0.05 mm to 0.7 mm. In an example, the spacing distance G1 may be a distance from the second surface 372 of the first heat dissipation member 370 to the first surface 381 of the second heat dissipation member 380. Alternatively, in another embodiment, the spacing distance G1 may be a spacing distance between the first board unit 255 and the second board unit 800 in the optical-axis direction. In still another embodiment, the spacing distance G1 may be a distance from the second surface of the first heat dissipation member 370 to the first surface of the second board unit 800. In still another embodiment, the spacing distance G1 may be a spacing distance between the first heat dissipation member 370 and the second heat dissipation member 380 in the optical-axis direction.

In another embodiment, the spacing distance G1 may be 0.15 mm to 0.5 mm. In still another embodiment, the spacing distance G1 may be 0.15 mm to 0.3 mm. In still another embodiment, the spacing distance G1 may be 0.2 mm to 0.3 mm.

The shorter the spacing distance between the first heat dissipation member 370 and the second heat dissipation member 380, the greater the effect of transfer of heat from the first heat dissipation member 370 to the second heat dissipation member 380. However, if the spacing distance is too short, the OIS moving unit and the fixed unit may collide with each other due to spatial interference therebetween during OIS operation. That is, the spacing distance G1 may be 0.15 mm to 0.3 mm in order to smoothly perform OIS operation and to improve the heat dissipation effect.

As shown in FIG. 22, since the image sensor 810 is disposed in the bore 262 in the second circuit board 260 and the first heat dissipation member 370 is disposed in the recess 265 in the second circuit board 260, it is possible to reduce the height of the space occupied by the second circuit board 260, the image sensor 810, and the first heat dissipation member 370 in the optical-axis direction.

In addition, as shown in FIG. 13B, when viewed from above, the first board unit 255 and the first heat dissipation member 370 are located in the bore 800A in the second board unit 800, and accordingly, it is possible to reduce the distance between the first board unit 255 and the second board unit 800 in the optical-axis direction by the depth (or the length) of the bore 800A in the second board unit 800 in the optical-axis direction. As a result, it is possible to reduce the length (or the height) of the camera device 100 in the optical-axis direction. Here, "H1" represents a distance (or a height) from the second surface 801B of the second board unit 800 (or the second surface 382 of the second heat dissipation member 380) to the upper end of the lens module 400 (or the upper end of the lens).

In addition, the space between the first board unit 255 and the second board unit 800 may be increased by the bore 800A. Accordingly, it is possible to reduce the spacing distance between the first board unit 255 and the second board unit 800. As a result, the heat dissipation effect may be improved due to the reduction in the spacing distance.

Figure 23A:
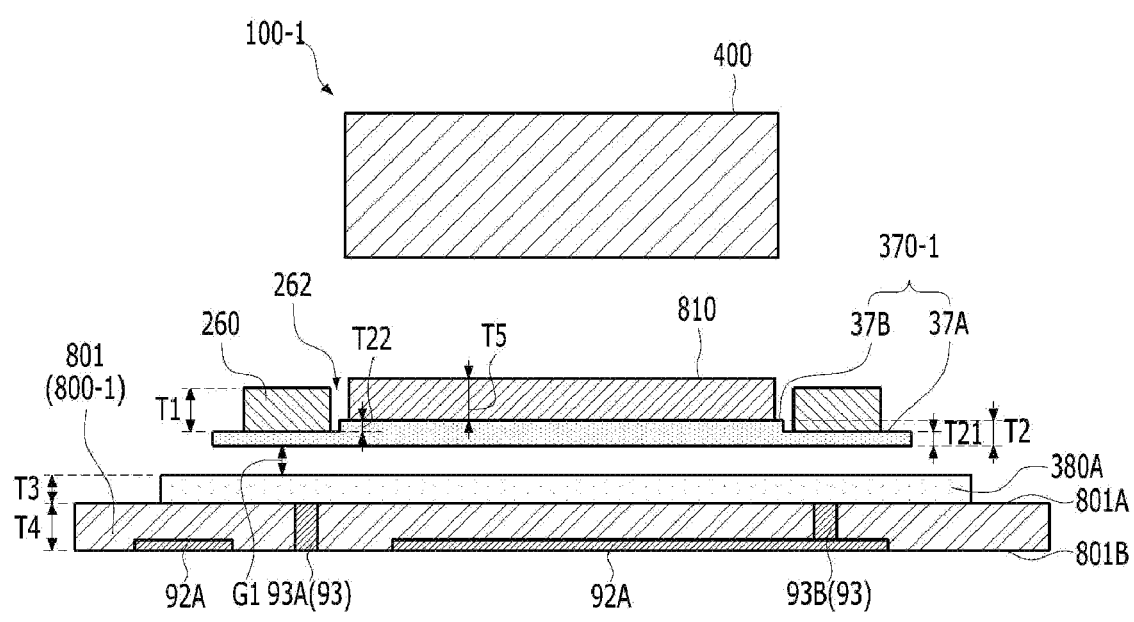
FIG. 23A is a schematic conceptual view of a lens module, a second circuit board, an image sensor, a first heat dissipation member, a second board unit, and a second heat dissipation member according to another embodiment.

FIG. 23A is a schematic conceptual view of a lens module, a second circuit board, an image sensor, a first heat dissipation member, a second board unit, and a second heat dissipation member according to another embodiment.

Referring to FIG. 23A, the OIS moving unit may include a first heat dissipation member 370-1, a second circuit board 260, which is disposed on the first heat dissipation member 370-1 and has a bore 262 formed therein to expose a portion of the first heat dissipation member 370-1, and an image sensor 810, which is disposed on the portion of the first heat dissipation member 370-1 that is exposed through the bore 262. In an example, the image sensor 810 may be disposed in the bore (or the hole) 262 in the second circuit board 260, and may be coupled to the first heat dissipation member 370-1.

The fixed unit may include a second board unit 800-1, which is disposed so as to be spaced apart from the first heat dissipation member 370-1, and a second heat dissipation member 380A, which is disposed on the second board unit 800-1 so as to face the first heat dissipation member 370-1 in the optical-axis direction. The support member (e.g. the support board 310) may support the OIS moving unit with respect to the fixed unit so that the OIS moving unit moves in a direction perpendicular to the optical-axis direction. The second heat dissipation member 380A may be disposed so as to overlap the first heat dissipation member 370-1 in the optical-axis direction.

In an example, the first heat dissipation member 370-1 may include a body 37A, which is disposed under the second circuit board 260, and a protruding portion (or a protruding region) 37B, which protrudes from the body 37A and is disposed in the bore 262 in the second circuit board 260. The image sensor 810 may be disposed on the protruding portion 37B. In an example, the image sensor 810 may be coupled or attached to the upper surface of the protruding portion 37B. In an example, the upper surface of the protruding portion 37B may be located at a lower position than the upper surface of the second circuit board 260. In another embodiment, the upper surface of the protruding portion 37B may be located at the same height as the upper surface of the second circuit board 260.

The second heat dissipation member 380A may be disposed on a first surface 801A (or the upper surface) of the second board unit 800-1, which faces the first heat dissipation member 370-1 in the optical-axis direction. The first heat dissipation member 370-1 may overlap the second heat dissipation member 380A in the optical-axis direction.

Unlike the second board unit 800 shown in FIG. 22, the second board unit 800-1 may not have the bore 800A shown in FIG. 22. The second board unit 800-1 may include a first conductive layer 93, which is exposed to the first surface 801A and is in contact with the second heat dissipation member 380A, for example, the lower surface of the second heat dissipation member 380A. In an example, the first conductive layer 93 may be thermally bonded to the lower surface of the second heat dissipation member 380A, or may be coupled to the lower surface of the second heat dissipation member 380A by means of a conductive adhesive, for example, solder. In addition, in an example, the first conductive layer 93 may be conductively connected to the second heat dissipation member 380A.

The second board unit 800-1 may include a second conductive layer 92A, which is connected to the first conductive layer 93 and is exposed from a second surface 801B (or the lower surface) of the second board unit 800-1, which is a surface opposite the first surface 801A of the second board unit 800-1. In an example, the second conductive layer 92A may be conductively connected to the ground of the second board unit 800-1.

The first conductive layer 93 may take the form of a via, which is formed through at least a portion of the second board unit 800-1. In addition, the first conductive layer 93 may have a first via 93A formed through the second board unit 800-1 so as to be open or exposed to the second surface 801B of the second board unit 800-1. In addition, one end of the first conductive layer 93 may be in contact with the lower surface of the second heat dissipation member 380, and the other end thereof may have a second via 93B formed therein so as to be in contact with, coupled to, or connected to the second conductive layer 92A.

As shown in FIG. 23A, the second conductive layer 92A may be disposed in, coupled to, or attached to a recess formed in the second surface 800B of the second board unit 800-1. In another embodiment, the second conductive layer 92A may be disposed on, coupled to, or attached to the second surface 800B of the second board unit 800-1, which is a flat surface in which no recess is formed.

Each of the first conductive layer 93 and the second conductive layer 92A may serve as a heat dissipation pattern or a heat dissipation pad for dissipating heat from the second board unit 800-1. That is, because the first conductive layer 93 and the second conductive layer 92A are provided only for the purpose of heat dissipation, the first conductive layer 93 and the second conductive layer 92A are not conductively connected to wires of the second board unit 800-1 other than the ground of the second board unit. In this case, the other wires may be wires conductively connected to an electronic element or a circuit element, such as the controller 830 or 780 or the image sensor 810.

The second conductive layer 92A may be conductively connected to the cover member 300 (e.g. the side plate 302) via solder, a conductive adhesive, or a sheet of conductive tape. Alternatively, in another embodiment, the second conductive layer 92A, which is connected to the ground of the second board unit 800-1, may be conductively connected to the cover member 300 via a bracket. The bracket may be a structure in which the camera device is accommodated or received in order to protect the camera device. In an example, the bracket may be formed of a conductive material. Since the ground of the second board unit 800-1, the second heat dissipation member 380A, and the cover member 300 are conductively connected to one another, it is possible to protect the camera device 100 from static electricity and to improve the heat dissipation effect.

In another embodiment, at least one of the first conductive layer or the second conductive layer of the second board unit 800-1 may also be applied to the second circuit board 260. In an example, the second circuit board 260 according to another embodiment may include at least one third conductive layer, which is in contact with the first heat dissipation member 370-1, and at least a portion of the third conductive layer may be exposed from the second circuit board 260.

Since the second heat dissipation member 380A is disposed on the first surface of the second board unit 800-1, the spacing distance from the first heat dissipation member 370A may be reduced, and accordingly, the heat dissipation effect may be improved.

The description of "G1" in FIG. 22 may also apply to "G1" in FIG. 23A.

In an example, the thickness T2 of the first heat dissipation member 370-1 may be smaller than or equal to the thickness T1 of the second circuit board 260. In another embodiment, the thickness of the first heat dissipation member 370-1 may be larger than the thickness of the second circuit board 260.

In an example, the thickness T1 of the second circuit board 260 may be 0.15 mm to 0.25 mm. In another embodiment, the thickness T1 may be 0.18 mm to 0.22 mm. In still another embodiment, the thickness T1 may be 0.2 mm to 0.22 mm.

In an example, the thickness T2 of the first heat dissipation member 370-1 may be 0.08 mm to 0.15 mm. In an example, the thickness T2 may be 0.1 mm to 0.12 mm. Alternatively, in another example, the thickness T2 may be 0.1 mm to 0.15 mm.

In an example, the thickness T21 of the body 37A of the first heat dissipation member 370-1 and the thickness T22 of the protruding portion 37B may be equal to each other. In another embodiment, the thickness of the body 37A may be larger than the thickness of the protruding portion 37B. In still another embodiment, the thickness of the body 37A may be smaller than the thickness of the protruding portion 37B.

In an example, the value T21/T22 obtained by dividing the thickness T21 of the body 37A by the thickness T22 of the protruding portion 37B may be 1 to 3. In another embodiment, the value T22/T21 obtained by dividing the thickness T22 of the protruding portion 37B by the thickness T21 of the body 37A may be 1 to 3.

The thickness T3 of the second heat dissipation member 380A may be equal to the thickness T2 of the first heat dissipation member 370-1. In an example, the description of "T2" may also apply to "T3".

The thickness T4 of the second board unit 800 may be larger than or equal to the thickness T3 of the second heat dissipation member 800-1.

In an example, the thickness T4 of the second board unit 800, e.g. the first region 801, may be 0.15 mm to 0.3 mm. In an example, the thickness T4 may be 0.2 mm to 0.28 mm. Alternatively, in an example, the thickness T4 may be 0.24 mm to 0.26 mm.

An adhesive may be disposed between the second board unit 800 and the second heat dissipation member 380A in order to attach or bond the second board unit 800 and the second heat dissipation member 380A to each other. In this case, the thickness of the adhesive may be 0.01 mm to 0.04 mm. In another embodiment, the thickness of the adhesive may be 0.02 mm to 0.03 mm.

In an example, the thickness T5 of the image sensor 810 may be 0.1 mm to 0.25 mm. In another embodiment, the thickness T5 of the image sensor 810 may be 0.12 mm to 0.21 mm. In still another embodiment, the thickness T5 may be 0.12 mm to 0.15 mm.

In an example, the value G1/T1 obtained by dividing the gap G1 between the OIS moving unit (e.g. the first heat dissipation member 370-1) and the fixed unit (e.g. the second heat dissipation member 380A) by the thickness T1 of the second circuit board 260 may be 0.8 to 2. Alternatively, the value G1/T1 may be 1.2 to 2.

If the value G1/T1 is less than 0.8, the thickness of the second circuit board 260 may be too large. Thus, the size (e.g. the height) of the camera device may be increased, and it may not be possible to secure a sufficient gap G1 between the fixed unit and the OIS moving unit for implementation of OIS operation. On the other hand, if the value G1/T1 is greater than 2, "G1" may be too large. Thus, the heat dissipation effect may be deteriorated, and the size (e.g. the height) of the camera device may be increased.

In an example, the value G1/T2 obtained by dividing the gap G1 between the OIS moving unit (e.g. the first heat dissipation member 370-1) and the fixed unit (e.g. the second heat dissipation member 380A) by the thickness T2 of the first heat dissipation member 370-1 may be 1.4 to 3.75. Alternatively, in an example, the value G1/T2 may be 1.8 to 2.5. Alternatively, in an example, the value G1/T2 may be 2 to 2.1.

If the value G1/T2 is less than 1.4, the thickness of the first heat dissipation member 370-1 may be too large. Therefore, the weight of the OIS moving unit may be increased, and thus the amount of power that is consumed during OIS operation may be increased. In addition, the size of the camera device in the optical-axis direction may be increased. On the other hand, if the value G1/T2 is greater than 3.75, the thickness of the first heat dissipation member 370-1 may be too small. Therefore, the heat dissipation effect may be reduced, and thus the heat dissipation function may be deteriorated.

In an example, the value T1/T2 obtained by dividing the thickness T1 of the second circuit board 260 by the thickness T2 of the first heat dissipation member 370-1 may be 1 to 3.125. Alternatively, in an example, the value T1/T2 may be 1 to 2.5. Alternatively, in an example, the value T1/T2 may be 2 to 2.5.

If the value T1/T2 is less than 1, the weight of the first heat dissipation member 370-1 may be too large. Therefore, the weight of the OIS moving unit may be increased, and thus the amount of power that is consumed during OIS operation may be increased. In addition, the size of the camera device in the optical-axis direction may be increased.

On the other hand, if the value T1/T2 is greater than 3.125, the thickness of the first heat dissipation member 370-1 may be too small. Therefore, the heat dissipation effect may be reduced, and thus the heat dissipation function may be deteriorated.

In an example, the value T4/T3 obtained by diving the thickness T4 of the second board unit 800-1, e.g. the first region 801, by the thickness T3 of the second heat dissipation member 380A may be 1 to 3.75. Alternatively, in an example, the value T4/T3 may be 1.5 to 3. Alternatively, in an example, the value T4/T3 may be 2.4 to 2.6.

If the value T4/T3 is less than 1, the thickness of the second heat dissipation member 380A may be too large, and thus it may be difficult to secure a sufficient spacing distance G1 between the OIS moving unit (e.g. the first heat dissipation member 370-1) and the fixed unit (e.g. the second heat dissipation member 380A).

On the other hand, if the value T4/T3 is greater than 3.75, the thickness of the second heat dissipation member 380A may be too small, and thus the heat dissipation effect may be reduced. In addition, the second heat dissipation member 380A may not sufficiently serve as a reinforcement member for supporting the second board unit 800-1. Thus, the second board unit 800-1 may be bent, and accordingly, a warpage phenomenon may occur.

In an example, the value G1/T4 obtained by dividing the gap G1 between the OIS moving unit (e.g. the first heat dissipation member 370-1) and the fixed unit (e.g. the second heat dissipation member 380A) by the thickness T4 of the second board unit 800-1 may be ⅔ to 2.

If the value G1/T4 is less than ⅔, the gap between the OIS moving unit and the fixed unit may be too small. Thus, spatial interference may occur between the OIS moving unit and the fixed unit during OIS operation, and consequently, the OIS operation may not be smoothly implemented. On the other hand, the value G1/T4 is greater than 2, the gap G1 may be too large. Thus, the heat dissipation effect may be reduced, and the size (e.g. the height) of the camera device may be increased.

In an example, the value T5/T2 obtained by dividing the thickness T5 of the image sensor 810 by the thickness T2 of the first heat dissipation member 370-1 may be 0.67 to 3.125. Alternatively, in an example, the value T5/T2 may be 1 to 2. Alternatively, in an example, the value T5/T2 may be 1.5 to 2.

The value T5/T2 is less than 0.67, the weight of the first heat dissipation member 370-1 may be too large. Therefore, the weight of the OIS moving unit may be increased, and thus the amount of power that is consumed during OIS operation may be increased. On the other hand, if the value T5/T2 is greater than 3.125, the thickness of the first heat dissipation member 370-1 may be too small. Therefore, the heat dissipation effect may be reduced, and thus the heat dissipation function may be deteriorated.

The area of the first heat dissipation member 370-1, for example the area of the upper surface of the protruding portion 38B, may be larger than or equal to the area of the upper surface (or the lower surface) of the image sensor 810. In another embodiment, the area of the upper surface of the protruding portion 38B may be smaller than the area of the lower surface of the image sensor 810.

In an example, the area of the lower surface (or the upper surface) of the first heat dissipation member 370-1 may be 50% or more of the area of the lower surface (or the upper surface) of the image sensor 810. Alternatively, in an example, the area of the lower surface (or the upper surface) of the first heat dissipation member 370-1 may be 100% to 200% of the area of the lower surface (or the upper surface) of the image sensor 810. Alternatively, in an example, the area of the lower surface (or the upper surface) of the first heat dissipation member 370-1 may be 100% to 150% of the area of the lower surface (or the upper surface) of the image sensor 810.

In an example, the area of the lower surface (or the upper surface) of the second heat dissipation member 380 may be 50% or more of the area of the upper surface (or the lower surface) of the second board unit 800-1 (e.g. the first region 801). Alternatively, in an example, the area of the lower surface (or the upper surface) of the second heat dissipation member 380 may be 90% to 200% of the area of the upper surface (or the lower surface) of the first region 801. Alternatively, in an example, the area of the lower surface (or the upper surface) of the second heat dissipation member 380 may be 90% to 150% of the area of the upper surface (or the lower surface) of the first region 801.

In an example, when viewed in the optical-axis direction or from above, the area of the first heat dissipation member 370-1 may be 50% to 100% of the area of the second heat dissipation member 380. Alternatively, in an example, when viewed in the optical-axis direction or from above, the area of the first heat dissipation member 370-1 may be 55% to 90% of the area of the second heat dissipation member 380. Alternatively, in an example, when viewed in the optical-axis direction or from above, the area of the first heat dissipation member 370-1 may be 55% to 80% of the area of the second heat dissipation member 380. In an example, the area of each of the heat dissipation members 370-1 and 380A may be the area of the upper surface or the lower surface of each of the heat dissipation members 370-1 and 380A.

If the area of the first heat dissipation member 370-1 is less than 50% of the area of the second heat dissipation member 380, the size of the first heat dissipation member 370-1 may be too small. Therefore, the first heat dissipation member 370-1 may not sufficiently implement a function of receiving heat from the image sensor 810 and dissipating the heat, and thus the heat dissipation effect of the camera device may be reduced.

On the other hand, if the area of the first heat dissipation member 370-1 is greater than 100% of the area of the second heat dissipation member 380, the size of the first heat dissipation member 370-1 may be too large. Therefore, the length of the OIS moving unit in the horizontal direction may be increased, spatial interference may occur between the OIS moving unit and the fixed unit during OIS operation, and thus the OIS operation may be erroneously implemented. In an example, when the area of the first heat dissipation member 370-1 is 55% to 80% of the area of the second heat dissipation member 380, the heat dissipation effect may be improved, and spatial interference between the OIS moving unit and the fixed unit may be inhibited during the OIS operation.

In an example, when viewed in the optical-axis direction or from above, the overlapping area between the first heat dissipation member 370-1 and the second heat dissipation member 380A may be 80% to 100% of the area of the first heat dissipation member 380A. If the overlapping area is less than 80% of the area of the first heat dissipation member 380A, the effect of heat dissipation through heat transfer between the first heat dissipation member 370-1 and the second heat dissipation member 380A may be reduced. In addition, when the overlapping area is 100% of the area of the first heat dissipation member 380A, the heat dissipation effect may be maximized.

The area of the first heat dissipation member 370-1 may be smaller than the area of the second circuit board 260. In an example, when viewed in the optical-axis direction or from above, the area of the second circuit board 260 may be the area of the region present within the outer periphery or the outer circumference of the second circuit board 260. In an example, the area of the second circuit board 260 may be the area of the region present within the outer periphery or the outer circumference of the upper surface or the lower surface of the second circuit board 260.

In another embodiment, the area of the first heat dissipation member 370-1 may be equal to the area of the second circuit board 260. In still another embodiment, the area of the first heat dissipation member 370-1 may be larger than the area of the second circuit board 260.

In an example, the area of the first heat dissipation member 370-1 may be smaller than the area of the second board unit 800-1. In an example, the area of the first heat dissipation member 370-1 may be smaller than the area of the first region 801 of the second board unit 800-1. The area of the second board unit 800-1 may be the area of the upper surface or the lower surface of the first region 801 of the second board unit 800-1.

In an example, the area of the first heat dissipation member 370-1 may be 50% to 100% of the area of the second circuit board 260. Alternatively, in an example, the area of the first heat dissipation member 370-1 may be 55% to 90% of the area of the second circuit board 260. Alternatively, in an example, the area of the first heat dissipation member 370-1 may be 60% to 80% of the area of the second circuit board 260.

In an example, the area of the second heat dissipation member 380A may be 70% to 120% of the area of the second board unit 800-1. In an example, the area of the second board unit 800-1 may be the area of the upper surface or the lower surface of the first region 801 of the second board unit 800-1. Alternatively, in an example, the area of the second heat dissipation member 380A may be 80% to 100% of the area of the second board unit 800-1. Alternatively, in an example, the area of the second heat dissipation member 380A may be 70% to 90% of the area of the second board unit 800-1.

When the area of the second heat dissipation member 380A is less than 70% of the area of the second board unit 800-1, the heat dissipation effect may be reduced, and an area sufficient to support the second board unit 800-1 may not be secured, leading to warpage of the second board unit 800-1. When the area of the second heat dissipation member 380A is greater than 120% of the area of the second board unit 800-1, the size of the camera device in the horizontal direction may be increased excessively, and spatial interference with other components (e.g. 802 and 803) peripheral to the first region 801 of the second board unit 800-1 or with another separate camera device may occur.

The above description of T1 to T4 may also apply to the second circuit board, the first heat dissipation member, the second heat dissipation member, and the second board unit according to other embodiments shown in FIGS. 22 and 23B to 25C.

In addition, the above description of the area of the first heat dissipation member 370-1, the area of the second heat dissipation member 380A, the area of the second circuit board 260, and the area of the second board unit 800-1 may also apply to the second circuit board, the first heat dissipation member, the second heat dissipation member, and the second board unit according to other embodiments shown in FIGS. 22 and 23B to 25C.

Figure 23B:
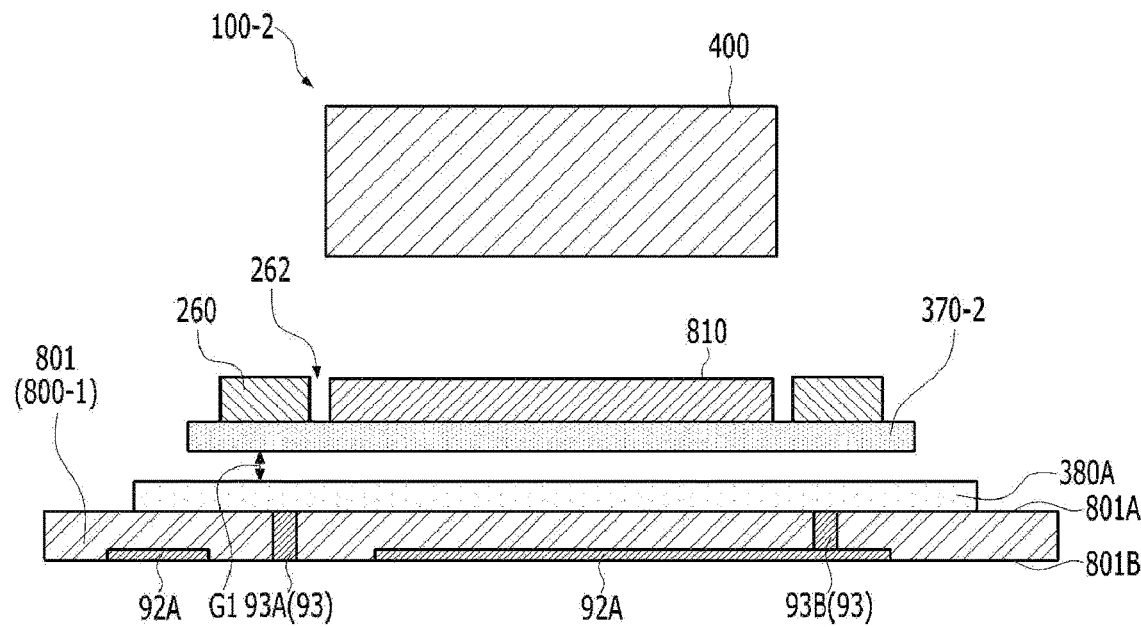
FIGS. 23B to 23H illustrate modifications of FIG. 23A.

FIG. 23B illustrates a modification 100-2 of FIG. 23A.

Referring to FIG. 23B, the first heat dissipation member 370-2 may not include the protruding portion shown in FIG. 23A. The upper surface of the first heat dissipation member 370-2 may be a flat surface, a portion of the upper surface of the first heat dissipation member 370-2 may be open or exposed through the bore 262 in the second circuit board 260, and the image sensor 810 may be disposed on, coupled to, or attached to the portion of the upper surface of the first heat dissipation member 370-2 that is exposed through the bore 262.

Figure 23C:
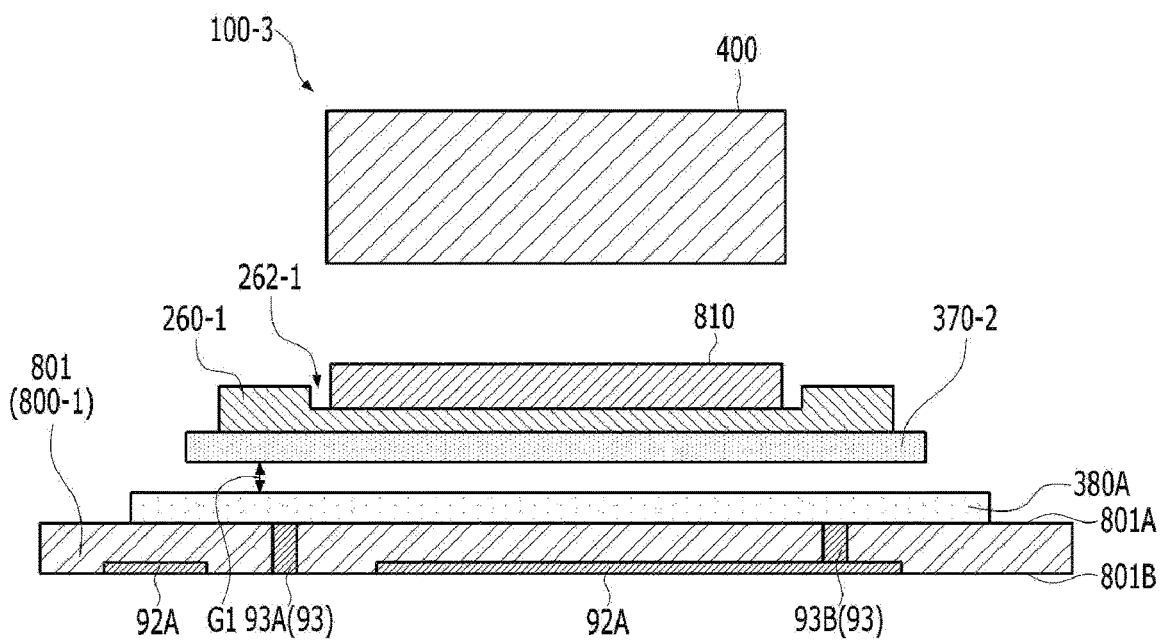

FIG. 23C illustrates another modification 100-3 of FIG. 23A.

Referring to FIG. 23C, the second circuit board 260-1 may have a recess 262-1 formed therein. In an example, the recess 262-1 may be depressed into the upper surface of the second circuit board 260-1, and may include a bottom surface and a side surface. The image sensor 810 may be disposed in the recess 262-1. The image sensor 810 may be disposed on, coupled to, or attached to the bottom surface of the recess 262-1.

In an example, at least a portion of the second circuit board 260-1 may be disposed or interposed between the image sensor 810 and the first heat dissipation member 370-2. Compared to the embodiment shown in FIG. 23A, since the embodiment shown in FIG. 23C does not have the bore 262 shown in FIG. 23A, it is possible to secure a sufficient space for disposing or designing a circuit pattern or wiring, thereby increasing freedom of design of circuits on the second circuit board 260-1.

Figure 23D:
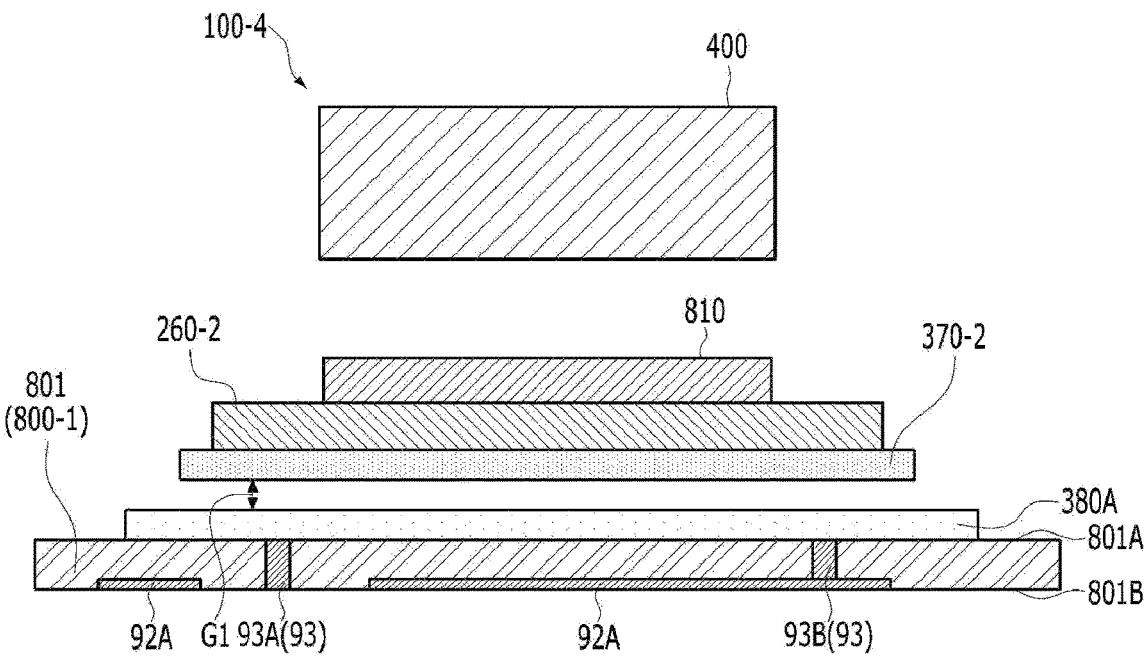

FIG. 23D illustrates still another modification 100-4 of FIG. 23A.

Referring to FIG. 23D, the second circuit board 260-2 may not have the through-hole-type bore 262 shown in FIG. 23A or the recess 262-1 shown in FIG. 23C. The image sensor 810 may be disposed on the upper surface of the second circuit board 260-2, which is a flat surface.

Figure 23E:
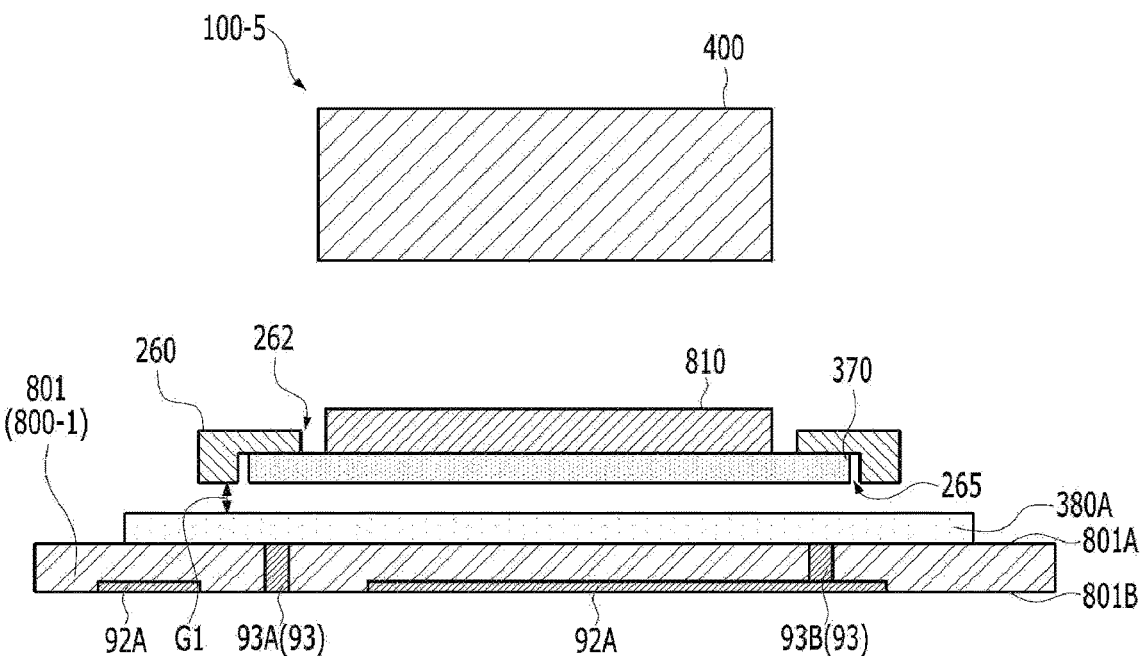

FIG. 23E illustrates still another modification 100-5 of FIG. 23A.

Referring to FIG. 23E, the second circuit board 260 may have a bore 262 formed therein, and may have the recess 265 described above with reference to FIG. 12B. The first heat dissipation member 370 may be disposed in, coupled to, or attached to the recess 265 in the second circuit board 260.

Figure 23F:
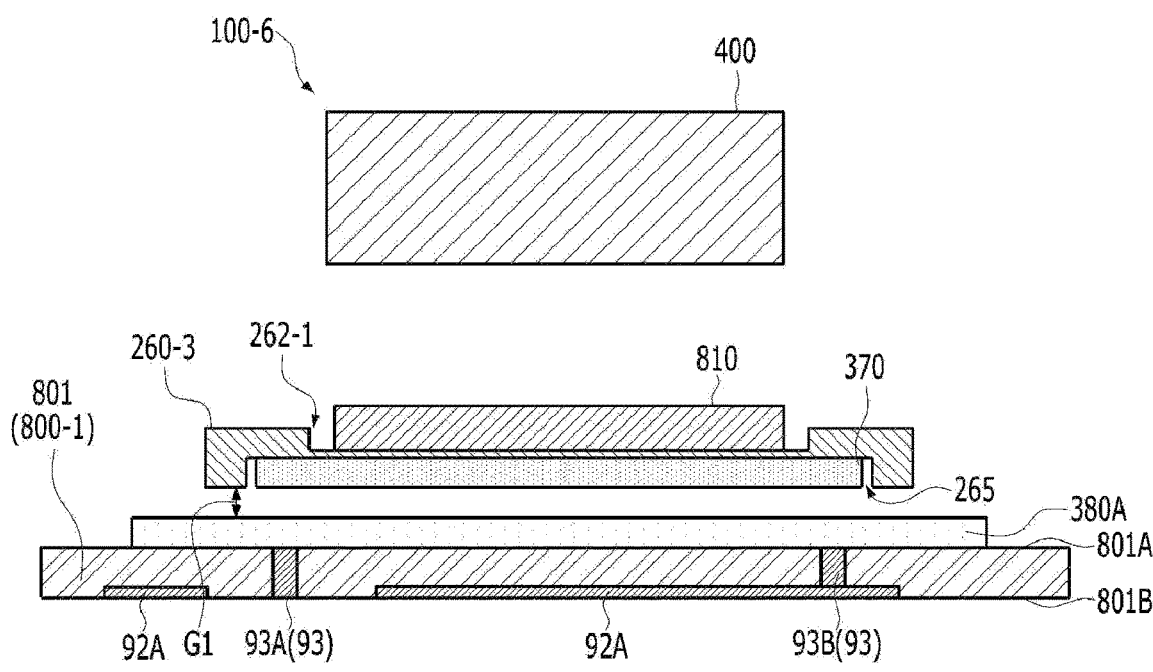

FIG. 23F illustrates still another modification 100-6 of FIG. 23A.

Referring to FIG. 23F, the second circuit board 260-3 may have a first recess 262-1 formed in the upper surface thereof and a second recess 265 formed in the lower surface thereof. The description of the recess 262-1 in FIG. 23C may also apply to the first recess 262-1 in FIG. 23F, and the description of the recess 265 in FIG. 23E may also apply to the second recess 265 in FIG. 23F.

The first heat dissipation member 370 may be disposed in, attached to, or coupled to the recess 265 formed in the second surface 260B (refer to FIG. 12B) of the second circuit board 260-3. In an example, at least a portion of the first heat dissipation member 370 may not project outside the recess 265. In another embodiment, at least a portion (e.g. the lower portion) of the first heat dissipation member 370 may project outside the recess 265.

Figure 23G:
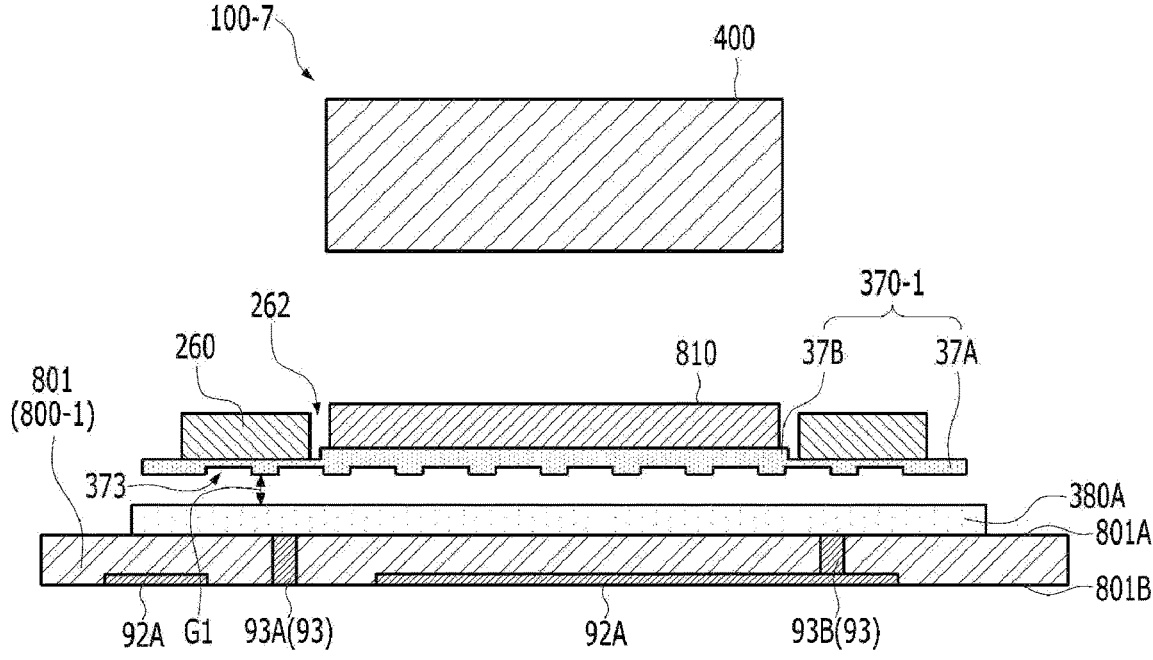

FIG. 23G illustrates still another modification 100-7 of FIG. 23A.

Referring to FIG. 23G, the first heat dissipation member 370 may have a groove, a hole, or an uneven portion 373 formed in a predetermined pattern in the lower surface thereof in order to increase the heat dissipation area. The predetermined pattern of the first heat dissipation member 370 may face or overlap that of the second heat dissipation member 380A in the optical-axis direction. The description of the predetermined pattern in FIG. 12B may also apply to the pattern in FIG. 23G.

Figure 23H:
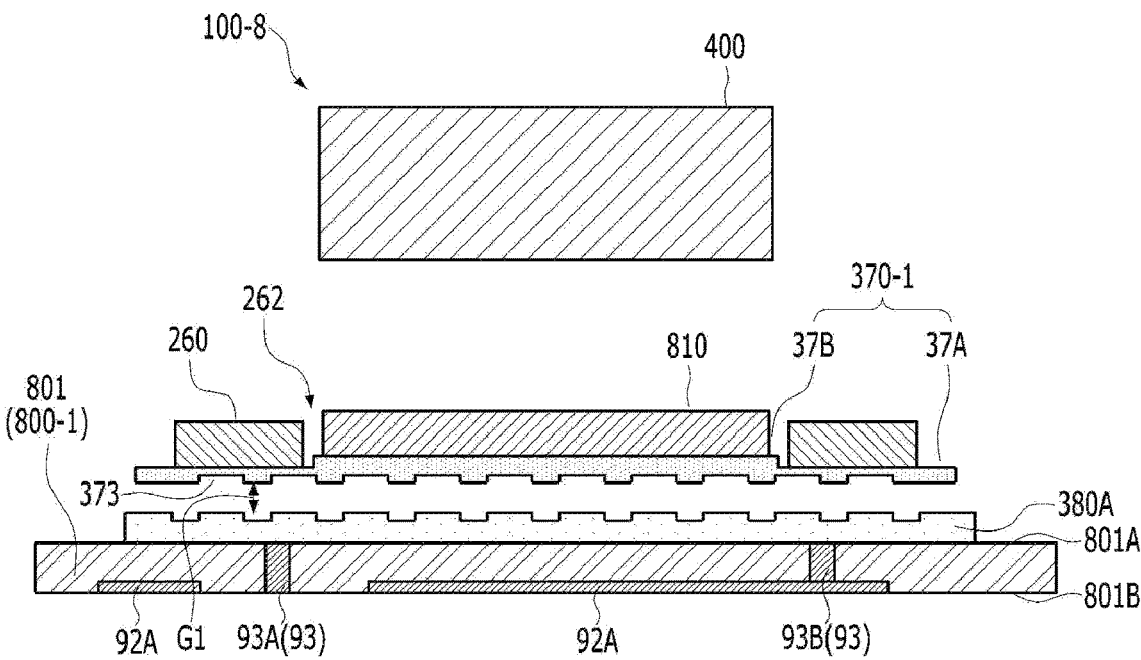

FIG. 23H illustrates a modification 100-8 of FIG. 23G.

Referring to FIG. 23H, the second heat dissipation member 380A may have a groove, a hole, or an uneven portion 383 formed in a predetermined pattern therein so as to correspond to or face the groove, the hole, or the uneven portion 373 in the first heat dissipation member 370.

In an example, the groove, the hole, or the uneven portion 383 may be formed in a predetermined pattern in the upper surface of the second heat dissipation member 380A. In an example, the groove, the hole, or the uneven portion 373 in the first heat dissipation member 370-1 may face or overlap the groove, the hole, or the uneven portion 383A in the second heat dissipation member 380A in the optical-axis direction. In another embodiment, the groove, the hole, or the uneven portion for increasing the heat dissipation effect may be formed in the upper surface of the first heat dissipation member 370-1. In an example, the groove, the hole, or the uneven portion for increasing the heat dissipation effect may be formed in the upper surface of the protruding portion 37B. In still another embodiment, the groove, the hole, and the uneven portion for increasing the heat dissipation effect may be formed in at least one of the upper surface or the lower surface of the second heat dissipation member.

The description made with reference to FIG. 23H may also apply to the first heat dissipation member and the second heat dissipation member in FIGS. 23A to 23F.

Figure 24A:
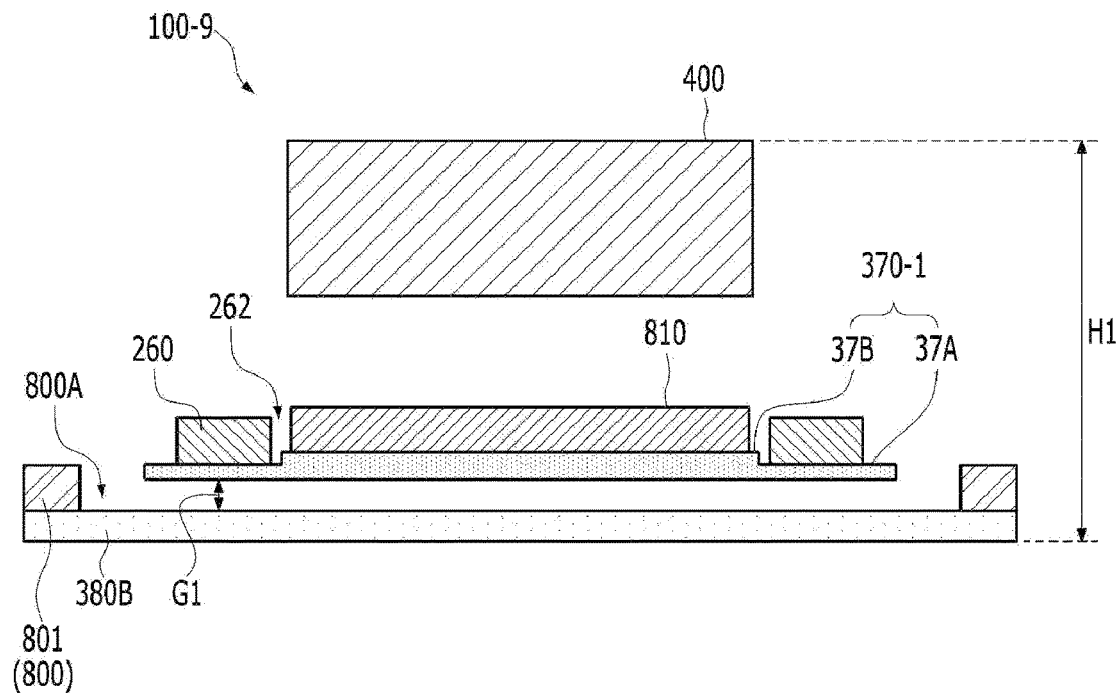
FIG. 24A illustrates another modification of FIG. 23A.

FIG. 24A illustrates still another modification 100-9 of FIG. 23A.

Referring to FIG. 24A, the second board unit 800 may have a bore 800A formed therein.

When viewed from above or in the optical-axis direction, at least a portion (e.g. the lower end) of the first heat dissipation member 370 may be located in the bore 800A in the second board unit 800. In an example, at least a portion (e.g. the lower end) of the first heat dissipation member 370 may face or overlap the bore 800A in the second board unit 800 in a direction perpendicular to the optical axis.

Alternatively, in another embodiment, when viewed from above or in the optical-axis direction, at least a portion (e.g. the lower end) of the second circuit board 260 may be located in the bore 800A in the second board unit 800. In an example, at least a portion (e.g. the lower end) of the second circuit board 260 may face or overlap the bore 800A in the second board unit 800 in a direction perpendicular to the optical axis.

As described above with reference to FIG. 13B, when viewed from above, since a portion of the first heat dissipation member 370 is located in the bore 800A in the second board unit 800, the height of the second board unit 800 based on the lower surface of the second board unit 800 may be reduced. Accordingly, the length (or the height) H1 of the camera device 100 in the optical-axis direction may be reduced. In addition, the distance G1 between the first heat dissipation member 370-1 and the second heat dissipation member 380B in the optical-axis direction may be reduced, and consequently, the heat dissipation effect may be further improved.

Figure 24B:
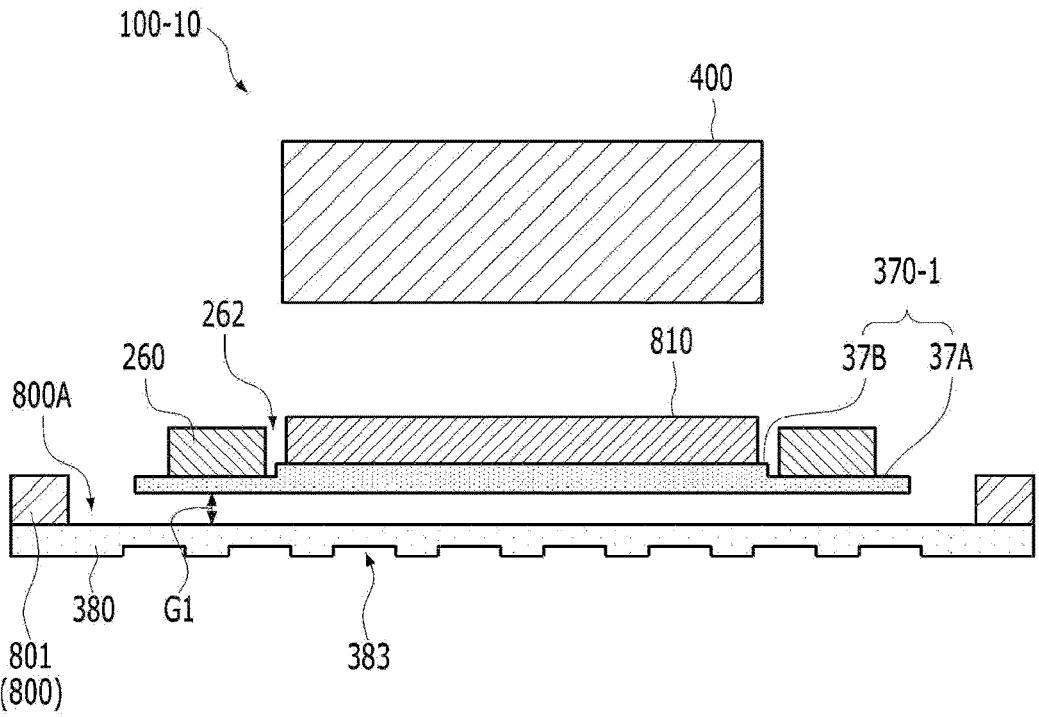
FIGS. 24B to 24E illustrate modifications of FIG. 24A.

FIG. 24B illustrates a modification 100-10 of FIG. 24A. Referring to FIG. 24B, the groove, the hole, or the uneven portion described above with reference to FIG. 22 may be formed in a predetermined pattern in the lower surface of the second heat dissipation member 380.

Figure 24C:
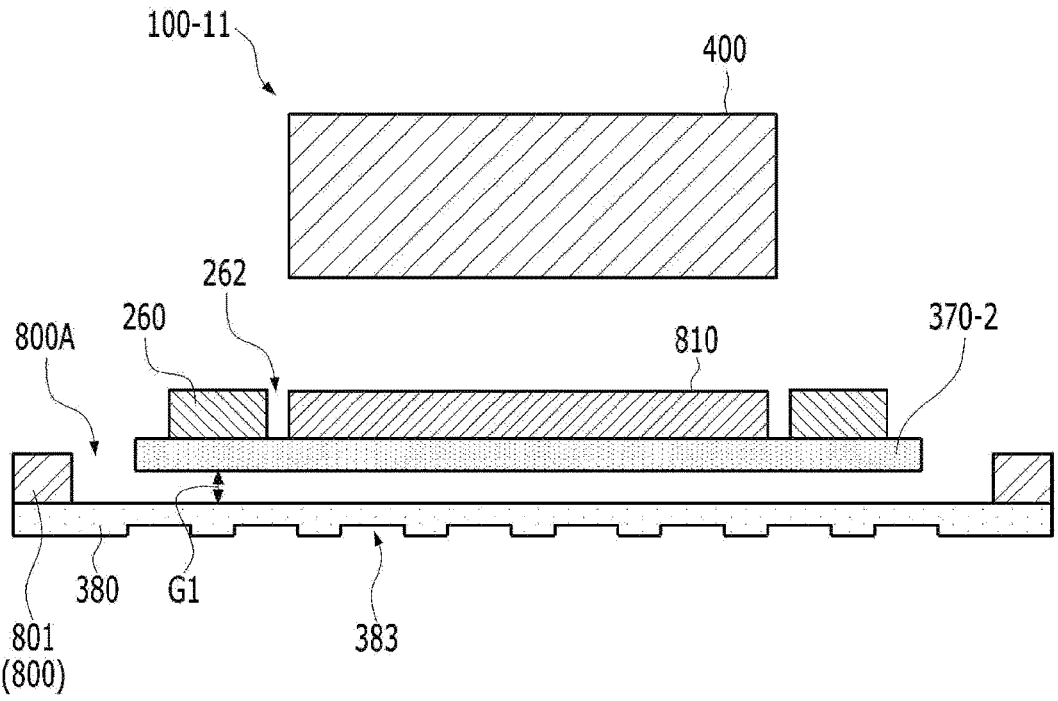

FIG. 24C illustrates a modification 100-11 of FIG. 24B.

The second circuit board 260, the first heat dissipation member 370-2, and the image sensor 810 in FIG. 24C may be the same as those of the embodiment 100-2 in FIG. 23B.

Figure 24D:
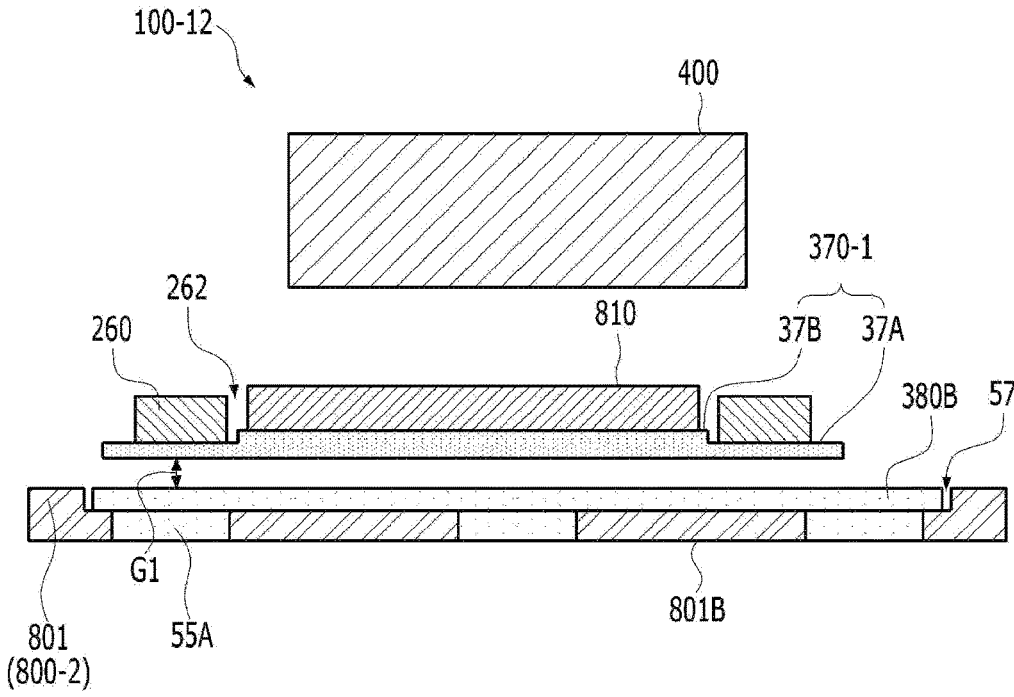

FIG. 24D illustrates another modification 100-12 of FIG. 24A.

Referring to FIG. 24D, the second heat dissipation member 380B may be disposed on, coupled to, or attached to a first surface 801A (or the upper surface) of the second board unit 800-2. The second board unit 800-2 may have a recess 57 formed in the first surface 801A thereof to allow the second heat dissipation member 380A to be seated or accommodated therein. The recess 57 may be depressed into the first surface 801A of the second board unit 800-2. In an example, the second heat dissipation member 380B may be disposed in the recess 57 in the second board unit 800-2.

The second board unit 800-2 may include a conductive layer 55A, which is connected to, coupled to, or in contact with the second heat dissipation member 380B. In an example, the conductive layer 55A may be in contact with, coupled to, or connected to the lower surface of the second heat dissipation member 380B.

The conductive layer 55A may be exposed to a second surface 801B (or the lower surface) of the second board unit 800-2. The conductive layer 55A may be connected to a ground terminal of the second board unit 800-2 by means of solder or a conductive adhesive. In addition, the conductive layer 55A may be conductively connected to the cover member 300 (e.g. the side plate 302) via solder, a conductive adhesive, or a sheet of conductive tape.

In another embodiment, the second board unit 800-2 may include the first conductive layer 93 and the second conductive layer 92A shown in FIG. 23B in place of the conductive layer 55A shown in FIG. 24D, and the description made with reference to FIG. 23B may apply thereto.

Figure 24E:
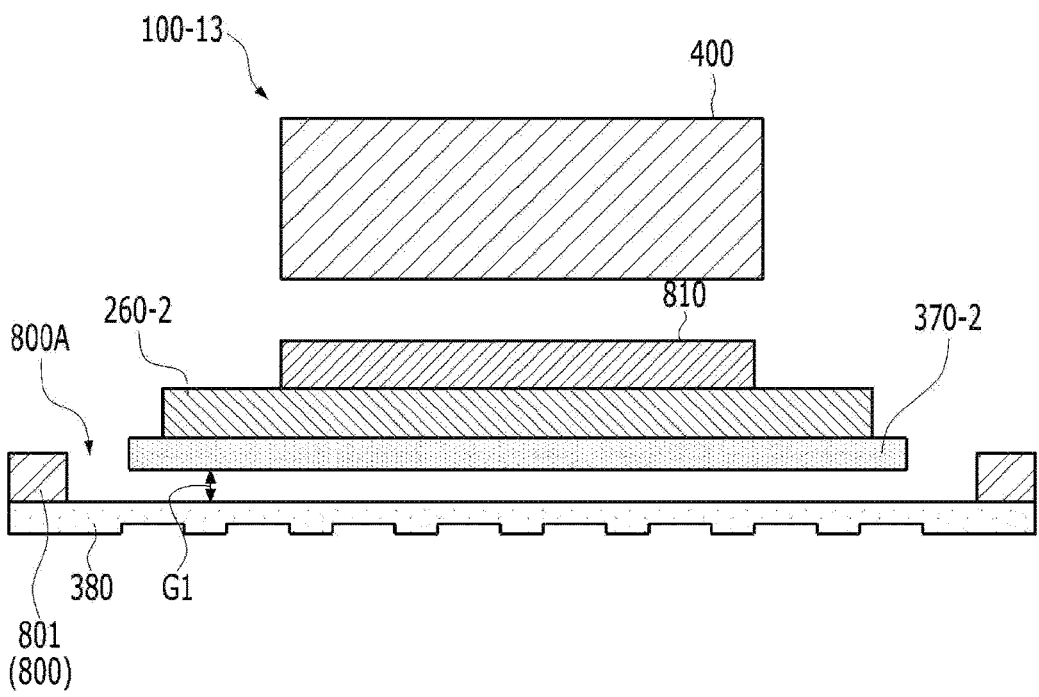

FIG. 24E illustrates still another modification 100-13 of FIG. 24A.

Referring to FIG. 24E, the second circuit board 260-2, the first heat dissipation member 370-2, and the image sensor 810 described above with reference to FIG. 23D may be applied to the embodiment 100-13 in FIG. 23E.

Figure 25A:
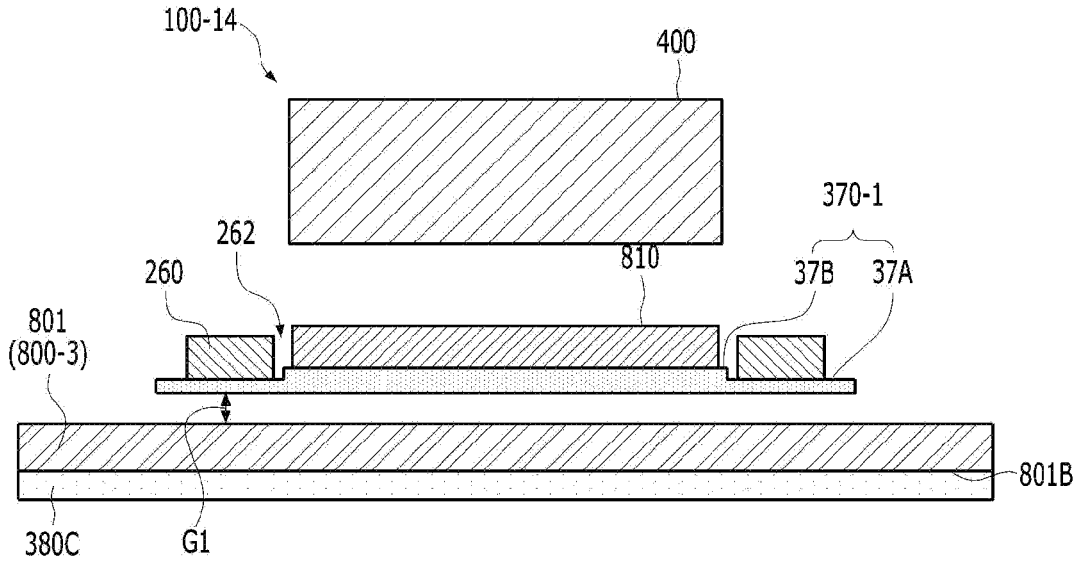
FIG. 25A illustrates another modification of FIG. 24A.

FIG. 25A illustrates still another modification 100-14 of FIG. 24A.

Referring to FIG. 25A, the second heat dissipation member 380C may be disposed under the second board unit 800-3. In an example, the second heat dissipation member 380C may be disposed on, coupled to, or attached to a second surface 801B of the second board unit 800-3. In example, the second board unit 800-3 may not have the bore 800A shown in FIG. 24A.

Figure 25B:
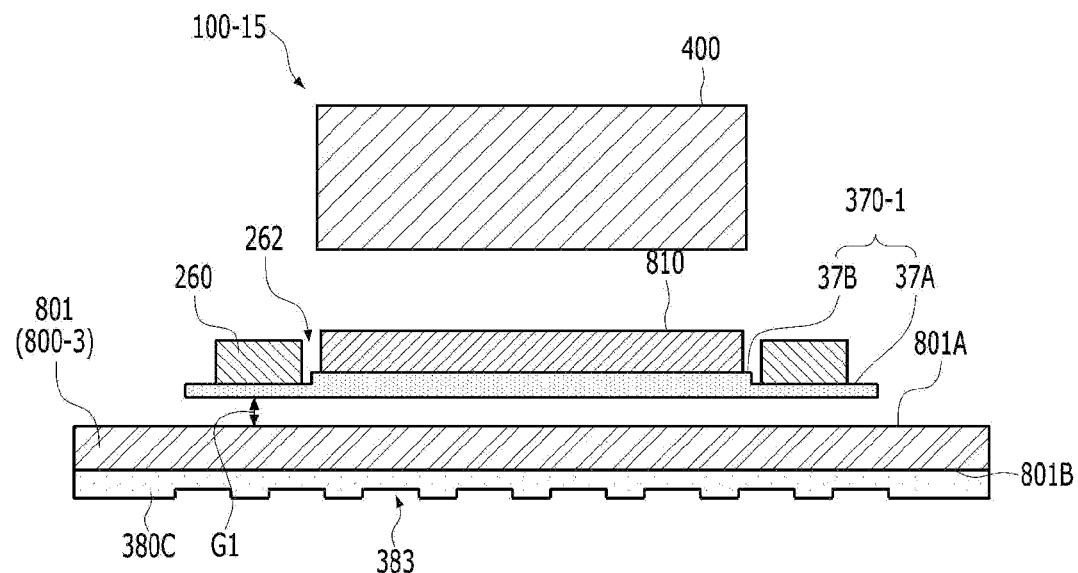
FIGS. 25B and 25C illustrate modifications of FIG. 25A.

FIG. 25B illustrates a modification 100-15 of FIG. 25A.

Referring to FIG. 25B, the second heat dissipation member 380C may have at least one groove, hole, or uneven portion 383 formed in a predetermined pattern therein in order to improve the heat dissipation effect.

In an example, the groove, the hole, or the uneven portion 383 may be formed in a predetermined pattern in the lower surface of the second heat dissipation member 380C.

Figure 25C:
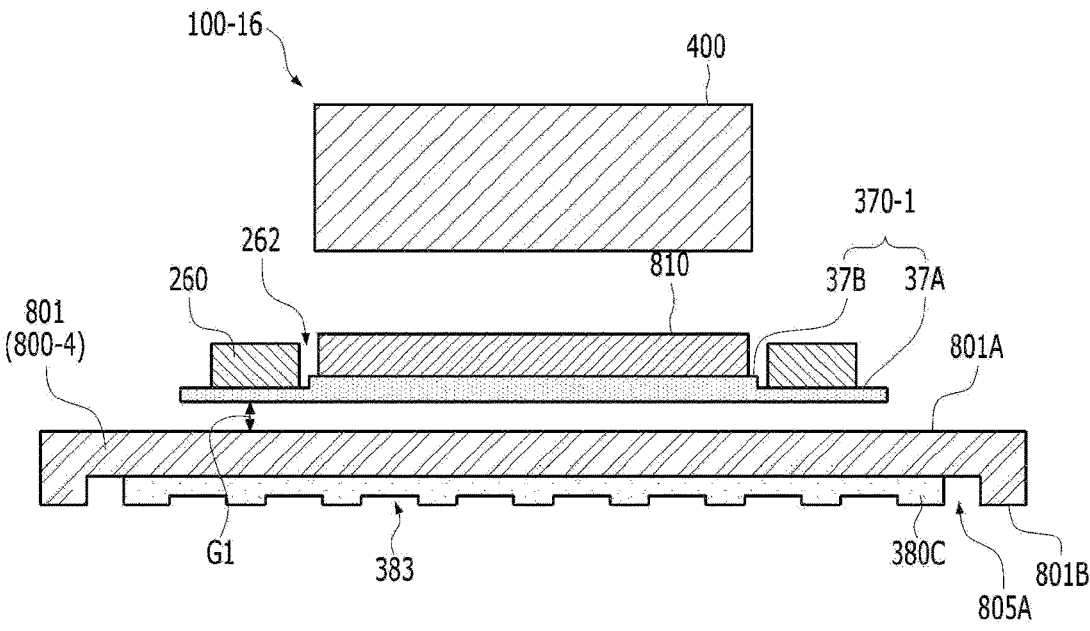

FIG. 25C illustrates a modification 100-16 of FIG. 25B.

Referring to FIG. 25C, the second board unit 800-4 may have a recess 805A formed in a second surface 801B thereof. The recess 805A may include a bottom surface and a side surface. The second heat dissipation member 380C may be disposed in, coupled to, or attached to the recess 805A formed in the second surface 801B of the second board unit 800-4. In an example, the second heat dissipation member 380C may be disposed on, coupled to, or attached to the bottom surface of the recess 805A in the second board unit 800-4. In another embodiment, the second heat dissipation member shown in FIG. 25C may not include the groove, the hole, or the uneven portion 383 formed in a predetermined pattern.

The second heat dissipation member 380C may not project outside the recess 805A. In another embodiment, at least a portion (e.g. the lower portion) of the second heat dissipation member 380C may project outside the recess 805A in the second board unit 800-4.

The embodiments of the second circuit board, the first heat dissipation member, and the image sensor described with reference to FIGS. 23A to 23H and the embodiments of the second board unit and the second heat dissipation member described with reference to FIGS. 24A to 25C may be combined with each other or may be replaced with each other to be modified in various forms.

In still another embodiment, in order to improve the heat dissipation effect, at least one of the first board unit 255 or the second board unit 800 may include a heat dissipation pattern (or a metal pattern or a metal member).

The heat dissipation pattern (not shown) may be formed such that a portion of a plating layer of each of the first board unit 255 and the second board unit 800 is exposed from an insulating layer (e.g. polyimide). In an example, the heat dissipation pattern may be conductively separated or isolated from the wire or the circuit pattern of each of the first and second board units. In an example, the heat dissipation pattern may be formed on each of the second circuit board 260 and the second board unit 800.

In an example, each of the first board unit 255 and the second board unit 800 may include a plurality of metal layers stacked on each other and an insulating layer disposed between the plurality of metal layers. A portion of at least one of the plurality of metal layers may be formed as a heat dissipation pattern. In an example, the heat dissipation pattern may be exposed from the insulating layer. Alternatively, the entirety of any one of the plurality of layers may be formed as a heat dissipation pattern.

In still another embodiment, in order to improve the heat dissipation effect, at least one of the first board unit 255 or the second board unit 800 may have a cavity or a through-hole formed in a predetermined pattern therein.

In an example, the second circuit board 260 may include a plurality of cavities disposed so as to surround an element disposed on the second circuit board 260, for example, the image sensor 810. Alternatively, the second board unit 800 may include a plurality of cavities disposed adjacent to the elements 820 and 512 disposed on the second board unit 800. In this case, the plurality of cavities may be disposed so as to surround the elements 820 and 512 disposed on the second board unit 800.

As described above, the embodiments may improve the heat dissipation effect of the camera device 100 using the first heat dissipation member 370 and the second heat dissipation member 380, and thus may inhibit an increase in the temperature of the camera device 100 due to an increase in the amount of heat that is generated. Accordingly, the embodiments may inhibit an increase in noise of the image sensor and deterioration in the resolution of the image sensor, and may inhibit deterioration in the reliability of auto-focusing due to expansion of the lens.

In addition, according to the embodiments, the image sensor 810 may be disposed on the first heat dissipation member 270 through the bore 262 in the second circuit board 260, and the first board unit may be located close to the second heat dissipation member through the bore 800A in the second board unit 800. Accordingly, the length (or the height) of the camera device in the optical-axis direction may be reduced, and the size of the camera device 100 may be reduced. The above-described heat dissipation pattern and the above-described cavity or through-hole formed in a predetermined pattern may be applied to any one of the embodiments shown in FIGS. 22 to 25C.

In addition, the camera device according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. For example, the optical instrument according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 26:
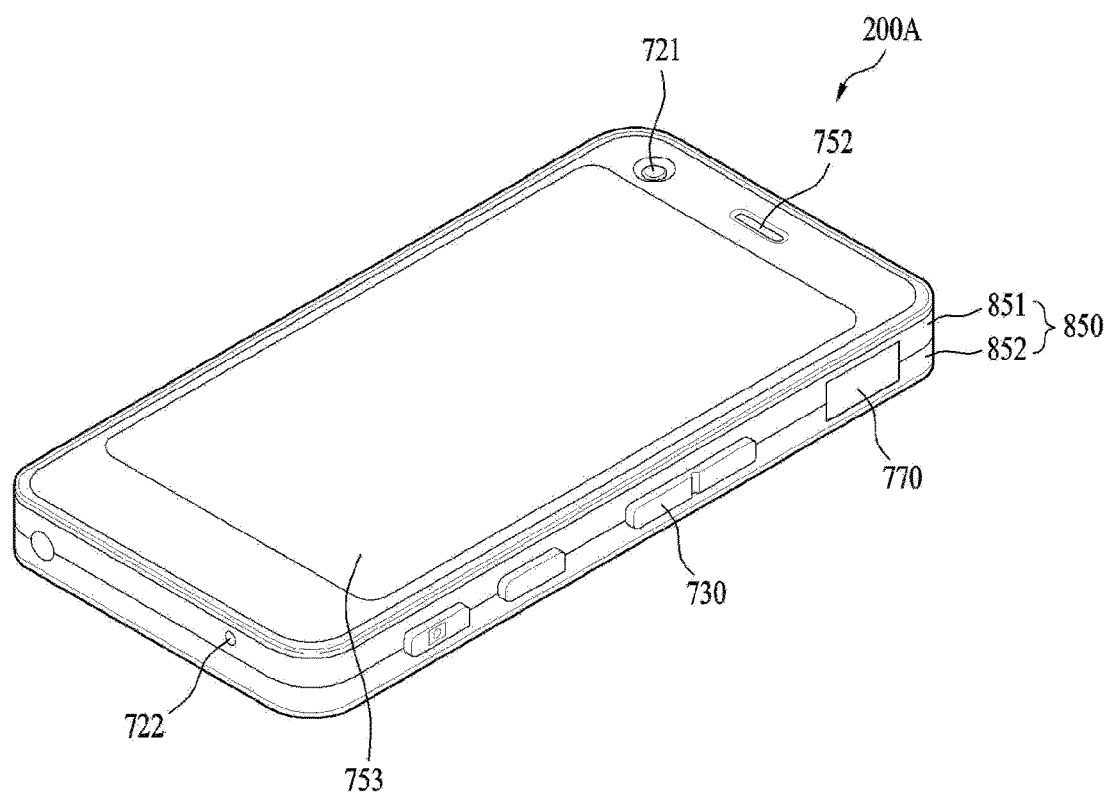
FIG. 26 is a perspective view of an optical instrument according to an embodiment.
Figure 27:
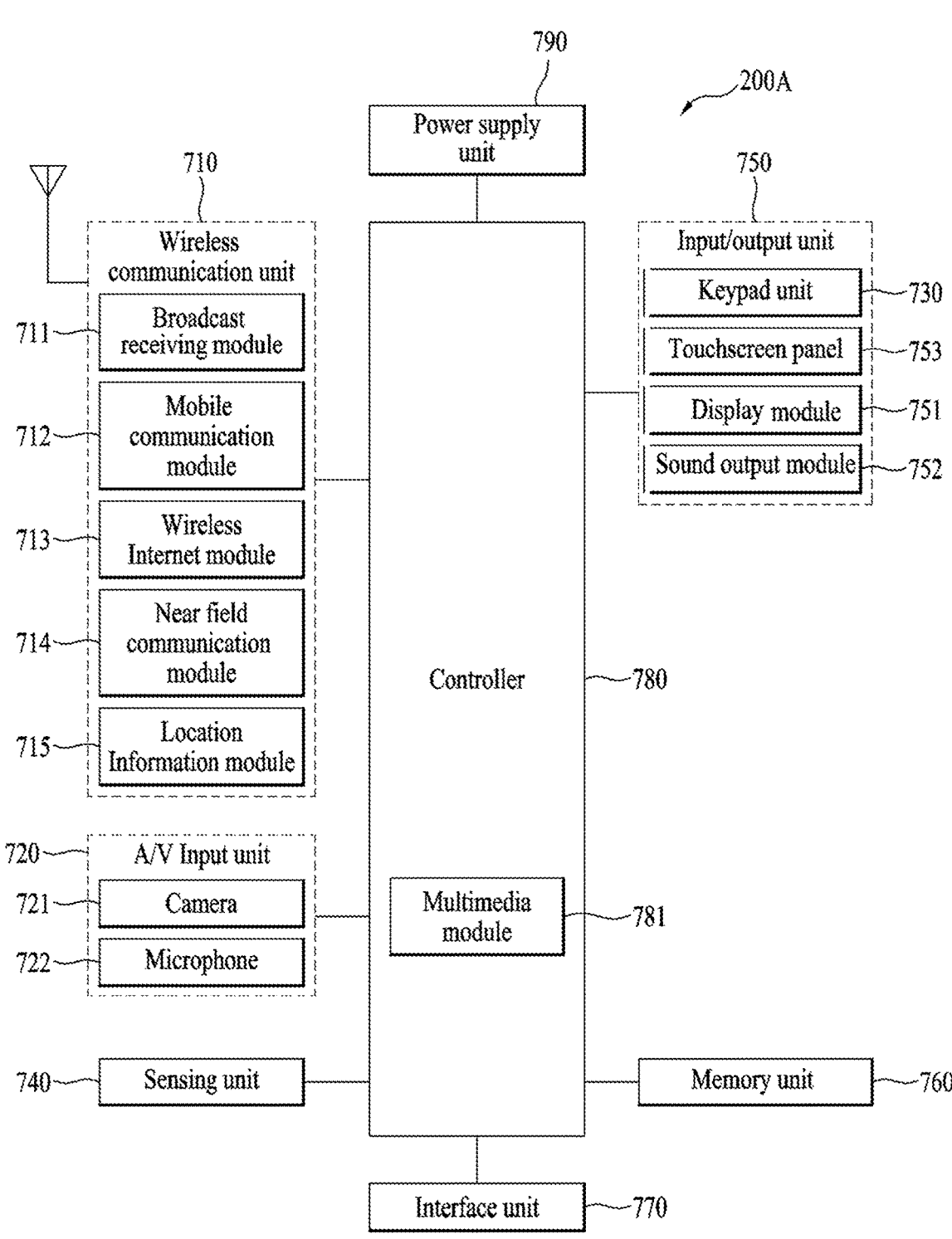
FIG. 27 is a configuration diagram of the optical instrument shown in FIG. 26.

FIG. 26 is a perspective view of the optical instrument 200A according to the embodiment, and FIG. 27 is a configuration diagram of the optical instrument 200A shown in FIG. 26.

Referring to FIGS. 26 and 27, the optical instrument 200A may include a body 850, a wireless communication unit 710, an A/V input unit 720, a sensor 740, an input/output unit 750, a memory 760, an interface unit 770, a controller 780, and a power supply 790.

The body 850 shown in FIG. 26 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the optical instrument 200A and a wireless communication system or between the optical instrument 200A and a network in which the optical instrument 200A is located. In an example, the wireless communication unit 710 may include a broadcast reception module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may include the camera device according to the embodiment.

The sensor 740 may sense the current state of the optical instrument 200A, such as the open or closed state of the optical instrument 200A, the position of the optical instrument 200A, the presence or absence of a user's touch, the orientation of the optical instrument 200A, or the acceleration/deceleration of the optical instrument 200A, and may generate a sensing signal to control the operation of the optical instrument 200A. For example, when the optical instrument 200A is a slide-type phone, whether the slide-type phone is open or closed may be detected. In addition, the sensor 740 serves to sense whether power is supplied from the power supply 790 or whether the interface unit 770 is coupled to an external device.

The input/output unit 750 serves to generate visual, audible, or tactile input or output. The input/output unit 750 may generate input data to control the operation of the optical instrument 200A, and may display information processed in the optical instrument 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). For example, the memory 760 may store images captured by the camera 721, for example, pictures or moving images. For example, the memory 760 may store software, an algorithm, or an equation for implementation of hand-tremor compensation described above.

The interface unit 770 serves as a passage for connection between the optical instrument 200A and an external device. The interface unit 770 may receive data or power from the external device, and may transmit the same to respective components inside the optical instrument 200A, or may transmit data inside the optical instrument 200A to the external device. For example, the interface unit 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the optical instrument 200A. For example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

The power supply 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a camera device exhibiting improved heat dissipation efficiency and having reduced height in an optical-axis direction and an optical instrument including the same.

The invention claimed is:

1. A camera device comprising:
a moving unit comprising a first metal plate, a first board disposed on the first metal plate and including a hole to expose a portion of the first metal plate, and an image sensor disposed on the portion of the first metal plate;
a fixed unit comprising a magnet and a second metal plate spaced apart from the first metal plate so as to overlap the first metal plate in an optical-axis direction;
a coil disposed on the moving unit so as to face the magnet and configured to move the moving unit in a direction perpendicular to the optical-axis direction by an interaction with the magnet; and
a support member configured to support the moving unit to move relative to the fixed unit in the direction perpendicular to an optical-axis direction,
wherein the moving unit comprises a spacing member disposed on the first board,
wherein the coil is disposed on the spacing member so as to be spaced apart from the first board, and
wherein the image sensor is disposed in the hole of the first board.

2. The camera device according to claim 1, wherein the fixed unit comprises a second board disposed under the second metal plate and the support member conductively connects the first board and the second board.

3. The camera device according to claim 2, wherein a value obtained by dividing a spacing distance between the first metal plate and the second metal plate the optical-axis direction by a thickness of the second board is ⅔ to 2.

4. The camera device according to claim 2, wherein the second metal plate is disposed on a first surface of the second board, the first surface being a surface facing the first metal plate, and
wherein the second board comprises a first conductive layer exposed to the first surface of the second board, the first conductive layer being in contact with the second metal plate.

5. The camera device according to claim 2, wherein the support member comprises a support substrate,
wherein the support substrate comprises:
a body disposed to correspond to side portions of the first board;
a connection portion connecting the body and the first board; and
a terminal unit extending toward the second substrate from the body and coupled to the second substrate; and
wherein the support substrate is configured to conductively connect the first board and the second board.

6. The camera device according to claim 1, wherein the first metal plate comprises a protruding portion disposed in the hole in the first board, and
wherein the image sensor is disposed on the protruding portion of the first metal plate.

7. The camera device according to claim 1, wherein a spacing distance in the optical-axis direction between the first metal plate and the second metal plate is 0.15 mm to 0.5 mm.

8. The camera device according to claim 1, wherein a value obtained by dividing a spacing distance between the first metal plate and the second metal plate in the optical-axis direction by a thickness of the first metal plate is 1.4 to 3.75.

9. The camera device according to claim 1, wherein a value obtained by dividing a spacing distance between the first metal plate and the second metal plate in the optical-axis direction by a thickness of the first board is 0.8 to 2.

10. The camera device according to claim 1, wherein a value obtained by dividing a spacing distance between the first metal plate and the second metal plate in the optical-axis direction by a thickness of the second metal plate is 1.4 to 3.75.

11. The camera device according to claim 1, wherein at least one of the first metal plate and the second metal plate comprises a groove.

12. The camera device according to claim 11, wherein the groove is formed in a predetermined pattern, and
wherein the predetermined pattern is a stripe-shaped pattern, a net-shaped pattern, a mesh-shaped pattern, or a multiple dot-shaped pattern.

13. The camera device according to claim 1, wherein the first metal plate and the second metal plate have a same thickness.

14. The camera device according to claim 1, wherein the second metal plate overlaps the first metal plate in an area that is 80% to 100% of an area of the first metal plate.

15. The camera device according to claim 1, wherein the first metal plate has an area that is 55% to 80% of an area of the second metal plate.

16. The camera device according to claim 1, wherein the second board comprises a second conductive layer connected to the first conductive layer and exposed from a second surface of the second board, the second surface being a surface formed opposite the first surface, and the second conductive layer is conductively connected to a ground of the second board.

17. The camera device according to claim 1, wherein the coil comprises a first coil unit, a second coil unit, a third coil unit, and a fourth coil unit that are spaced apart from one another, and
wherein the magnet comprises a first magnet unit facing the first coil unit in the optical-axis direction, a second magnet unit facing the second coil unit in the optical-axis direction, a third magnet unit facing the third coil unit in the optical-axis direction, and a fourth magnet unit facing the fourth coil unit in the optical-axis direction.

18. The camera device according to claim 17, wherein the moving unit comprises a first sensor overlapping the first magnet unit in the optical-axis direction and a second sensor overlapping the second magnet unit in the optical-axis direction, and
wherein each of the first to fourth coil units has a ring shape including a hole, and
wherein the first sensor is disposed under the hole of the first coil unit, and the second sensor is disposed under the hole of the second coil unit.

19. An optical instrument comprising the camera device according to claim 1 and a power supply.

20. A camera device comprising:
a moving unit comprising a first metal plate, a first board disposed on the first metal plate, an image sensor disposed on the first metal plate, a coil disposed on the first board, and a spacing member disposed between the coil and the first board;
a fixed unit comprising a magnet facing the coil in an optical-axis direction and a second metal plate spaced apart from the first metal plate so as to overlap the first metal plate in an optical-axis direction;

a position sensor disposed on first board; and a support substrate configured to support the moving unit to move relative to the fixed unit in a direction perpendicular to the optical-axis direction, and wherein the first board comprises a hole to expose a portion of the first metal plate and the image sensor is disposed on the portion of the first metal plate so as to be disposed in the hole of the first board, and wherein the coil has a ring shape including a hole, and the position sensor is disposed under the hole of the coil.

\* \* \* \* \*